US009550839B2

(12) United States Patent
Kaszas et al.

(10) Patent No.: US 9,550,839 B2
(45) Date of Patent: Jan. 24, 2017

(54) COPOLYMERS OF CONJUGATED TRIENE MONOMERS FOR IMPROVED FILLER INTERACTION

(71) Applicants: Gabor Kaszas, Akron, OH (US); Stephan Rodewald, Canal Fulton, OH (US); Joseph John Kulig, Tallmadge, OH (US)

(72) Inventors: Gabor Kaszas, Akron, OH (US); Stephan Rodewald, Canal Fulton, OH (US); Joseph John Kulig, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 14/797,611

(22) Filed: Jul. 13, 2015

(65) Prior Publication Data
US 2015/0376343 A1 Dec. 31, 2015

Related U.S. Application Data

(62) Division of application No. 13/079,907, filed on Apr. 5, 2011, now Pat. No. 9,079,980.
(Continued)

(51) Int. Cl.
C08C 19/22 (2006.01)
C08C 19/25 (2006.01)
(Continued)

(52) U.S. Cl.
CPC ............ C08C 19/28 (2013.01); B60C 1/0016 (2013.04); C08C 19/22 (2013.01); C08C 19/25 (2013.01);
(Continued)

(58) Field of Classification Search
CPC .......... C08C 19/22; C08C 19/25; C08C 19/28; C08K 3/36; C08K 5/544; C08K 5/5415; C08K 5/5425; C08K 5/09; C08K 5/5419; C08F 236/06; C08F 236/08; C08F 236/22; C08F 236/04; B60C 1/0016
(Continued)

(56) References Cited

U.S. PATENT DOCUMENTS 2,384,400 A 9/1945 Rummelsburg ............... 526/237
2,628,955 A 2/1953 Parrish ......................... 260/80.7
(Continued)

FOREIGN PATENT DOCUMENTS

EP 0844275 A1 5/1998
GB 818909 8/1959
(Continued)

OTHER PUBLICATIONS

Priola et al, Polymer Bulletin, 4 (1981) 743-750.
(Continued)

Primary Examiner — Roberto Rabago
(74) Attorney, Agent, or Firm — Alvin T. Rockhill

(57) ABSTRACT

The present invention achieves increased filler interaction by incorporating a small amount (a few units per chain of rubbery polymer) of a conjugated triene monomer, such as alloocimene, randomly throughout the polymer chain of a rubbery polymer or at the chain ends of the rubbery polymer. The incorporation of the conjugated triene monomer leads to the formation of a polymer containing highly reactive conjugated diene units. These conjugated diene units can chemically react with carbon black leading to superior reinforcement. Alternatively, these conjugated diene units can be used for functionalization of the polymer with silica interactive/ reactive groups using Diels Alder reactions. This functionalization of the rubbery polymer can conveniently be con-
(Continued)

ducted in a mixer, such as a Banbury mixer, a mill mixer, or the like.

18 Claims, 36 Drawing Sheets

Related U.S. Application Data

(60) Provisional application No. 61/378,894, filed on Aug. 31, 2010.

(51) Int. Cl.

| | |
|---|---|
| C08C 19/28 | (2006.01) |
| C08F 236/08 | (2006.01) |
| C08F 236/06 | (2006.01) |
| C08F 236/10 | (2006.01) |
| C08K 5/5419 | (2006.01) |
| B60C 1/00 | (2006.01) |
| C08F 236/22 | (2006.01) |
| C08L 21/00 | (2006.01) |
| C08G 77/00 | (2006.01) |
| C08K 3/04 | (2006.01) |
| C08L 19/00 | (2006.01) |

(52) U.S. Cl.
CPC .......... *C08F 236/06* (2013.01); *C08F 236/08* (2013.01); *C08F 236/10* (2013.01); *C08F 236/22* (2013.01); *C08G 77/00* (2013.01); *C08K 3/04* (2013.01); *C08K 5/5419* (2013.01); *C08L 21/00* (2013.01); *C08K 2003/045* (2013.01); *C08L 19/006* (2013.01)

(58) Field of Classification Search
USPC ...................................... 525/331.9, 342, 379
See application file for complete search history.

(56) References Cited

U.S. PATENT DOCUMENTS

| | | | |
|---|---|---|---|
| 3,838,098 A | 9/1974 | Kent .............................. | 473/356 |
| 4,694,059 A | 9/1987 | Veazey ....................... | 526/340.3 |
| 4,935,471 A | 6/1990 | Halasa et al. ............... | 525/359.1 |
| 5,932,662 A | 8/1999 | Lawson et al. ............... | 525/280 |
| 6,057,397 A | 5/2000 | Takagishi et al. ............ | 524/492 |
| 6,080,835 A | 6/2000 | Lawson et al. ............... | 528/396 |
| 6,084,025 A | 7/2000 | Kitamura et al. ............ | 524/575 |
| 6,114,432 A | 9/2000 | Takagishi et al. ............ | 524/494 |
| 6,211,321 B1 | 4/2001 | Takagishi et al. ............ | 526/335 |
| 6,344,538 B1 | 2/2002 | Sheares ........................ | 528/396 |
| 6,627,721 B1 | 9/2003 | Rodewald et al. ........... | 526/338 |
| 7,108,033 B2 | 9/2006 | Dalphond et al. ......... | 152/209.1 |
| 7,282,548 B2 | 10/2007 | Resendes et al. ............ | 526/237 |
| 2004/0054103 A1 | 3/2004 | Webb et al. .................. | 526/237 |
| 2009/0283187 A1* | 11/2009 | Kaszas ................. | B60C 1/0016 |
| | | | 152/209.1 |

FOREIGN PATENT DOCUMENTS

| | | |
|---|---|---|
| GB | 938089 | 9/1963 |
| GB | 1186615 | 4/1970 |

OTHER PUBLICATIONS

Quirk, R.P. and Bhatia, R., "Alkyllithium-Initiated Polymerization of Trans-1,3,5-Hexatriene and Copolymerization With Stryene", *Rubber Chem. Tech.*, 1989, 62(2), 332-42.

Wikipedia article "Viscoelasticity," http://web.archive.org/web/20100829164602//http://en.wikipedia.org/wiki/Viscoelasticity, 2010.

Wikipedia article "Elastomer," http://web.archive.org/web/20100830163032/http://en.wikipedia.org/wiki/Elastomer, 2010.

Wikipedia article "Vulcanization," http://en.wikipedia.org/wikiki/Vulcanization, 2014.

Bell, V.L., "Polymerization of Conjugated Trienes," *J. Polymer Sci. Part A.*, 1964, 2 (12), 5291-5303.

Priola, A., "Copolymerization of Isobutene with 2,4,6-Octatriene and Other Tricconjugated Trienes," *Polymer Bulletin* 4, 743-750 (1981).

Quirk, R.P., "Synthesis of Diene-Functionlized Macromonomers via Functionalization with Hexa-1,3,5-triene", *Macomol. Chem. Phys.*, 2003, 204, 2183-2196.

* cited by examiner

Monomer Conversions as a Function of Time.
(IP-Allo Copolymerization. Experiment# 102-328)

Calculation of the reactivity ratios Using the Turcsanyi-Kelen-Tudos Method.
($\alpha = 1$)

Proof of the Presence of Conjugated Diene Units in the Copolymer

Monomer Conversions as a Function of Time.
(BD-Allo Copolymerization. Experiment# 102-334)

Calculation of the reactivity ratios Using the Turcsanyi-Kelen-Tudos Method.
($\alpha = 1$)

HNMR Spectrum of the BD/Allo Copolymer

Proof of the Presence of Conjugated Diene Units in the Copolymer

Effect of BMMAc and MAAc Functionalization of IP/Allo Copolymer on the Rate of Filler Agglomeration
RPA 160 °C, 30 min, 1 Hz, 0.48% Strain Effect of BMMAc and MAAc Functionalization of IP/Allo Copolymer on the Strain Dependence of G' and tan δ
RPA 40°C, 1 Hz Effect of BMMAc and MAAc Functionalization of BD/Allo Copolymer on the Rate of Filler Agglomeration
RPA 100°C, 30 min, 1 Hz, 0.48% Strain Effect of BMMAc and MAAc Functionalization of BD/Allo Copolymer on the Strain
Dependence of G' and tan δ
RPA 40°C, 1 Hz Strain Dependence of G' and tan d of Silica Compounds Made with the PBD Control Polymer Mixed with MAAc and a mixture of MAAc and Allo Monomer.
RPA 100°C, 30 min, 1 Hz, 0.48% Strain Rate of Filler Agglomeration Obtained with the PBD Control Polymer After Mixing it with MAAc and a mixture of MAAc and Allo Monomer.
RPA 40°C, 1 Hz Effect of IP/Allo Copolymer Functionalization on the Rate of Filler Agglomeration.
(RPA, 100°C, 1 Hz, 0.48% Strain)

Effect of IP/Allo Copolymer Functionalization on the Strain Dependence of Storage and Loss Modulus
(RPA, 100°C, 1 Hz)

Effect of IP/Allo Copolymer Functionalization on tan δ

Effect of incorporated Alloocimene Units on the Rate of Filler Agglomeration
RPA 160°C, 16 min, 1 Hz, 0.48% Strain Effect of Incorporated Alloocimene Units on the Strain Dependence of G'

Effect of Incorporated Alloocimene Units on the Strain Dependence of G"

Effect of Incorporated Alloocimene Units on the Strain Dependence of tan δ

Cure Curve of BD control and BD-Alloocimene Copolymer
(RPA, 160°C, 1Hz, 7% Strain)

Effect of Incorporated Alloocimene Units on the Strain Dependence of G'
Samples Cured at 160°C for 30 min Using 0.28 % Strain.

Effect of Incorporated Alloocimene Units on the Strain Dependence of G"
Samples Cured at 160 °C for 30 min Using 0.28 % Strain.

Effect of Incorporated Alloocimene Units on the Strain Dependence of tan δ
Samples Cured at 160 °C for 30 min Using 0.28 % Strain.

Kinetic treatment of the Conversion data.

Linear Increase of $M_n$ with Conversion Indicating Absence of Termination

GPC Curves of Samples Showing Molecular Weight Increase with Time

UV and RI Traces of the Last Sample

$^1$HNMR of the Sample Proving the Presence of Conjugated Diene Units in the Polymer UV Traces of the IB/Allo Copolymer Capped ArbPIB

COPOLYMERS OF CONJUGATED TRIENE MONOMERS FOR IMPROVED FILLER INTERACTION

This application is a divisional of U.S. patent application Ser. No. 13/079,907, filed on Apr. 5, 2011, U.S. Pat. No. 9,079,980, which claims the benefit of U.S. Provisional Patent Application Ser. No. 61/378,894, filed on Aug. 31, 2010. The teachings of U.S. Provisional Patent Application Ser. No. 61/378,894 and U.S. patent application Ser. No. 13/079,907 are incorporated herein by reference in their entirety.

BACKGROUND OF THE INVENTION

The rubber compositions utilized in making rubber articles are typically filled with carbon black and/or silica to attain desired physical and chemical characteristics. The interaction between rubber and the filler in such rubber compositions has a profound effect on the physical properties of vulcanizates. In fact, the interaction between the rubber and the filler regulates the degree of dispersion of the filler, the formation of elastomer-filler interface, and the filler-filler network. All of these interactions have a significant effect of the physical properties of the cured rubber composition, such as stress-strain properties, energy loss under cyclic load, abrasion resistance, and tear propagation resistance. Increased polymer filler interaction enables dispersion the filler to a finer degree to achieve a higher level of reinforcement. It also permits the incorporation of higher amounts of the filler and/or for the incorporation of fillers which cannot be properly dispersed into conventional rubbers.

The importance of attaining better rubber/filler interaction has been appreciated for many years and has been the subject of numerous research projects throughout the rubber industry and within academic settings. Attaining improved rubber/filler interaction is of particular interest to manufacturers of rubber products such as tires, hoses, power transmission belts, conveyor belts, windshield wiper blades, and a multitude of other industrial rubber products and consumer goods. One recognized approach for attaining better compatibility between rubbery polymers and fillers is to functionalize the rubbery polymer with moieties that improved interaction with the filler. For instance, rubbery polymers can be functionalized with amines to attain better interaction with carbon black and silica.

U.S. Pat. No. 4,935,471 discloses a process for preparing a polydiene having a high level of affinity for carbon black which comprises reacting a metal terminated polydiene with a capping agent selected from the group consisting of (a) halogenated nitriles having the structural formula X-A-C≡N, wherein X represents a halogen atom and wherein A represents an alkylene group containing from 1 to 20 carbon atoms, (b) heterocyclic aromatic nitrogen containing compounds, and (c) alkyl benzoates. The capping agents disclosed by U.S. Pat. No. 4,935,471 react with metal terminated polydienes and replace the metal with a terminal cyanide group, a heterocyclic aromatic nitrogen containing group or a terminal group which is derived from an alkyl benzoate. For example, if the metal terminated polydiene is capped with a nitrile, it will result in the polydiene chains being terminated with cyanide groups. The use of heterocyclic aromatic nitrogen containing compounds as capping agents can result in the polydiene chains being terminated with a pyrrolyl group, an imidazolyl group, a pyrazolyl group, a pyridyl group, a pyrazinyl group, a pyrimidinyl group, a pyridazinyl group, an indolizinyl group, an isoindolyl group, a 3-H-indolyl group, a cinnolinyl group, a pteridinyl group, a .beta.-carbolinyl group, a perimidinyl group, a phenanthrolinyl group or the like.

U.S. Pat. No. 4,935,471 also discloses that lithium amides are highly preferred initiators because they can be used to prepare polydienes which are terminated with polar groups at both ends of their polymer chains. The extra polar functionality provided by lithium amides results in increased interaction with carbon black resulting in better polymer-carbon black dispersion. The lithium amides disclosed by U.S. Pat. No. 4,935,471 include lithium pyrrolidide. U.S. Pat. No. 4,935,471 also indicates that preferred initiators include amino alkyl lithium compounds of the structural formula:

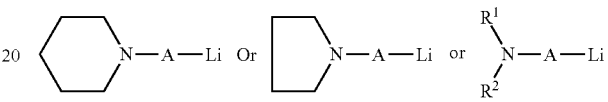

wherein A represents an alkylene group containing from 1 to 20 carbon atoms, and wherein $R^1$ and $R^2$ can be the same or different and represent alkyl groups containing from 1 to 20 carbon atoms.

It is also desirable for synthetic rubbers to exhibit low levels of hysteresis. This is particularly important in the case of rubbers that are used in tire tread compounds. Such polymers are normally compounded with sulfur, carbon black, accelerators, antidegradants and other desired rubber chemicals and are then subsequently vulcanized or cured into the form of a useful article. It has been established that the physical properties of such cured rubbers depend upon the degree to which the carbon black is homogeneously dispersed throughout the polydiene rubber. This is in turn related to the level of affinity that carbon black has for the rubber. This can be of practical importance in improving the physical characteristics of rubber articles that are made utilizing polydiene rubbers. For example, the rolling resistance and tread wear characteristics of tires can be improved by increasing the affinity of carbon black to the rubbery polymers utilized therein. Therefore, it would be highly desirable to improve the affinity of a given polydiene rubber for carbon black and/or silica. This is because a better dispersion of carbon black throughout polydiene rubbers which are utilized in compounding tire tread compositions results in a lower hysteresis value and consequently tires made therefrom have lower rolling resistance. It is also known that a major source of hysteresis is due to polymer chain ends that are not capable of full elastic recovery. Accordingly, improving the affinity of the rubber chain ends to the filler is extremely important in reducing hysteresis.

U.S. Pat. No. 6,080,835 discloses a functionalized elastomer comprising: a functional group defined by the formula:

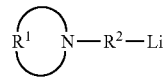

where $R^1$ is a selected from the group consisting of a divalent alkylene group, an oxy-alkylene group, an amino alkylene group, and a substituted alkylene group, each group having from about 6 to about 20 carbon atoms, $R^2$ is covalently bonded to the elastomer and is selected from the group consisting of a linear-alkylene group, a branched-alkylene group, and a cyclo-alkylene group, each group having from about 2 to about 20 carbon atoms.

U.S. Pat. No. 5,932,662 discloses a method of preparing a polymer comprising: preparing a solution of one or more anionically polymerizable monomers in a solvent; and, polymerizing under effective conditions, said monomers in the presence of a polymerization initiator having the formula

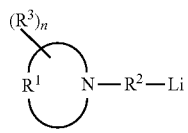

wherein $R^1$ is a divalent alkylene, an oxy- or amino-alkylene having from 6 to about 20 carbon atoms; and, $R^2$ is a linear-alkylene, branched-alkylene, or cyclo-alkylene having from about 2 to about 20 carbon atoms, Li is a lithium atom bonded directly to a carbon atom of $R^2$; and $R^3$ is a tertiary amino, an alkyl having from about 1 to about 12 carbon atoms; an aryl having from about 6 to about 20 carbon atoms; an alkaryl having from about 7 to about 20 carbon atoms; an alkenyl having from about 2 to about 12 carbon atoms; a cycloalkyl having from about 5 to about 20 carbon atoms; a cycloalkenyl having from about 5 to about 20 carbon atoms; a bicycloalkyl having from about 6 to about 20 carbon atoms; and, a bicycloalkenyl having from about 6 to about 20 carbon atoms; where n is an integer of from 0 to about 10.

U.S. Pat. No. 6,084,025 discloses a functionalized polymer prepared by a process comprising the steps of: preparing a solution of a cyclic amine compound, an organolithium compound, and from 3 to about 300 equivalents, based upon one equivalent of lithium, of a monomer selected from vinyl aromatic monomers, and mixtures thereof, where said cyclic amine compound is defined by the formula:

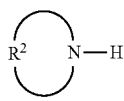

where $R^2$ is selected from the group consisting of an alkylene, substituted alkylene, bicycloalkane, and oxy- or N-alkylamino-alkylene group having from about 3 to about 16 methylene groups, N is a nitrogen atom, and H is a hydrogen atom, thereby forming a polymerization initiator having the formula $A(SOL)_yLi$, where Li is a lithium atom, SOL is a divalent hydrocarbon group having from 3 to about 300 polymerized monomeric units, y is from 0.5 to about 3, and A is a cyclic amine radical derived from said cyclic amine; charging the solution containing $A(SOL)_yLi$ with from about 0.01 to about 2 equivalents per equivalent of lithium of a chelating reagent, and an organic alkali metal compound selected from compounds having the formula $R^4OM$, $R^5C(O)OM$, $R^6R^7NM$, and $R^8SO_3M$, where $R^4$, $R^5$, $R^6$, $R^7$, and $R^8$ are each selected from alkyls, cycloalkyls, alkenyls, aryls, or phenyls, having from 1 to about 12 carbon atoms; and where M is Na, K, Rb or Cs, and sufficient monomer to form a living polymeric structure; and quenching the living polymeric structure.

U.S. Pat. No. 6,344,538 discloses functionalized monomers and polymerized functionalized monomers selected from the group consisting of 2-(N,N-dimethylaminomethyl)-1,3-butadiene, 2-(N,N-diethylaminomethyl)-1,3-butadiene, 2-(N,N-di-n-propylaminomethyl)-1,3-butadiene, 2-(cyanomethyl)-1,3-butadiene, 2-(aminomethyl)-1,3-butadiene, 2-(hydroxymethyl)-1,3-butadiene, 2-(carboxymethy)-1,3-butadiene, 2-(acetoxymethyl)-1,3-butadiene, 2-(2-alkoxy-2-oxoethyl)-1,3-butadiene, 2,3-bis(cyanomethyl)-1,3-butadiene, 2,3-bis(dialkylaminomethyl)-1,3-butadiene, 2,3-bis(4-ethoxy-4-4-oxobutyl)-1,3-butadiene and 2,3-bis(3-cyanopropyl)-1,3-butadiene, and methods for preparing such functionalized diene monomers and polymers.

U.S. Pat. No. 6,211,321 discloses a diene rubber comprising 40 to 99.99% by weight of combined units of a conjugated diene monomer, 0 to 50% by weight of combined units of an aromatic vinyl monomer, and 0.01 to 20% by weight of combined units of other vinyl monomer comprising at least one of tertiary amino-containing vinyl monomer and halogen-containing vinyl monomer and wherein at least part of said combined other vinyl monomer is quaternized to form quaternized tertiary amino-containing vinyl monomer units, with the provisos that when said other vinyl monomer comprises combined tertiary amino-containing vinyl monomer units it is quaternized with a monohalogenated hydrocarbon and when said other vinyl monomer comprises combined halogen-containing vinyl monomer units it is quaternized with a tertiary amine, and having a Mooney viscosity $ML_{1+4}$ at 100° C. of 10 to 200, wherein the tertiary amino-containing vinyl monomer is a compound of the formula $CH_2=CR^{11}A^2NR^{12}R^{13}$ where $R^{11}$ is a hydrogen atom or a lower alkyl group, $R^{12}$ and $R^{13}$ are each, independently, an alkyl group, an aryl group or an aralkyl group, $A^2$ is an alkylene group, an arylene group, an arylene-alkylene group, an alkylene-arylene group, or a linking group of the general formula $—C(=O)-M-R^{14}—$, in which M is an oxy group or an NH group, and $R^{14}$ is an alkylene group, an arylene group, an arylene-alkylene group or an alkylene-arylene group, and $R^{12}$ or $R^{13}$ may be combined with $A^2$ to form a heterocyclic ring, and wherein the combined units of the quaternized tertiary amino-containing vinyl monomer have the formula:

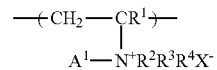

where $R^1$ is a hydrogen atom or a lower alkyl group, $R^2$, $R^3$ and $R^4$, are each, independently, an alkyl group, an aryl group or an aralkyl group, $A^1$ is an alkylene group, an arylene group, an arylene-alkylene group, an alkylene-arylene group, or a linking group of the general formula $—C(=O)-M-R^5—$, in which M is an oxy group or an NH group, and $R^5$ is an alkylene group, an arylene group, an arylene-alkylene group or an alkylene-arylene group, and $R^2$ or $R^3$ may be combined with $A^1$ to form a heterocyclic ring, and X is a halogen atom.

U.S. Pat. No. 6,057,397 discloses a silica-containing diene rubber composition that is reported to be superior in resilience (which is an indication of rolling resistance), at least equal, in tensile strength and abrasion resistance, to carbon black-containing diene rubber compositions, and good in processability and hardness characteristics. The silica-containing diene rubber composition disclosed in U.S. Pat. No. 6,057,397 is characterized by containing, as the diene rubber component, a hydroxyl group-containing diene rubber having a weight-average molecular weight of 50,000 or more, or a blend of the hydroxyl group-containing diene rubber and other diene rubber. This composition is produced by a process which uses, as the diene rubber component, a hydroxyl group-containing diene rubber having a weight-average molecular weight of 50,000 or more, or a combination of the hydroxyl group-containing diene rubber and other diene rubber and wherein the mixing of components is conducted by mixing the diene rubber component with at least part of a required amount of silica and then mixing the resulting mixture with the remainder of silica and other compounding agents.

U.S. Pat. No. 6,114,432 is a diene rubber composition comprising 100 parts by weight of a diene rubber component composed of 10 100 weight percent of an amino group-containing diene copolymer rubber (A) having a composition (based on the bound amount) of 40 99.95 weight percent of a conjugated diene monomer, 0.05 20 weight percent of an amino group-containing monomer and 0 55 weight percent of an aromatic vinyl monomer, and 0 90 weight percent of another diene rubber (B), and 10 150 parts by weight of silica having a specific surface area of 50 220 $m^2/g$ as determined by nitrogen absorption (BET method), and having excellent heat build-up resistance, tensile properties, abrasion properties and processability, and a preparation method thereof.

U.S. Pat. No. 6,627,721 discloses a rubbery polymer which is comprised of repeat units that are derived from (1) at least one conjugated diolefin monomer, and (2) at least one functionalized monomer having of the structural formula:

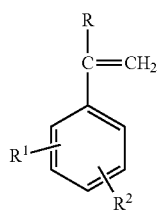

wherein R represents an alkyl group containing from 1 to about 10 carbon atoms or a hydrogen atom, and wherein $R^1$ and $R^2$ can be the same or different and represent hydrogen atoms or a moiety selected from the group consisting of

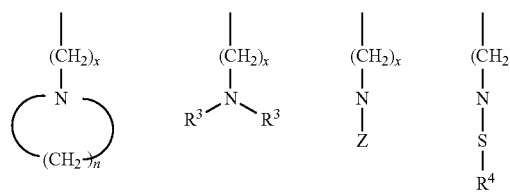

wherein $R^3$ groups can be the same or different and represent alkyl groups containing from 1 to about 10 carbon atoms, aryl groups, allyl groups, and alkyloxy groups of the structural formula $-(CH_2)_y-O-(CH_2)_z-CH_3$, wherein Z represents a nitrogen containing heterocyclic compound, wherein $R^4$ represents a member selected from the group consisting of alkyl groups containing from 1 to about 10 carbon atoms, aryl groups, and allyl groups, and wherein n and x represent integers from 1 to about 10, with the proviso that $R^1$ and $R^2$ can not both be hydrogen atoms.

U.S. Pat. No. 7,108,033 discloses a rubbery polymer which is comprised of repeat units that are derived from (1) at least one conjugated diolefin monomer, and (2) at least one leaving group-bearing monomer having the structural formula:

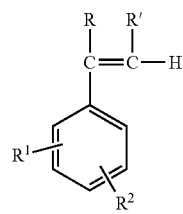

wherein R represents an alkyl group containing from 1 to about 10 carbon atoms or a hydrogen atom, wherein R' represents a methyl group containing from 1 to about 10 carbon atoms or a hydrogen atom, with the proviso that if R represents an alkyl group then R' represents a hydrogen atom, wherein $R^1$ and $R^2$ can be the same or different, wherein $R^1$ represents an alkyl group that is functionalized with a leaving group, wherein $R^2$ represents a moiety selected from the group consisting of hydrogen atoms, alkyl groups containing from 1 to 18 carbon atoms, aryl groups containing from 6 to 18 carbon atoms, alkaryl groups containing from 7 to 18 carbon atoms, and alkyl groups that are functionalized with a leaving group.

U.S. Pat. No. 7,108,033 further reveals a tire which is comprised of a generally toroidal-shaped carcass with an outer circumferential tread, two spaced beads, at least one ply extending from bead to bead and sidewalls extending radially from and connecting said tread to said beads, wherein said tread is adapted to be ground-contacting, and wherein said tread is comprised of (I) a filler, and (II) rubbery polymer which is comprised of repeat units that are derived from (1) at least one conjugated diolefin monomer, and (2) at least one monomer having the structural formula:

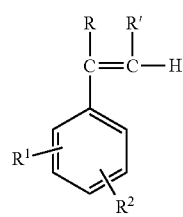

wherein R represents an alkyl group containing from 1 to about 10 carbon atoms or a hydrogen atom, wherein R' represents a methyl group or a hydrogen atom, with the proviso that if R represents an alkyl group then R' represents a hydrogen atom, wherein $R^1$ and $R^2$ can be the same or different, wherein $R^1$ represents an alkyl group that is functionalized with a leaving group, wherein $R^2$ represents a moiety selected from the group consisting of hydrogen atoms, alkyl groups containing from 1 to 18 carbon atoms, aryl groups containing from 6 to 18 carbon atoms, alkaryl groups containing from 7 to 18 carbon atoms, and alkyl groups that are functionalized with a leaving group.

SUMMARY OF THE INVENTION

The present invention achieves increased filler interaction by incorporating a small amount (a few units per chain of rubbery polymer) of a conjugated triene monomer, such as alloocimene, randomly throughout the polymer chain of a rubbery polymer or at the chain ends of the rubbery polymer. The incorporation of the conjugated triene monomer leads to the formation of a polymer containing highly reactive conjugated diene units. These conjugated diene units can chemically react with carbon black leading to superior reinforcement. The conjugated diene units in the rubbery polymers of this invention can also react with fullerenes to make novel polymer-filler composites. Alternatively these conjugated diene units can be used for functionalization of the polymer with silica interactive/reactive groups using Diels Alder reactions. This functionalization of the rubbery polymer can conveniently be conducted in a mixer, such as a Banbury mixer, a mill mixer, or the like.

The present invention more specifically discloses a rubbery polymer having repeat units which are comprised of (1) an olefin monomer selected from the group consisting of conjugated diolefin monomers and monoolefin monomers and (2) a conjugated triene monomer.

The subject invention further reveals a rubbery composition which is comprised of the reaction product of (I) a rubbery polymer having repeat units which are comprised of (1) an olefin monomer selected from the group consisting of conjugated diolefin monomers and monoolefin monomers and (2) a conjugated triene monomer and (II) a dienophile and/or dienophile which is functionalized with a group which is capable of reacting with a filler selected from the group consisting of carbon black, silica, starch, and cellulose.

The present invention also discloses a rubbery polymer having repeat units which are comprised of (1) at least one conjugated diolefin monomer and (2) reactive repeat units of the structural formula:

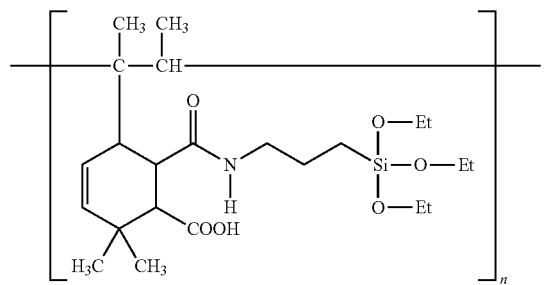

or of the structural formula:

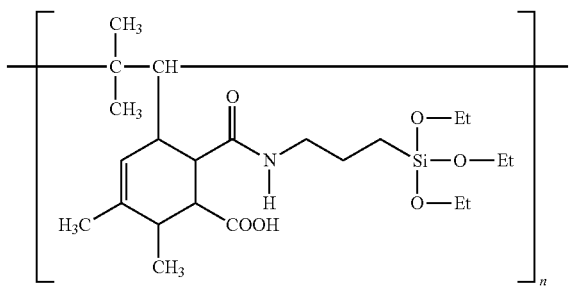

wherein n is an integer representing the number of repeat units in the polymer.

The present invention also reveals a rubbery polymer having repeat units which are comprised of (1) at least one conjugated diolefin monomer and (2) reactive repeat units of the structural formula:

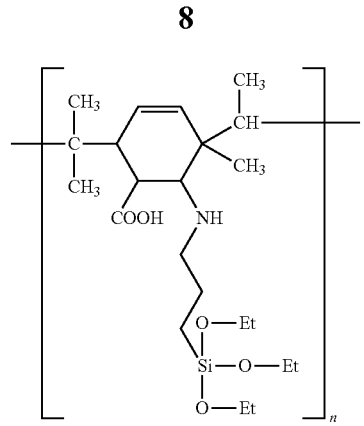

wherein n is an integer representing the number of repeat units in the polymer.

The subject invention further discloses a polymeric composition which is comprised of a rubbery polymer and silica, wherein the silica is bonded to the rubbery polymer through repeat units of the formula:

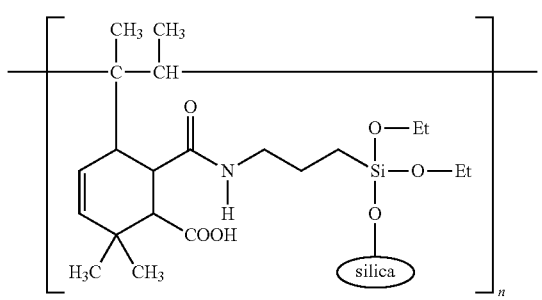

and/or through repeat units of the formula:

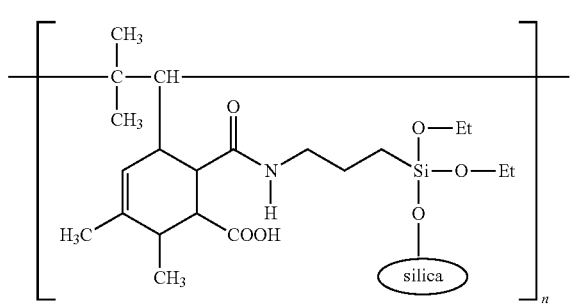

wherein n is an integer representing the number of repeat units in the polymer which are bonded to the silica, and wherein

represents silica particles.

The present invention also discloses a polymeric composition which is comprised of a rubbery polymer and silica, wherein the silica is bonded to the rubbery polymer through repeat units of the formula:

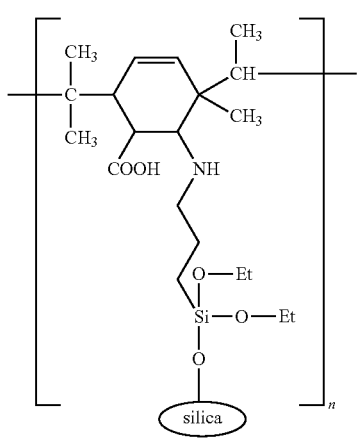

wherein n is an integer representing the number of repeat units in the polymer which are bonded to the silica, and wherein <center>silica</center> represents silica particles.

The subject invention further reveals a process for making a filled polymeric composition which comprises (1) reacting the rubbery polymer specified in claim 1 with a dienophile, wherein the dienophile is functionalized with a group which is capable of reacting with a filler selected from the group consisting of carbon black, silica, starch, and cellulose, to produce a reactive polymer, and (2) reacting the reactive polymer with silica to produce the filled polymeric composition.

The present invention also discloses a process for making a filled polymeric composition which comprises (1) reacting a rubbery polymer having repeat units which are comprised of (1) an olefin monomer selected from the group consisting of conjugated diolefin monomers and monoolefin monomers and (2) a conjugated triene monomer with a dienophile, wherein the dienophile contains trialkoxysilane groups, to produce a reactive polymer, and (2) reacting the reactive polymer with silica to produce the filled polymeric composition. In such a process the dienophile can be triethoxysilylpropylmaleamic acid.

The subject invention also reveals a radial tire which is comprised of a generally toroidal-shaped carcass with an outer circumferential tread, at least two spaced beads, at least one ply extending from bead to bead and sidewalls extending from and connecting said tread to said beads, wherein said tread is adapted to be ground-contacting, and wherein said tread is comprised of rubbery polymer having repeat units which are comprised of (1) an olefin monomer selected from the group consisting of conjugated diolefin monomers and monoolefin monomers and (2) a conjugated triene monomer.

DETAILED DESCRIPTION OF THE INVENTION

Figure 1:
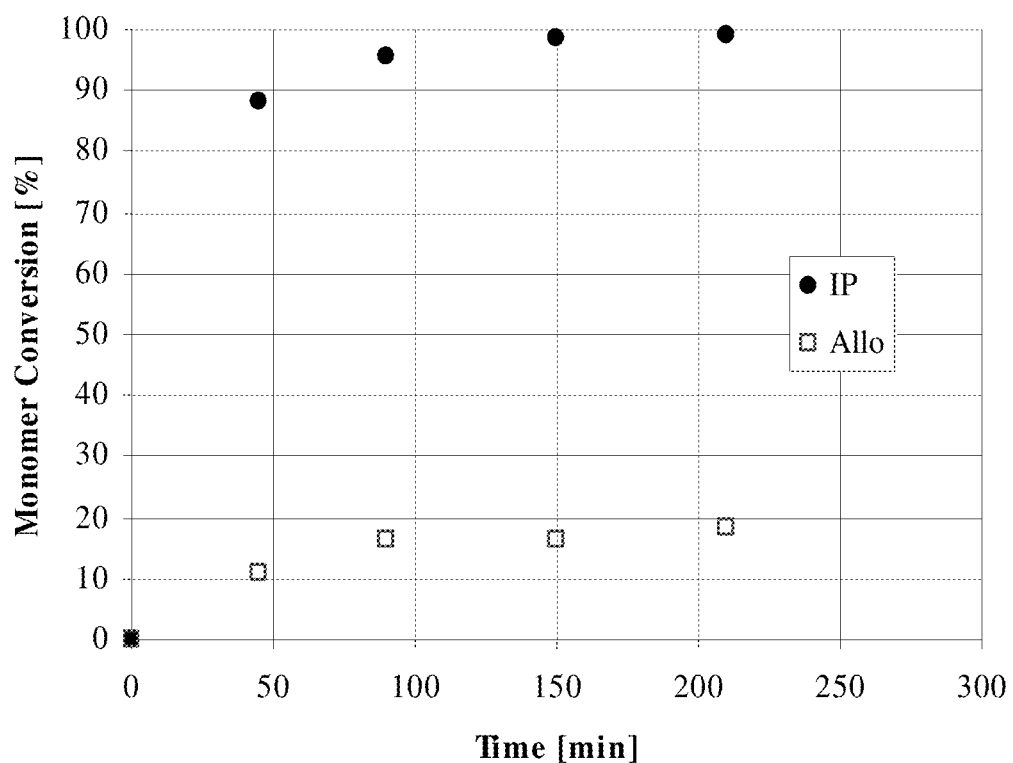
FIG. 1 shows the measured conversion of the two monomers during the copolymerization experiment.

In accordance with this invention conjugated triene monomers can be copolymerized into virtually any type of synthetic rubber. The conjugated triene monomers utilized in accordance with this invention will typically contain from 6 to 30 carbon atoms and will more typically contain from 8 to 12 carbon atoms. Such conjugated triene monomers can be straight-chained, branched, cyclic, or acyclic. For instance, the conjugated triene can be 6,6 dimethyl fulvene which is of the structural formula:

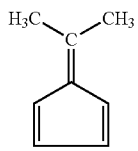

and which is particularly amenable to cationic polymerization having the ability to form tertiary allylic carbocation in the propagation step. Alloocimene is an example of a preferred commercially available conjugated triene monomer that can be used in accordance with this invention. For purposes of this invention, conjugated triene monomers are intended to include monomers having at least three and perhaps more conjugated double bonds. In most cases, the conjugated triene monomer will contain only three conjugated double bonds and in the most extreme cases will contain no more than five conjugated double bonds.

In most cases the conjugated triene monomer will be copolymerized with at least one conjugated diolefin monomer, such as 1,3-butadiene or isoprene. Optionally, other monomers that are copolymerizable with conjugated diolefin monomers, such as vinyl aromatic monomers, can also be included in the polymerization. In any case, typically from about 0.01 phm (parts by weight by 100 parts by weight of monomers) to about 30 phm of the conjugated triene monomer will be included in the polymerization. More typically, from about 0.02 phm to about 20 phm of the conjugated triene monomer will be included in the rubbery polymer. Good results can normally be attained by including 0.1 phm to 10 phm of the conjugated triene monomer in the rubbery polymer. It is typically preferred to incorporate from about 0.2 phm to about 5 phm of the conjugated triene monomer into the rubbery polymer with it being more preferred to incorporate 0.25 phm to 2.5 phm of the conjugated triene monomer into the rubbery polymer. For instance, 0.3 phm to 2.0 phm of the conjugated triene monomer can be incorporated into the rubbery polymer.

In cases where vinyl aromatic monomers, such as styrene or α-methyl styrene, are copolymerized into the rubbery copolymer they will typically be included at a level of 1 phm to about 50 phm. Vinyl aromatic monomers will more typically be incorporated into the rubbery polymer at a level which is within the range of about 10 phm to about 40 phm and most typically be included at a level of about 15 phm to about 30 phm. For instance, the rubbery polymer can be comprised of repeat units that are derived from about 58 weight percent to about 90 weight percent 1,3-butadiene, from about 8 weight percent to about 40 weight percent styrene, and from about 0.2 phm to about 5 phm of the conjugated triene monomer. Such a rubbery polymer is more typically comprised of repeat units that are derived from about 69 weight percent to about 85 weight percent 1,3-butadiene, from about 14 weight percent to about 30 weight percent styrene, and from about 0.3 phm to about 2.5 phm of the conjugated triene monomer.

According to this invention, polymerization and recovery of polymer are suitably carried out according to various methods suitable for diene monomer polymerization processes. This includes batchwise, semi-continuous, or continuous operations under conditions that exclude air and other atmospheric impurities, particularly oxygen and moisture. The polymerization of the conjugated triene monomers into rubbery polymers may also be carried out in a number of different polymerization reactor systems, including but not limited to bulk polymerization, vapor phase polymerization, solution polymerization, suspension polymerization, emulsion polymerization, and precipitation polymerization systems. The commercially preferred methods of polymerization are solution polymerization and emulsion polymerization.

The polymerization reaction may use a free radical initiator, a redox initiator, an anionic initiator, a cationic initiator or a coordination catalyst, such as a Ziegler-Natta catalyst. The preferred initiation system depends upon the particular monomers being polymerized and the desired characteristics of the rubbery polymer being synthesized. In emulsion polymerizations free radical initiators are typically utilized. In solution polymerizations anionic initiators, such as alkyl lithium compounds, are typically employed to initiate the polymerization. An advantage of free radical polymerization is that reactions can typically be carried out under less rigorous conditions than ionic polymerizations. Free radical initiation systems also exhibit a greater tolerance of trace impurities.

Examples of free radical initiators that are useful in the practice of the present invention are those known as "redox" initiators, such as combinations of chelated iron salts, sodium formaldehyde sulfoxylate, and organic hydroperoxides. Representative of organic hydroperoxides are cumene hydroperoxide, paramenthane hydroperoxide, and tertiary butyl hydroperoxide. Tertiary butyl hydroperoxide (t-BHP), tertiary butyl peracetate (t-BPA) and "azo" initiators, such as azobisiobutyronitrile (AIBN), are preferred.

Typically, except in the case of cationic polymerizations (which will be discussed subsequently), the reaction temperature is typically maintained in the range of 0° C. to 150° C. Temperatures between about 20° C. and 120° C. are generally preferred and temperatures within the range of 60° C. to 100° C. are normally most preferred. The reaction pressure is not critical. It is typically only sufficiently high to maintain liquid phase reaction conditions; it may be autogenic pressure, which will vary depending upon the components of the reaction mixture and the temperature, or it may be higher, e.g., up to 1000 psi.

In batch operations, the polymerization time of functionalized diene monomers can be varied as desired; it may vary, for example, from a few minutes to several days. Polymerization in batch processes may be terminated when monomer is no longer absorbed, or earlier, if desired, e.g., if the reaction mixture becomes too viscous. In continuous operations, the polymerization mixture may be passed through a reactor of any suitable design. The polymerization reactions in such cases are suitably adjusted by varying the residence time. Residence times vary with the type of reactor system and range, for example, from 10 to 15 minutes to 24 or more hours. The concentration of monomer in the reaction mixture may vary upward from 5 percent by weight to as high as 35 percent by weight of the reaction mixture, depending on the conditions employed. The monomer level in the polymerization mixture will typically be within the range of about 10 to 20 percent by weight.

The polymerization reactions according to this invention may be carried out in a suitable solvent that is liquid under the conditions of reaction and relatively inert. The solvent may have the same number of carbon atoms per molecule as the diene reactant or it may be in a different boiling range. Preferred solvents are alkane and cycloalkane hydrocarbons. Suitable solvents are, for example, hexane, cyclohexane, methylcyclohexane, or various saturated hydrocarbon mixtures. Aromatic hydrocarbons such as benzene, toluene, isopropylbenzene, xylene, or halogenated aromatic compounds such as chlorobenzene, bromobenzene, or orthodichlorobenzene may also be employed. Other useful polar solvents that can be utilized include tetrahydrofuran, dioxane, dimethoxyethane, dichloromethane, methylchloride, and mixtures thereof to obtain desired polarities.

Conventional emulsion recipes may also be employed with the present invention; however, some restrictions and modifications may arise either from the polymerizable monomer itself, or the polymerization parameters. Ionic surfactants known in the art, including sulfonate detergents and carboxylate, sulfate, and phosphate soaps are useful in this invention. The level of ionic surfactant is computed based upon the total weight of the organic components and may range from about 2 to 30 parts by weight of ionic surfactant per 100 parts by weight of organic components.

Preferably, the polymerization is carried out to complete conjugated triene monomer conversion in order to incorporate essentially all of the conjugated triene monomer into the polymer. Incremental addition, or a chain transfer agent, may be used in order to avoid excessive gel formation. Such minor modifications are within the skill of the artisan. After the polymerization is complete, the polymer is recovered from a slurry or solution of the polymer. A simple filtration may be adequate to separate polymer from diluent. However, in industrial applications hot water coagulation followed by steam stripping techniques are generally implemented in recovering the polymer. Other means for separating polymer from diluent may be employed. The polymer may be treated, separately or while slurried, in the reaction mixture, in order to separate residues. Such treatment may be with alcohols such as methanol, ethanol, or isopropanol, with acidified alcohols, or with other similar polar liquids. In many cases the polymers are obtained in hydrocarbon solutions and the polymer can be recovered by coagulation with acidified alcohol, e.g., rapidly stirred methanol or isopropanol containing 2% hydrochloric acid. Following this initial coagulation, the polymers may be washed several more times in an alcohol.

The conjugated triene monomers will, of course, be polymerized with one or more comonomers. Some adjustments in the polymerization recipe or reaction conditions may be necessary to obtain a satisfactory rate of polymer formation, depending on the amount of functionalized monomer included and the other monomers involved. Examples of comonomers that are useful in the practice of this invention are diene monomers such as 1,3-butadiene, isoprene, and hexadienes. One may, in addition to the diene monomers, use a vinyl monomer such as styrene, α-methylstyrene, divinyl benzene, vinyl chloride, vinyl acetate, vinylidene chloride, methyl methacrylate, ethyl acrylate, vinylpyridine, acrylonitrile, methacrylonitrile, methacrylic acid, itaconic acid and acrylic acid. Mixtures of different functionalized monomers and mixtures of different comonomers may be used.

The conjugated triene monomers can randomly copolymerize with conjugated diolefin monomers in solution polymerizations that are conducted at temperatures of 20° C. or higher. The conjugated triene monomers can be incorporated into virtually any type of rubbery polymer that is capable of being made by solution polymerization with an anionic initiator. The polymerization employed in synthesizing the rubbery polymers will normally be carried out in a hydrocarbon solvent. Such hydrocarbon solvents are comprised of one or more aromatic, paraffinic or cycloparaffinic compounds. These solvents will normally contain from about 4 to about 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, petroleum naphtha, and the like, alone or in admixture.

In the solution polymerization, there will normally be from 5 to 30 weight percent monomers in the polymerization medium. Such polymerization media are, of course, comprised of the organic solvent and monomers. In most cases, it will be preferred for the polymerization medium to contain from 10 to 25 weight percent monomers. It is generally more preferred for the polymerization medium to contain 15 to 20 weight percent monomers. In polymerizations conducting in a slurry, the monomers can be present in higher amounts of up to 35 percent by weight. For instance, such slurries can contain from 20 to about 35 weight percent monomers.

The synthetic rubbers made by the process of this invention can be made by random copolymerization of the functionalized monomer with a conjugated diolefin monomer or by the random terpolymerization of the functionalized monomer with a conjugated diolefin monomer and a vinyl aromatic monomer. It is, of course, also possible to make such rubbery polymers by polymerizing a mixture of conjugated diolefin monomers with one or more ethylenically unsaturated monomers, such as vinyl aromatic monomers. The conjugated diolefin monomers which can be utilized in the synthesis of rubbery polymers which can be coupled in accordance with this invention generally contain from 4 to 12 carbon atoms. Those containing from 4 to 8 carbon atoms are generally preferred for commercial purposes. For similar reasons, 1,3-butadiene and isoprene are the most commonly utilized conjugated diolefin monomers. Some additional conjugated diolefin monomers that can be utilized include 2,3-dimethyl-1,3-butadiene, piperylene, 3-butyl-1,3-octadiene, 2-phenyl-1,3-butadiene, and the like, alone or in admixture.

Some representative examples of ethylenically unsaturated monomers that can potentially be polymerized into rubbery polymers that contain conjugated triene monomers include alkyl acrylates, such as methyl acrylate, ethyl acrylate, butyl acrylate, methyl methacrylate and the like; vinylidene monomers having one or more terminal $CH_2=CH$-groups; vinyl aromatics such as styrene, α-methylstyrene, bromostyrene, chlorostyrene, fluorostyrene and the like; α-olefins such as ethylene, propylene, 1-butene and the like; vinyl halides, such as vinylbromide, chloroethene (vinylchloride), vinylfluoride, vinyliodide, 1,2-dibromoethene, 1,1-dichloroethene (vinylidene chloride), 1,2-dichloroethene and the like; vinyl esters, such as vinyl acetate; α,β-olefinically unsaturated nitriles, such as acrylonitrile and methacrylonitrile; α,β-olefinically unsaturated amides, such as acrylamide, N-methyl acrylamide, N,N-dimethylacrylamide, methacrylamide and the like.

Rubbery polymers which are copolymers of one or more diene monomers with one or more other ethylenically unsaturated monomers will normally contain from about 50 weight percent to about 99 weight percent conjugated diolefin monomers and from about 1 weight percent to about 50 weight percent of the other ethylenically unsaturated monomers in addition to the conjugated diolefin monomers. For example, copolymers of conjugated diolefin monomers with vinylaromatic monomers, such as styrene-butadiene rubbers which contain from 50 to 95 weight percent conjugated diolefin monomers and from 5 to 50 weight percent vinylaromatic monomers, are useful in many applications.

Vinyl aromatic monomers are probably the most important group of ethylenically unsaturated monomers which are commonly incorporated into polydiene rubbers. Such vinyl aromatic monomers are, of course, selected so as to be copolymerizable with the conjugated diolefin monomers being utilized. Generally, any vinyl aromatic monomer which is known to polymerize with organolithium initiators can be used. Such vinyl aromatic monomers typically contain from 8 to 20 carbon atoms. Usually, the vinyl aromatic monomer will contain from 8 to 14 carbon atoms. The most widely used vinyl aromatic monomer is styrene. Some examples of vinyl aromatic monomers that can be utilized include styrene, 1-vinylnaphthalene, 2-vinylnaphthalene, α-methylstyrene, 4-phenylstyrene, 3-methylstyrene and the like.

Some representative examples of rubbery polymers into which conjugated triene monomers can be incorporated include polybutadiene, polyisoprene, styrene-butadiene rubber (SBR), α-methylstyrene-butadiene rubber, α-methylstyrene-isoprene rubber, styrene-isoprene-butadiene rubber (SIBR), styrene-isoprene rubber (SIR), isoprene-butadiene rubber (IBR), α-methylstyrene-isoprene-butadiene rubber and α-methylstyrene-styrene-isoprene-butadiene rubber. In cases where the rubbery polymer is comprised of repeat units that are derived from two or more monomers, the repeat units which are derived from the different monomers, including the conjugated triene monomers, will normally be distributed in an essentially random manner. The repeat units that are derived from the monomers differ from the monomer in that a double bond is normally consumed in by the polymerization reaction. However, in a different embodiment of this invention the repeat units which are derived from the conjugated triene monomers are primarily incorporated into the ends of the polymers chains of the rubbery polymer.

The rubbery polymer can be made by solution polymerization in a batch process by in a continuous process by continuously charging at least one conjugated diolefin monomer, the conjugated triene monomer, and any additional monomers into a polymerization zone. The polymerization zone will typically be a polymerization reactor or a series of polymerization reactors. The polymerization zone will normally provide agitation to keep the monomers, polymer, initiator, and modifier well dispersed throughout the organic solvent the polymerization zone. Such continuous polymerizations are typically conducted in a multiple reactor system. The rubbery polymer synthesized is continuously withdrawn from the polymerization zone. The monomer conversion attained in the polymerization zone will normally be at least about 85 percent. It is more typical for the monomer yconversion to be at least about 90 percent and it is preferable for the monomer conversion to be at least 95 percent. It is more preferred for the monomer conversion attained to be at least 98 percent.

Conjugated triene monomers can also be copolymerized into rubbery polymers utilizing coordination polymerization systems, such as those that employ Zeigler-Natta catalysts. For instance, conjugated triene monomers can be copolymerized with conjugated diolefin monomers by solution polymerization with a Ziegler Natta catalyst system that is comprised of titanium tetrachloride ($TiCl_4$) and an organoaluminum compound, such as triethyl aluminum, Al—($CH_2$—$CH_3$)$_3$. Such polymerization catalysts are of particular benefit in the copolymerization of isoprene with a conjugated diolefin monomer. U.S. Pat. No. 3,931,136 a catalyst system which can be utilized in the copolymerization of isoprene with conjugated triene monomers in accordance with this invention. The catalyst described by U.S. Pat. No. 3,931,136 is a three-component mixture of (A) a titanium tetrachloride, (B) an organoaluminum compound of the formula $AlR_3$, where each R represents an alkyl group, preferably an alkyl group containing 1 to 8 carbon atoms, an aryl group, preferably a phenyl group, or a cycloalkyl group, preferably a cyclohexyl group, and (C) a beta-diketone of the formula:

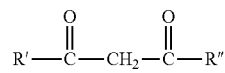

where R' and R" can be the same or different and represent an alkyl group or a aryl group. R' and R" will preferably represent an alkyl group containing from 1 to 5 carbon atoms or a phenyl group. The teachings of U.S. Pat. No. 3,931,136 are incorporated herein by reference for the purpose of teaching catalyst systems and polymerization techniques that can be used in the copolymerization of conjugated triene monomers with conjugated diolefin monomers.

A solution polymerization technique that can be used in accordance with this invention for the copolymerization of conjugated triene monomers with conjugated diene monomers, such as isoprene, with a catalyst system that is comprised of a mixture of titanium tetrachloride and a trialkylaluminum compound is disclosed by U.S. Pat. No. 4,430,487. The teachings of U.S. Pat. No. 4,430,487 are incorporated herein by reference for the purpose of teaching catalyst systems and polymerization techniques that can be used in synthesizing rubbery polymers in accordance with this invention.

The synthesis of cis-1,4-polyisoprene by polymerizing isoprene with a catalyst system which is comprised of a titanium tetrahalide, a trialkylaluminum compound and diphenylether can result in the formation of unwanted gel. U.S. Pat. No. 5,919,876 discloses that gel formation can be reduced by conducting such polymerizations in the presence of a diarylamine, such as para-styrenated diphenylamine. U.S. Pat. No. 5,919,876 more specifically discloses a process for synthesizing cis-1,4-polyisoprene having a low gel content which comprises polymerizing isoprene in an inert organic solvent with a preformed catalyst system which is made by reacting an organoaluminum compound with titanium tetrahalide, such as titanium tetrachloride, in the presence of at least one ether, wherein said polymerization is conducted at a temperature which is within the range of about 0° C. to about 100° C., and wherein said polymerization is conducted in the presence of a diarylamine. The teachings of U.S. Pat. No. 5,919,867 are incorporated herein by reference for the purpose of teaching catalyst systems and solution polymerization techniques that can be used in synthesizing rubbery polymers in accordance with this invention.

Conjugated triene monomers can be copolymerized with conjugated diolefin monomers by vapor phase polymerization utilizing a preformed catalyst that is made by reacting an organoaluminum compound with titanium tetrachloride. U.S. Pat. No. 6,066,705 discloses a method for vapor phase polymerizing isoprene into cis-1,4-polyisoprene in a process comprising the steps of: (1) charging into a reaction zone said isoprene and a preformed catalyst system which is made by reacting an organoaluminum compound with titanium tetrachloride, preferably in the presence of at least one ether; wherein the isoprene is maintained in the vapor phase in said reaction zone by a suitable combination of temperature and pressure; (2) allowing said isoprene to polymerize into cis-1,4-polyisoprene at a temperature within the range of about 35° C. to about 70° C.; and (3) withdrawing said cis-1,4-polyisoprene from said reaction zone. It has been determined that gel formation can be reduced in such vapor phase polymerizations by conducting the polymerization of the isoprene monomer in the presence of a diarylamine, such as para-styrenated diphenylamine. The teachings of U.S. Pat. No. 6,066,705 are incorporated herein by reference for the purpose of teaching catalyst systems and vapor phase polymerization techniques that can be used in accordance with this invention in synthesizing rubbery polymers that have conjugated triene monomers incorporated therein.

Polyisoprene rubber that is clear (transparent) and of high purity can be synthesized utilizing a neodymium catalyst system. U.S. Pat. No. 6,780,948 relates to such a process for the synthesis of polyisoprene rubber which comprises polymerizing isoprene monomer in the presence of a neodymium catalyst system, wherein the neodymium catalyst system is prepared by (1) reacting a neodymium carboxylate with an organoaluminum compound in the presence of isoprene for a period of about 10 minutes to about 30 minutes to produce neodymium-aluminum catalyst component, and (2) subsequently reacting the neodymium-aluminum catalyst component with a dialkyl aluminum chloride for a period of at least 30 minutes to produce the neodymium catalyst system. The teachings of U.S. Pat. No. 5,919,867 are incorporated herein by reference for the purpose of teaching catalyst systems and polymerization techniques that can be used in accordance with this invention in synthesizing rubbery polymers that have conjugated triene monomers incorporated therein.

U.S. Pat. No. 7,091,150 and U.S. Pat. No. 7,199,201 disclose the use of a neodymium catalyst system to polymerize isoprene monomer into synthetic polyisoprene rubber having an extremely high cis-microstructure content and high stereo regularity. This polyisoprene rubber will crystallize under strain and can be compounded into rubber formulations in a manner similar to natural rubber. This technique more specifically discloses a process for the synthesis of polyisoprene rubber which comprises polymerizing isoprene monomer in the presence of a neodymium catalyst system, wherein the neodymium catalyst system is prepared by a process that comprises (1) reacting a neodymium carboxylate with an organoaluminum compound in an organic solvent to produce neodymium-aluminum catalyst component, and (2) subsequently reacting the neodymium-aluminum catalyst component with an elemental halogen to produce the neodymium catalyst system. In practicing this process, the neodymium catalyst system is typically void of nickel-containing compounds. In any case, the teachings of U.S. Pat. No. 7,091,150 and U.S. Pat. No. 7,199,201 are incorporate by reference herein for the purpose of disclosing polymerization techniques that can be used in accordance with this invention in synthesizing rubbery polymers that have conjugated triene monomers incorporated therein.

The synthetic polyisoprene rubber made by this process is comprised of repeat units that are derived from isoprene, wherein the synthetic polyisoprene rubber has a cis-microstructure content which is within the range of 98.0% to 99.5%, a 3,4-microstructure content which is within the range of 0.5% to 2.0%, and a trans-microstructure content which is within the range of 0.0% to 0.5%. The teachings of U.S. Pat. No. 7,091,150 and U.S. Pat. No. 7,199,201 are incorporated herein by reference for the purpose of teaching neodymium catalyst systems and polymerization techniques that can be used in accordance with this invention in synthesizing rubbery polymers that have conjugated triene monomers incorporated therein.

Single component lanthanide catalysts, such as lanthanide diiodides, can also be used in the synthesis of polyisoprene having extremely high cis-microstructure contents. For instance, thulium diiodide, dysprosium diiodide, and neodymium diiodide can initiate the polymerization of isoprene into high cis-1,4-polyisoprene rubber without the need for any additional catalyst components. Lanthanide diiodides can accordingly be used to initiate the copolymerization of isoprene monomer and conjugated triene monomers under solution polymerization conditions into rubbery polymers that have conjugated triene monomers incorporated therein.

U.S. Pat. No. 4,894,425 reveals a process for synthesizing polyisoprene that may possess functional groups and that contains more than 70 percent 1,2- and 3,4-structural units. This process involves the anionic polymerization of isoprene in an inert hydrocarbon solvent in the presence of an organolithium compound as the catalyst and an ether as the cocatalyst, wherein the cocatalyst used is an ethylene glycol dialkyl ether of the formula $R^1$—O—$CH_2$—$CH_2$—O—$R^2$ wherein $R^1$ and $R^2$ are alkyl groups having different numbers of carbon atoms, selected from the group consisting of methyl, ethyl, n-propyl, iso-propyl, n-butyl, iso-butyl, sec-butyl, and tert-butyl, and wherein the sum of the carbon atoms in the two alkyl groups $R^1$ and $R^2$ is within the range of 5 to 7. The teachings of U.S. Pat. No. 4,894,425 are incorporated herein by reference for the purpose of teaching catalyst systems and polymerization techniques that can be used in accordance with this invention in synthesizing rubbery polymers that have conjugated triene monomers incorporated therein.

Crystallizable 3,4-polyisoprene can be synthesized in organic solvents to quantitative yields after short polymerization times by utilizing the catalyst systems described by U.S. Pat. No. 5,082,906. The 3,4-polyisoprene made utilizing this catalyst system is strain crystallizable and can be employed in tire treads which provide improved traction and improved cut growth resistance. U.S. Pat. No. 5,082,906 specifically discloses a process for the synthesis of 3,4-polyisoprene which comprises polymerizing isoprene monomer in an organic solvent at a temperature which is within the range of about −10° C. to about 100° C. in the presence of a catalyst system which is composed of (a) an organoiron compound, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1. The teachings of U.S. Pat. No. 5,082,906 are incorporated herein by reference for the purpose of teaching catalyst systems and polymerization techniques that can be used in accordance with this invention in synthesizing rubbery polymers that have conjugated triene monomers incorporated therein.

U.S. Pat. No. 5,356,997 also relates to a process for the synthesis of strain crystallizable 3,4-polyisoprene. This 3,4-polyisoprene has a 3,4-microstructure content which is within the range of about 65% to about 85%, a cis-1,4-microstructure content which is within the range of about 15% to about 35%, and essentially no trans-1,4-microstructure or 1,2-microstructure. It can be synthesized in organic solvents to quantitative yields after short polymerization times. U.S. Pat. No. 5,356,997 specifically discloses a process for the synthesis of 3,4-polyisoprene which comprises polymerizing isoprene monomer in an organic solvent at a temperature which is within the range of about −10° C. to about 100° C. in the presence of a catalyst system which is comprised of (a) an organoiron compound which is soluble in the organic solvent, wherein the iron in the organoiron compound is in the +3 oxidation state, (b) a partially hydrolyzed organoaluminum compound which was prepared by adding a protonic compound selected from the group consisting of water, alcohols and carboxylic acids to the organoaluminum compound, and (c) a chelating aromatic amine; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1. The teachings of U.S. Pat. No. 5,356,997 are incorporated herein by reference for the purpose of teaching catalyst systems and polymerization techniques that can be used in accordance with this invention in synthesizing rubbery polymers that have conjugated triene monomers incorporated therein.

U.S. Pat. No. 5,677,402 reveals a process for preparing 3,4-polyisoprene rubber which comprises polymerizing isoprene monomer with an organolithium initiator at a temperature which is within the range of about 30° C. to about 100° C. in the presence of a sodium alkoxide and a polar modifier, wherein the molar ratio of the sodium alkoxide to the organolithium initiator is within the range of about 0.05:1 to about 3:1; and wherein the molar ratio of the polar modifier to the organolithium initiator is within the range of about 0.25:1 to about 5:1. The teachings of U.S. Pat. No. 5,677,402 are incorporated herein by reference for the purpose of teaching catalyst systems and polymerization techniques that can be used in accordance with this invention in synthesizing rubbery polymers that have conjugated triene monomers incorporated therein.

U.S. Pat. No. 6,576,728 discloses a process for the copolymerization of styrene and isoprene to produce low vinyl styrene-isoprene rubber having a random distribution of repeat units that are derived from styrene. The initiator systems employed in these polymerizations are comprised of (a) a lithium initiator and (b) a member selected from the group consisting of (1) a sodium alkoxide, (2) a sodium salt of a sulfonic acid, and (3) a sodium salt of a glycol ether. It is important for the initiator system used in these polymerizations to be free of polar modifiers, such as Lewis bases. The teachings of U.S. Pat. No. 6,576,728 are incorporated herein by reference for the purpose describing initiator systems that can be used in accordance with this invention in synthesizing rubbery polymers that have conjugated triene monomers incorporated therein.

U.S. Pat. No. 6,313,216 discloses a process for synthesizing random styrene-isoprene rubber comprising: (1) continuously charging isoprene, styrene, an initiator, and a solvent into a first polymerization zone, (2) allowing the isoprene and styrene to copolymerize in the first polymerization zone to total conversion of 60 to 95 percent to produce a polymer cement containing living styrene-isoprene chains, (3) continuously charging the polymer cement containing living styrene-isoprene chains and additional isoprene monomer into a second polymerization zone, wherein from 5 to 40 percent of the total amount of isoprene changed is charged into the second polymerization zone, (4) allowing the copolymerization to continue in the second polymerization zone to a conversion of the isoprene monomer of at least 90 percent wherein the total conversion of styrene and isoprene in the second polymerization zone is limited to a maximum of 98 percent, (5) withdrawing a polymer cement of random styrene-isoprene rubber having living chain ends from the second reaction zone, (6) killing the living chain ends on the random styrene-isoprene rubber, and (7) recovering the random styrene-isoprene rubber from the polymer cement, wherein the copolymerizations in the first polymerization zone and the second polymerization zone are carried out at a temperature which is within the range of 70° C. to 100° C., and wherein the amount of styrene charged into the first polymerization zone is at least 2 percent more than the total amount of styrene bound into the rubber. The teachings of U.S. Pat. No. 6,313,216 are incorporated herein by reference for the purpose illustrating techniques that can be used in accordance with this invention in synthesizing rubbery polymers that have conjugated triene monomers incorporated therein.

Isoprene-butadiene copolymers having high vinyl contents can be synthesized in organic solvents to high yields after short polymerization times by utilizing the process disclosed in U.S. Pat. No. 5,061,765. The isoprene-butadiene copolymers made utilizing this process have a glass transition temperature which is within the range of about 0° C. to about −60° C. and can be employed in tire treads which provide improved traction and improved cut growth resistance. U.S. Pat. No. 5,061,765 more specifically discloses a process for the synthesis of isoprene-butadiene copolymers having a high vinyl content which comprises copolymerizing isoprene monomer and butadiene monomer in an organic solvent at a temperature which is within the range of about −10° C. to about 100° C. in the presence of a catalyst system which is comprised of (a) an organoiron compound, (b) an organoaluminum compound, (c) a chelating aromatic amine, and (d) a protonic compound; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1. The teachings of U.S. Pat. No. 5,061,765 are incorporated herein by reference for the purpose describing techniques that can be used in accordance with this invention in synthesizing rubbery polymers that have conjugated triene monomers incorporated therein. Such rubbery polymers can be made utilizing 1,3 butadiene or isoprene as the conjugated diene monomer and can further include vinyl aromatic monomers such as styrene or alpha methyl styrene.

Anionic polymerizations can be initiated with alkyl lithium compounds that typically contain from 1 to about 8 carbon atoms, such as n-butyl lithium. Such anionic polymerizations can be used to copolymerize 1,3 butadiene or isoprene with the conjugated triene monomer. The amount of the lithium initiator utilized will vary with the monomers being polymerized and with the molecular weight that is desired for the polymer being synthesized. However, as a general rule, from 0.01 to 1 phm (parts per 100 parts by weight of monomer) of the lithium initiator will be utilized. In most cases, from 0.01 to 0.1 phm of the lithium initiator will be utilized with it being preferred to utilize 0.025 to 0.07 phm of the lithium initiator.

The polymerization process of this invention can be conducted in the presence of polar modifiers, such as alkyltetrahydrofurfuryl ethers. Polar modifiers are of particular value in cases where the polymerization is an anionic polymerization. Some representative examples of specific polar modifiers that can be used include methyltetrahydrofurfuryl ether, ethyltetrahydrofurfuryl ether, propyltetrahydrofurfuryl ether, butyltetrahydrofurfuryl ether, hexyltetrahydrofurfuryl ether, octyltetrahydrofurfuryl ether, dodecyltetrahydrofurfuryl ether, diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, or N-phenyl morpholine.

The polar modifier will typically be employed at a level wherein the molar ratio of the polar modifier to the lithium initiator is within the range of about 0.01:1 to about 5:1. The molar ratio of the polar modifier to the lithium initiator will more typically be within the range of about 0.1:1 to about 4:1. It is generally preferred for the molar ratio of polar modifier to the lithium initiator to be within the range of about 0.25:1 to about 3:1. It is generally most preferred for the molar ratio of polar modifier to the lithium initiator to be within the range of about 0.5:1 to about 3:2.

The polymerization can optionally be conducted utilizing an oligomeric oxolanyl alkane as the modifier. Such oligomeric oxolanyl alkanes are described in greater detail in U.S. Pat. No. 6,927,269. The teachings of U.S. Pat. No. 6,927,269 are incorporated herein by reference for the purpose of teaching oligomeric oxolanyl alkanes that can be used as polymerization modifiers in accordance with this invention.

The polymerization temperature utilized can vary over a broad range of from about −20° C. to about 180° C. In most cases, a polymerization temperature within the range of about 30° C. to about 125° C. will be utilized. It is typically preferred for the polymerization temperature to be within the range of about 45° C. to about 100° C. It is typically most preferred for the polymerization temperature to be within the range of about 60° C. to about 90° C. The pressure used will normally be sufficient to maintain a substantially liquid phase under the conditions of the polymerization reaction.

The polymerization is conducted for a length of time sufficient to permit substantially complete polymerization of monomers. In other words, the polymerization is normally carried out until high conversions of at least about 85 percent are attained. The polymerization is then terminated by the addition of an agent, such as an alcohol, a terminating agent, or a coupling agent. For example, a tin halide and/or silicon halide can be used as a coupling agent. The tin halide and/or the silicon halide are continuously added in cases where asymmetrical coupling is desired. This continuous addition of tin coupling agent and/or the silicon coupling agent is normally done in a reaction zone separate from the zone where the bulk of the polymerization is occurring. The coupling agents will normally be added in a separate reaction vessel after the desired degree of conversion has been attained. The coupling agents can be added in a hydrocarbon solution, e.g., in cyclohexane, to the polymerization admixture with suitable mixing for distribution and reaction. In other words, the coupling will typically be added only after a high degree of conversion has already been attained. For instance, the coupling agent will normally be added only after a monomer conversion of greater than about 85 percent has been realized. It will typically be preferred for the monomer conversion to reach at least about 90 percent before the coupling agent is added.

The tin halides used as coupling agents will normally be tin tetrahalides, such as tin tetrachloride, tin tetrabromide, tin tetrafluoride or tin tetraiodide. However, tin trihalides can also optionally be used. Polymers coupled with tin trihalides having a maximum of three arms. This is, of course, in contrast to polymers coupled with tin tetrahalides which have a maximum of four arms. To induce a higher level of branching, tin tetrahalides are normally preferred. As a general rule, tin tetrachloride is most preferred.

The silicon coupling agents that can be used will normally be silicon tetrahalides, such as silicon tetrachloride, silicon tetrabromide, silicon tetrafluoride or silicon tetraiodide. However, silicon trihalides can also optionally be used. Polymers coupled with silicon trihalides having a maximum of three arms. This is, of course, in contrast to polymers coupled with silicon tetrahalides which have a maximum of four arms. To induce a higher level of branching, silicon tetrahalides are normally preferred. As a general rule, silicon tetrachloride is most preferred of the silicon coupling agents.

A combination of a tin halide and a silicon halide can optionally be used to couple the rubbery polymer. By using such a combination of tin and silicon coupling agents improved properties for tire rubbers, such as lower hysteresis, can be attained. It is particularly desirable to utilize a combination of tin and silicon coupling agents in tire tread compounds that contain both silica and carbon black. In such cases, the molar ratio of the tin halide to the silicon halide employed in coupling the rubbery polymer will normally be within the range of 20:80 to 95:5. The molar ratio of the tin halide to the silicon halide employed in coupling the rubbery polymer will more typically be within the range of 40:60 to 90:10. The molar ratio of the tin halide to the silicon halide employed in coupling the rubbery polymer will preferably be within the range of 60:40 to 85:15. The molar ratio of the tin halide to the silicon halide employed in coupling the rubbery polymer will most preferably be within the range of 65:35 to 80:20.

Broadly, and exemplary, a range of about 0.01 to 4.5 milliequivalents of tin coupling agent (tin halide and silicon halide) is employed per 100 grams of the rubbery polymer. It is normally preferred to utilize about 0.01 to about 1.5 milliequivalents of the coupling agent per 100 grams of polymer to obtain the desired Mooney viscosity. The larger quantities tend to result in production of polymers containing terminally reactive groups or insufficient coupling. One equivalent of tin coupling agent per equivalent of lithium is considered an optimum amount for maximum branching. For instance, if a mixture of tin tetrahalide and silicon tetrahalide is used as the coupling agent, one mole of the coupling agent would be utilized per four moles of live lithium ends. In cases where a mixture of tin trihalide and silicon trihalide is used as the coupling agent, one mole of the coupling agent will optimally be utilized for every three moles of live lithium ends. The coupling agent can be added in a hydrocarbon solution, e.g., in cyclohexane, to the polymerization admixture in the reactor with suitable mixing for distribution and reaction.

After the coupling has been completed, a tertiary chelating alkyl 1,2-ethylene diamine or a metal salt of a cyclic alcohol can optionally be added to the polymer cement to stabilize the coupled rubbery polymer. The tertiary chelating amines that can be used are normally chelating alkyl diamines of the structural formula:

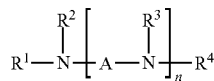

wherein n represents an integer from 1 to about 6, wherein A represents an alkylene group containing from 1 to about 6 carbon atoms and wherein $R^1$, $R^2$, $R^3$ and $R^4$ can be the same or different and represent alkyl groups containing from 1 to about 6 carbon atoms. The alkylene group A is of the formula—$(-CH_2-)_m$ wherein m is an integer from 1 to about 6. The alkylene group will typically contain from 1 to 4 carbon atoms (m will be 1 to 4) and will preferably contain 2 carbon atoms. In most cases, n will be an integer from 1 to about 3 with it being preferred for n to be 1. It is preferred for $R^1$, $R^2$, $R^3$ and $R^4$ to represent alkyl groups which contain from 1 to 3 carbon atoms. In most cases, $R^1$, $R^2$, $R^3$ and $R^4$ will represent methyl groups.

In most cases, from about 0.01 phr (parts by weight per 100 parts by weight of dry rubber) to about 2 phr of the chelating alkyl 1,2-ethylene diamine or metal salt of the cyclic alcohol will be added to the polymer cement to stabilize the rubbery polymer. Typically, from about 0.05 phr to about 1 phr of the chelating alkyl 1,2-ethylene diamine or metal salt of the cyclic alcohol will be added. More typically, from about 0.1 phr to about 0.6 phr of the chelating alkyl 1,2-ethylene diamine or the metal salt of the cyclic alcohol will be added to the polymer cement to stabilize the rubbery polymer.

The terminating agents that can be used to stop the polymerization and to "terminate" the living rubbery polymer include tin monohalides, silicon monohalides, N,N,N', N'-tetradialkyldiamino-benzophenones (such as tetramethyldiaminobenzophenone and the like), N,N-dialkylaminobenzaldehydes (such as dimethylaminobenzaldehyde and the like), 1,3-dialkyl-2-imidazolidinones (such as 1,3-dimethyl-2-imidazolidinone and the like), 1-alkyl substituted pyrrolidinones; 1-aryl substituted pyrrolidinones, dialkyl-dicycloalkyl-carbodiimides containing from about 5 to about 20 carbon atoms, and dicycloalkyl-carbodiimides containing from about 5 to about 20 carbon atoms.

After the termination step, and optionally the stabilization step, has been completed, the rubbery polymer can be recovered from the organic solvent, such as by steam-stripping. The coupled rubbery polymer can be recovered from the organic solvent and residue by means such as chemical (alcohol) coagulation, thermal desolventization, or other suitable method. For instance, it is often desirable to precipitate the rubbery polymer from the organic solvent by the addition of lower alcohols containing from about 1 to about 4 carbon atoms to the polymer solution. Suitable lower alcohols for precipitation of the rubber from the polymer cement include methanol, ethanol, isopropyl alcohol, normal-propyl alcohol and t-butyl alcohol. The utilization of lower alcohols to precipitate the rubbery polymer from the polymer cement also "terminates" any remaining living polymer by inactivating lithium end groups. After the coupled rubbery polymer is recovered from the solution, steam-stripping can be employed to reduce the level of volatile organic compounds in the coupled rubbery polymer. Additionally, the organic solvent can be removed from the rubbery polymer by drum drying, extruder drying, vacuum drying, and the like.

The polymers of the present invention can be used alone or in combination with other elastomers to prepare rubber compounds, such as a tire treadstock, sidewall stock or other tire component stock compounds. In a tire of the invention, at least one such component is produced from a vulcanizable elastomeric or rubber composition. For example, the rubbery polymer made by the process of this invention can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, Neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like.

Conjugated triene monomers can also be incorporated into butyl rubbers. This is accomplished by simply including a conjugated triene monomer in the monomer charge composition employed in making the butyl/conjugated triene copolymers. Polymerization techniques which can be used in such a copolymerization process are described in U.S. Pat. No. 6,841,642. The teachings of U.S. Pat. No. 6,841,642 are incorporated herein by reference. Such butyl polymers are derived from a monomer mixture comprising the conjugated triene monomer, a $C_4$ to $C_7$ monoolefin monomer and a $C_4$ to $C_{14}$ multiolefin monomer or β-pinene.

The butyl rubber will typically be prepared utilizing a monomer charge composition that contains from about 80 to about 99.99% by weight of a $C_4$ to $C_7$ monoolefin monomer and from about 0.01 to about 20% by weight of a conjugated triene monomer. Such copolymers will more typically be made utilizing a monomer charge which includes about 90 to 99.5% by weight of a $C_4$ to $C_7$ monoolefin monomer and from about 0.5% by weight to 10% by weight of the conjugated triene monomer. Optionally, the butyl rubber can also include a $C_4$ to $C_{14}$ multiolefin monomer. Such a monomer mixture comprises from about 60% to about 99% by weight of a $C_4$ to $C_7$ monoolefin monomer, from about 1.0% to about 20% by weight of a $C_4$ to $C_{14}$ multiolefin monomer or β-pinene and about 0.01% to about 20% by weight of a conjugated triene monomer. More preferably, the monomer mixture comprises from about 80% to about 99% by weight of a $C_4$ to $C_7$ monoolefin monomer, from about 1.0% to about 10% by weight of a $C_4$ to $C_{14}$ multiolefin monomer or β-pinene, and 0.02 to 10% by weight of a conjugated triene monomer. Most preferably, the monomer mixture comprises from about 90% to about 99% by weight of a $C_4$ to $C_7$ monoolefin monomer and from about 1.0% to about 5.0% by weight of a $C_4$ to $C_{14}$ multiolefin monomer or β-pinene and 0.02% to 5% by weight of a conjugated triene monomer.

The preferred $C_4$ to $C_7$ monoolefin monomer may be selected from the group comprising isobutylene, 2-methyl-1-butene, 3-methyl-1-butene, 2-methyl-2-butene, 4-methyl-1-pentene and mixtures thereof. The most preferred $C_4$ to $C_7$ monoolefin monomer comprises isobutylene.

The preferred $C_4$ to $C_{14}$ multiolefin monomer may be selected from the group comprising isoprene, butadiene, 2-methylbutadiene, 2,4-dimethylbutadiene, piperyline, 3-methyl-1,3-pentadiene, 2,4-hexadiene, 2-neopentylbutadiene, 2-methyl-1,5-hexadiene, 2,5-dimethyl-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof. The most preferred $C_4$ to $C_{14}$ multiolefin monomer comprises isoprene.

As discussed above, the monomer mixture may contain minor amounts of one or more additional polymerizable co-monomers. For example, the monomer mixture may contain a small amount of a styrenic monomer.

The preferred styrenic monomer may be selected from the group comprising p-methylstyrene, styrene, a-methyl-styrene, p-chloro styrene, p-methoxystyrene, indene (including indene derivatives) and mixtures thereof. The most preferred styrenic monomer may be selected from the group comprising styrene, p-methylstyrene and mixtures thereof.

If present, it is preferred to use the styrenic monomer in an amount of up to about 5.0% by weight of the monomer mixture. The use of other monomers in the monomer mixture is possible provided, of course, that they are copolymerizable with the other monomers in the monomer mixture. Such copolymerizations are typically carried out in a suitable solvent, such as hexane or isopentane, or in a slurry utilizing a polymerization medium such as a chlorinated or fluorinated hydrocarbon, for example methyl chloride, dichloromethane or dichloroethane, at a temperature which is within the range of 0 to −120° C. and more preferably within the range of −50 to −100° C. to eliminate the possibility of undesirable level of chain transfer limiting the molecular weight of the ultimate polymer.

As stated hereinabove, the butyl polymer may be halogenated. Preferably, the halogenated butyl polymer is brominated or chlorinated. Preferably, the amount of halogen is in the range of from about 0.1 to about 8%, more preferably from about 0.5% to about 4%, most preferably from about 1.0% to about 3.0%, by weight of the polymer. The halogenated butyl polymer may also be produced by halogenating a previously-produced butyl polymer derived from the monomer mixture described hereinabove.

Conjugated triene monomers can also be incorporated into arborescent polymers as terminal end sequences. This can be accomplished by synthesizing the arborescent polymer utilizing known techniques. This can be done utilizing the procedure described in U.S. Pat. No. 6,747,098, the teachings of which are incorporated herein by reference. The technique of U.S. Pat. No. 6,747,098 involves synthesizing an arborescent branched block copolymer of a polyisoolefin and a conjugated triene by a process comprising: a) polymerizing an isoolefin in the presence of at least one inimer and a Lewis acid halide coinitiator, at a temperature of between about −20° C. and −100° C. to produce an arborescent elastomeric branched polyisoolefin polymer having more than one branching point, the inimer including at least one group for (co)polymerizing in a cationic polymerization of the isoolefin and at least one group for initiating cationic polymerization of the isoolefin; and thereafter adding conjugated triene or a mixture of conjugated triene with other cationically copolymerizable monomer for the production of a poly-triene sequence or conjugated triene containing copolymer sequence with some or all of the branches of the aforesaid arborescent elastomeric branched polyisoolefin polymer being terminated with a polymer sequence containing conjugated double bonds arising form the incorporation of the conjugated triene.

In the process for synthesizing arborescent polymers the inimer is a compound carrying both an initiator and a monomer functionality (IM), which is copolymerized with one or more olefins. Very high MW arborescent PIBs are produced using 4-(2-hydroxy-isopropyl) styrene and 4-(2-methoxy-isopropyl) styrene as IM in a "one-pot" living-type polymerization system. The reactive chain ends of arborescent PIB are blocked with conjugated triene or for example a conjugated triene/isobutylene mixture to form PIB-Allo blocks.

When the rubbery polymers made by the process of the present invention are blended with conventional rubbers, the amounts can vary widely such as between 10 and 99 percent by weight. In any case, tires made with synthetic rubbers that are synthesized utilizing the technique of this invention exhibit decreased rolling resistance. The greatest benefits are realized in cases where the tire tread compound is made with the rubbery polymer synthesized utilizing the technique of this invention. However, benefits can also by attained in cases where at least one structural element of the tire, such as subtread, sidewalls, body ply skim, or bead filler, is comprised of the rubbery.

The synthetic rubbers made in accordance with this invention can be compounded with carbon black in amounts ranging from about 5 to about 100 phr (parts by weight per 100 parts by weight of rubber), with about 5 to about 80 phr being preferred, and with about 40 to about 70 phr being more preferred. The carbon blacks may include any of the commonly available, commercially-produced carbon blacks but those having a surface area (EMSA) of at least 20 m²/g and more preferably at least 35 m²/g up to 200 m²/g or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the following table.

| Carbon Blacks | |
|---|---|
| ASTM Designation (D-1765-82a) | Carbon Black Surface Area (D-3765) |
| N-110 | 126 m²/g |
| N-220 | 111 m²/g |
| N-330 | 83 m²/g |
| N-339 | 95 m²/g |
| N-550 | 42 m²/g |
| N-660 | 35 m²/g |

The carbon blacks utilized in the preparation of rubber compounds may be in pelletized form or an unpelletized flocculent mass. Preferably, for more uniform mixing, unpelletized carbon black is preferred. The reinforced rubber compounds can be cured in a conventional manner with about 0.5 to about 4 phr of known vulcanizing agents. For example, sulfur or peroxide-based curing systems may be employed. For a general disclosure of suitable vulcanizing agents, one can refer to Kirk-Othmer, Encyclopedia of Chemical Technology, 3rd ed., Wiley Interscience, N.Y. 1982, Vol. 20, pp. 365-468, particularly "Vulcanization Agents and Auxiliary Materials" pp. 390-402. Vulcanizing agents can, of course, be used alone or in combination. Vulcanizable elastomeric or rubber compositions can be prepared by compounding or mixing the polymers thereof with carbon black and other conventional rubber additives such as fillers, plasticizers, antioxidants, curing agents and the like, using standard rubber mixing equipment and procedures and conventional amounts of such additives.

This invention is illustrated by the following examples that are merely for the purpose of illustration and are not to be regarded as limiting the scope of the invention or the manner in which it can be practiced. Unless specifically indicated otherwise, parts and percentages are given by weight.

Example 1

In this experiment alloocimene was copolymerized with isoprene monomer to make an isoprene-alloocimene copolymer rubber. In the procedure used hexanes (Ashland, Polymerization Grade) was recirculated through silica gel for 4 hours before use. Isoprene (Li Grade) was distilled before use and n-butyllithium (Aldrich, 1.6 M solution in hexanes) was used as received. The alloocimene (Allo) monomer, 2,6-dimethyl-2,4,6-octatriene, from Aldrich (technical grade 80%, CofA GC purity 95.6%) was passed through an aluminum oxide column (Aldrich, neutral, Brockmann I activity), purged with nitrogen and stored over calcium hydride (Aldrich, reagent grade, coarse granules, <20 mm). Di-(tetrahydrofuryl)-propane (DTP) first was dried over silica gel molecular sieves mixture, purged with nitrogen and stored over $CaH_2$.

SEC measurements were conducted using a Polymer Laboratories PL-GPC 50 Plus system equipped with four detectors (45 and 90 degree laser detectors (650 nm wavelength), RI and UV detectors) and two Mixed-C columns (5 μm Mixed-C PL-gel 300×7.5 mm). The mobile phase was THF at 1 mL/min flow rate. Measurements were done at 40° C. MW calculations were carried out using 0.14 dn/dc value for PI.

Polymerizations were carried out in a 10 USG batch reactor at 65° C. using 15 weight percent IP/hexane premix, 0.276 mmphm n-butyllithium (n-BuLi) as the initiator, and 3 mol DTP/mol initiator as a modifier. Reaction time was 100 min in case of the control and 230 min in case of the IP-Alloocimene copolymer. The initial alloocimene content of the monomer feed was 1.28 mol percent. Conversions measured by gravimetry were 99 weight percent for the control and 91 weight percent for the IP-Allo copolymer. Polymerization was terminated by the addition of isopropanol and stabilized by adding 0.25 phr BHT dissolved in toluene.

Monomer Incorporation—Reactivity Ratios

Monomer incorporation was monitored by GC measurements. FIG. 1 shows the measured conversion of the two monomers during the copolymerization experiment. IP conversion reached about 98% within 2.5 hours. On the other hand, Allo conversion was only around 16-17 weight percent. The final product contained only 0.27 mol percent Allo incorporated.

Calculation of the reactivity ratios provided some understanding as to why Allo incorporation did not increase with extra reaction time. The Reactivity ratios were determined using the Turcsanyi-Kelen-Tüdős method recommended for higher conversions (see Tüdős, F.; Kelen, T.; Földes Bersnich, T. and Turcsányi, B; J. Macromol Sci.-Chem., A10, 1513 (1976)), using the following:

$$\eta = \left[ r_1 + \frac{r_2}{\alpha} \right] \xi - \frac{r_2}{\alpha} \quad (1)$$

$$\xi = \frac{F}{F+\alpha}; \eta = \frac{G}{F+\alpha} \quad (2)$$

$$F = \frac{Y}{X^2} \quad G = \frac{Y-1}{X} \quad (3)$$

$$Y = \frac{\Delta[M_1]_{t1-t2}}{\Delta[M_2]_{t1-t2}} \quad (4)$$

$$X = \frac{\ln([M_1]_{t2}/[M_1]_{t1})}{\ln([M_2]_{t2}/[M_2]_{t1})} \quad (5)$$

where $r_1$ is the reactivity ration of isoprene and $r_2$ of alloocimene and $M_1$ and $M_2$ are the concentrations of isoprene and alloocimene respectively.

Each monomer concentration reading was treated as an independent measurement point and the polymer composition (Y) and the log mean monomer concentration ratio (X) were calculated using the concentration values at $t_1$ and $t_2$ time. In order to simplify calculation $\alpha=1$ was used. In this case the slope is the sum of $r_1$ and $r_2$ and the intercept is equal to $-r_2$.

Figure 2:
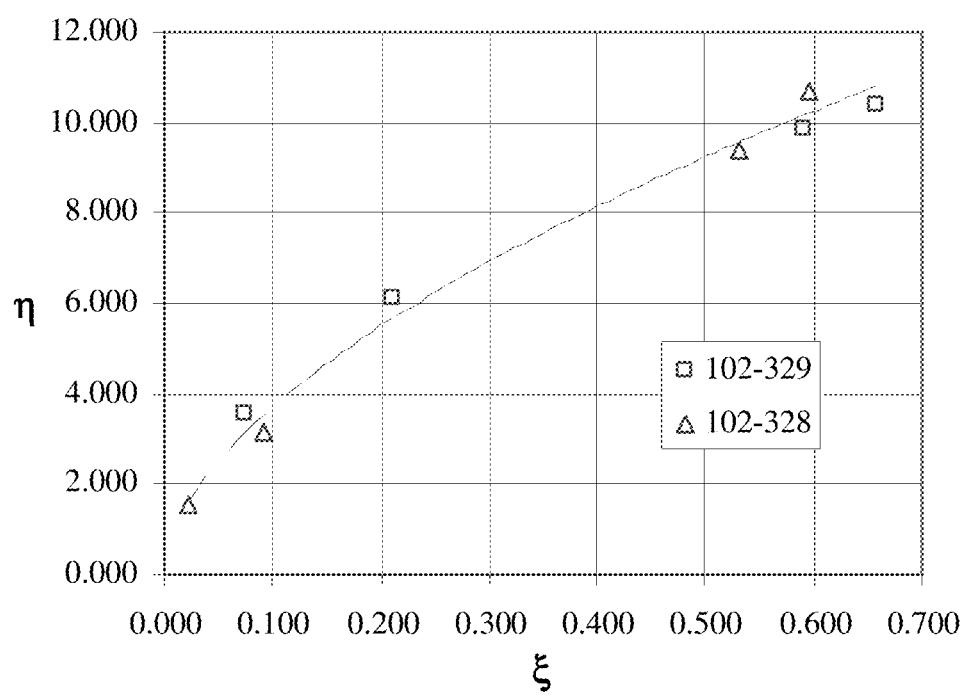
FIG. 2 shows the η-ξ plot generated using the conversion data.

FIG. 2 shows the η-ξ plot generated using the conversion data. The points do not follow a linear relationship indicating that the simple copolymerization equation based on four propagation rate constants is inadequate to describe the system. This is not surprising considering the numerous possible mode of Allo incorporation (2,3- 4,5- 6,7-, 2,7-) as well as the two mode of isoprene incorporation (1,2- and 3,4-). Deviation from linearity seems to be more pronounced at high conversion (low ξ values) where the monomer charge is quite rich in Allo. (At ξ=0.1 the estimated Allo content of the monomer charge is around 40 mol %). This indicates that deviation from linearity is primarily caused by Allo. Forcing a linear fit over the points give an artificial −1.4 value for $r_{Allo}$ and 16.7 for $r_{IP}$. All these results indicate that Allo can not go readily under a homopolymerization step.

This finding is in line with limited information available in the literature. Homopolymer of conjugated trienes including Allo can only be made in the presence of a polar solvent (such as THF) via anionic polymerization (see R. L. Veazey: Polyalloocimene and Method for the Preparation Thereof, U.S. Pat. No. 4,694,059 (1987); Vernon L. Bell: "Polymerization of Conjugated Trienes", J. Polymer Sci. Part A, 5291-5303 (1964); and R. P. Quirk, R. Rajeev, Alkyllithium Initiated Polymerization of trans-1,3,5-Hexatriene and "Copolymerization with Styrene", Rubber Chemistry and Technology, 332-42, 62(2) (1989)). From this it is apparent that Allo conversion can only be improved by identifying a polymerization system in which Allo can be homopolymerized by changing the modifier in a non polar solvents and/or using a more polar solvent. Alternatively, Allo conversion can be improved by utilizing a semi-continuous polymerization technique. In this case, polymerization is initiated in a partially filled reactor containing all the Allo monomer intended to be used and a part of the other monomer or monomer mixture. This part could be 5-20% of the total monomer to be used. This partially charged reactor is then initiated, with for instance an alkyl lithium compound, and the rest of the isoprene is added in a slow stream to the reactor.

Physical Properties of the Polymers Made

Physical properties of the high vinyl PI control polymer (containing no Allo) and the IP/Allo copolymer is listed in Table I. The number average molecular weight (Mn) of the copolymer is somewhat lower and MWD is broader compared to the control polymer indicating the presence of some chain transfer reaction. The narrower distribution control polymer accordingly gave a higher Mooney value.

The glass transition temperature ($T_g$) and microstructural composition of the polymers are very similar. The Allo content of the copolymer was calculated to be around 0.27 weight percent according to the GC conversion measurements. From this, the number of Allo units per chain could be estimated giving a number of about 12. However, only a part of this is in the desired form having a pendant or in chain conjugated diene considering the possible mode of monomer incorporations.

The conjugated diene content of the copolymer could not be quantified by $^1$HMR spectroscopy due to the lack of proton assignment as well as the low concentration and different chemical structure of the conjugated dienes. However, resonance peaks at around 6.2 ppm could be detected indicating the presence of conjugated diene units in the polymer.

The amount of unreacted Allo in the copolymer was quantified adding different concentration of Allo to the control monomer. Based on these measurements the unreacted Allo monomer present in the copolymer was estimated to be around 0.09 weight percent.

TABLE I

Physical Properties of the Polymers

| | | Control | IP-Allo Copolymer |
|---|---|---|---|
| Allo Content | [mol %] | 0 | 0.27 |
| Allo/Chain | | 0 | 12 |
| Mooney | | 90 | 77 |
| Mn | [kg/mol] | 377 | 316 |
| Mw/Mn | | 1.07 | 1.21 |
| Tg onset | [° C.] | −6.1 | −7.6 |
| Tg Inflection | [° C.] | −3.3 | −3.3 |
| 3,4-PI | [wt %] | 62 | 59 |
| 1,4-PI | [wt %] | 32 | 35 |
| 1,2-PI | [wt %] | 6 | 6 |

Figure 3:
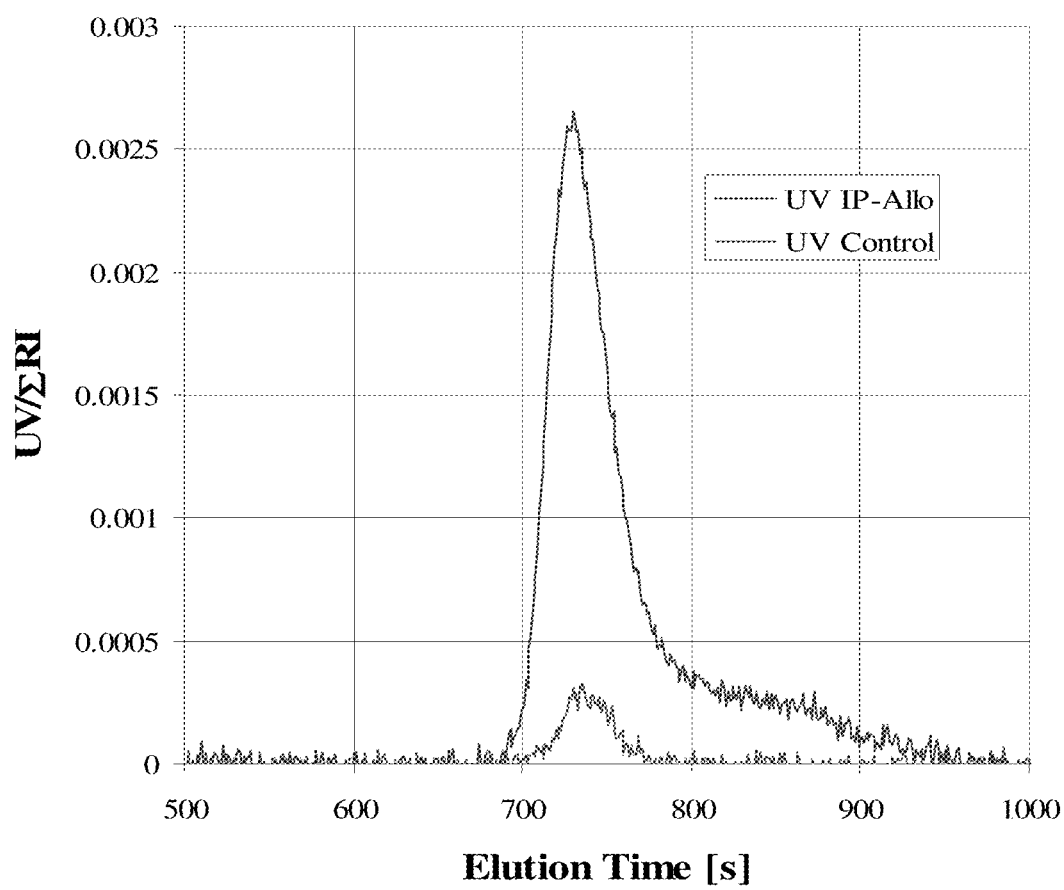
FIG. 3 shows proof of the presence of conjugated diene units in the copolymer.

Additional proof that the copolymer has in-chain and/or pendant conjugated diene units was obtained by SEC measurements using UV and RI detectors. The UV absorption of the eluting polymer was measured at 220 nm. At this wavelength the polyisoprene control is essentially transparent. This is shown by FIG. 3. In contrast the copolymer showed a very strong absorption at this wavelength characteristic to conjugated dienes. The UV signal of both polymers was normalized by the cumulative RI signal in order to eliminate concentration effect. The strong UV absorption of the eluting copolymer confirms the $^1$HMR resonances at around 6.2 ppm associated with conjugated dienes do not arise from a separately formed Allo homopolymer, but are part of the high molecular weight copolymeric chain.

Example 2

In this experiment, butadiene/alloocimene copolymer was synthesized along with a polybutadiene control polymer and both polymers were characterized and compared. In the procedure used, Hexane (Ashland, Polymerization Grade) was recirculated through silica gel for 4 hours before use. Butadiene was received from Exxon. It was distilled to remove the stabilizer and heavies before use. n-Butyllithium (Aldrich, 1.6 M solution in hexanes) was used as received. 2,6-Dimethyl-2,4,6-octatriene (Aldrich, technical grade 80%, CofA GC purity 95.6%) was passed through an aluminum oxide column (Aldrich, neutral, Brockmann I activated), purged with nitrogen and stored over calcium hydride (Aldrich, reagent grade, coarse granules, <20 mm). Di-(tetrahydrofuryl)-propane (DTP) first was dried over silica gel molecular sieves mixture, purged with nitrogen and stored over $CaH_2$.

SEC measurements were conducted using a Polymer Laboratories PL-GPC 50 Plus system equipped with four detectors (45 and 90 degree laser detectors (650 nm wavelength), RI and UV detectors) and two Mixed-C columns (5 μm Mixed-C PL-gel 300×7.5 mm). The mobile phase was THF at 1 mL/min flow rate. Measurements were done at 40° C. MW calculations were carried out using dn/dc value of 0.12.

Polymerizations were carried out in a 10 USG batch reactor at 40° C. using 15 wt % BD/hexane premix, 0.276 mmphm n-BuLi as initiator, and 15 mol DTP/mol initiator as modifier. Reaction time was 120 min in case of the control and 250 min in case of the BD-Alloocimene copolymer. BD-Alloocimene copolymer was made using 1.28 mol % alloocimene in the monomer charge. Polymerization was terminated by the addition of isopropanol and stabilized by adding 0.5 phr BHT dissolved in toluene.

Figure 4:
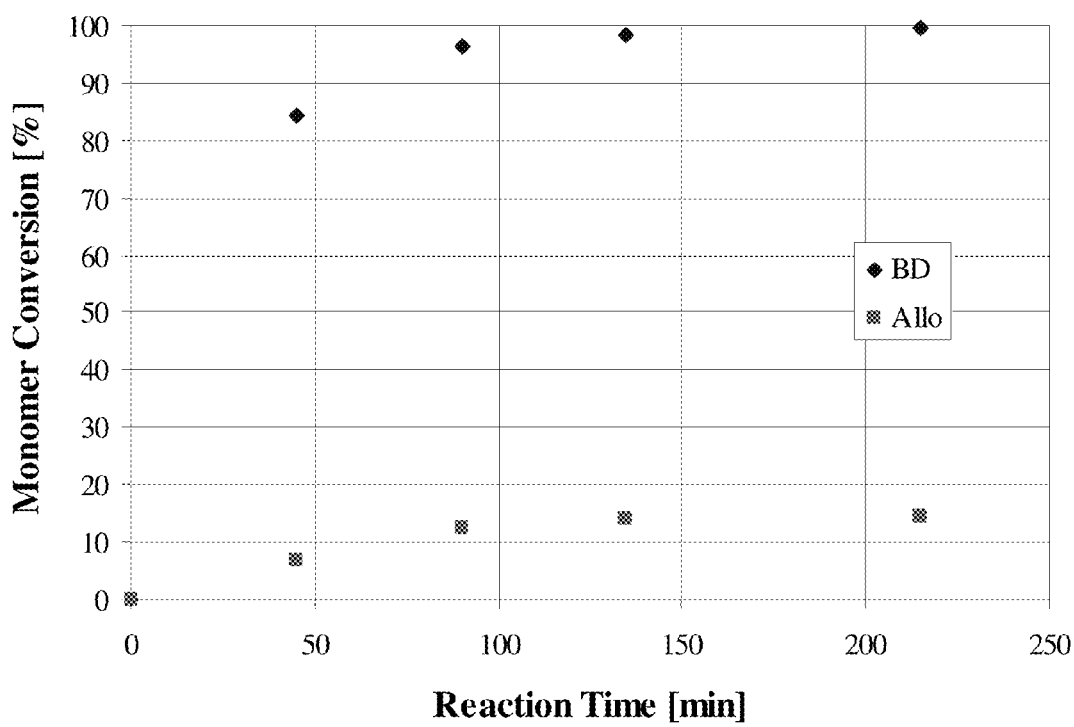
FIG. 4 shows the measured conversion of the two monomers during the copolymerization experiment.

Monomer incorporation was monitored by GC measurements. FIG. 4 shows the measured conversion of the two monomers during the copolymerization experiment. BD conversion reached about 98% within 2 hours. Extending the reaction time did not result in any significant increase of alloocimene conversion. Incorporation of alloocimene remained low. The final product contained only 0.19 mol % alloocimene incorporated.

Figure 5:
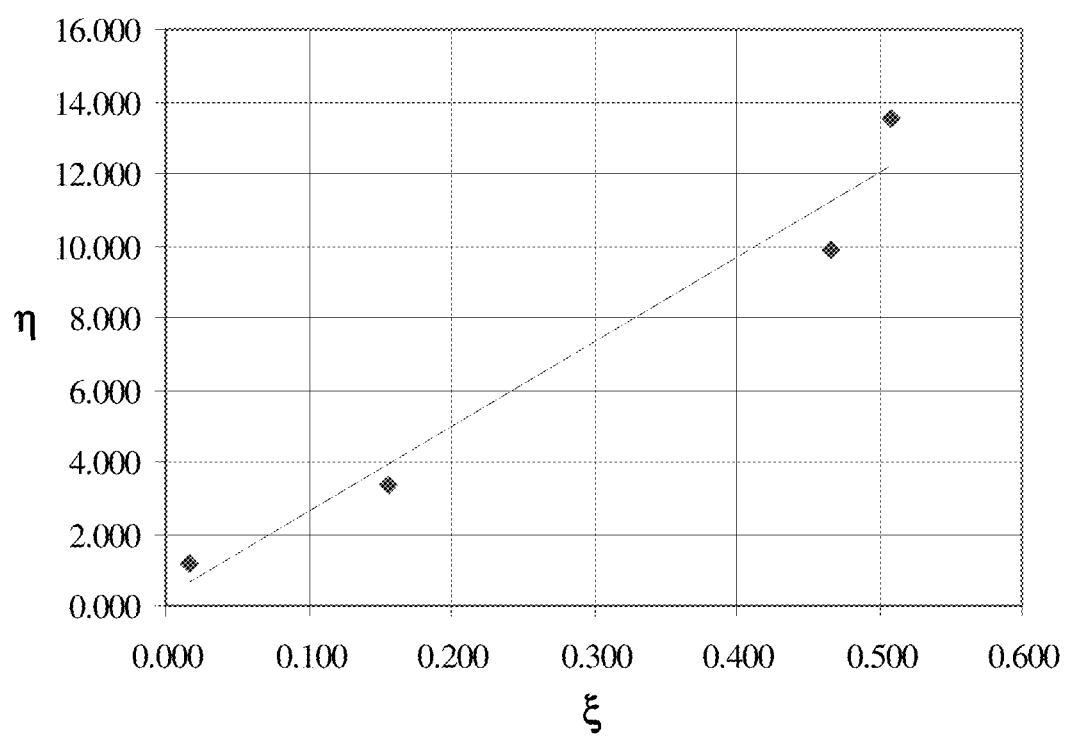
FIG. 5 shows the η-ξ plot generated using the conversion data.

FIG. 5 shows the η-ξ plot generated using the conversion data. At α=1 the intercept is equal to the reactivity ratio of alloocimene ($r_{Allo}$). The intercept is clearly around zero ($r_{Allo}$=0) indicating that in hexane alloocimene is unable to undergo readily a homo-polymerization step. As the intercept proved to be zero, the slope is equal to the reactivity ratio of butadiene ($r_{BD}$). The slope is approximately 24 ($r_{BD}$=24). This means that the BD capped growing anion is 24 times more likely to undergo a homo-polymerization step than to cross over to alloocimene.

This finding is in line with limited information available in the literature. Homopolymer of alloocimene can only be made in the presence of a polar solvent (such as THF) via anionic polymerization. However, this does not prevent copolymerization accordingly to the present results. Incorporation of alloocimene can be increased by continuous polymerization or by forced ideal copolymerization technique. The forced ideal copolymerization is based on the slow addition of monomers. Under this monomer starved condition, incorporation of alloocimene is forced by the low concentration of butadiene. Alternatively a polar solvent can be used or a more suitable modifier should be found.

Figure 6:
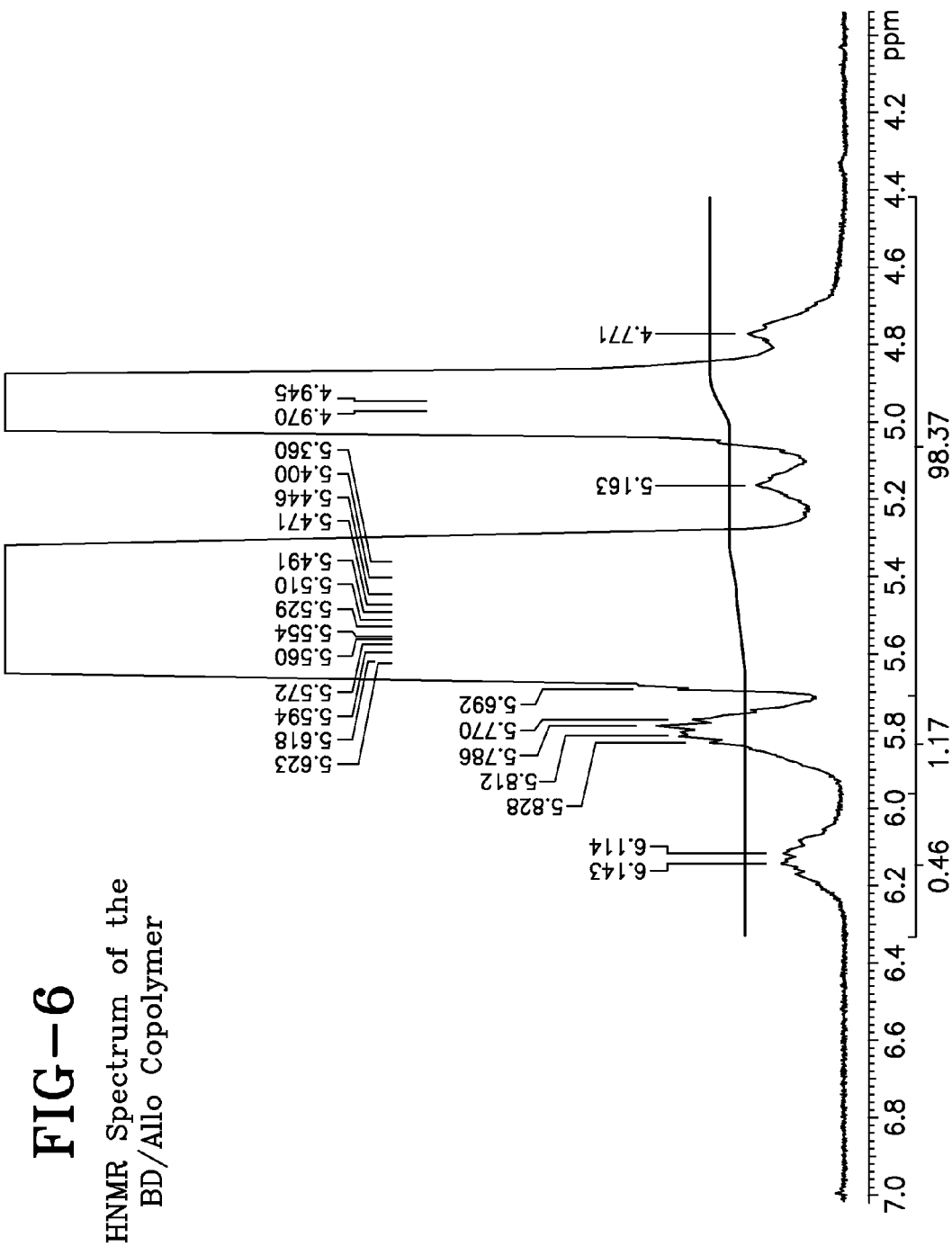
FIG. 6 shows the HNMR spectra of a drum dried sample.

Physical properties of the control containing no alloocimene and the copolymer are listed in Table II. The Mooney and the number average molecular weight of the polymers are very close to each other. The molecular weight distribution of the copolymer is broader. $T_g$ and composition are also close to identical. The alloocimene content is based on the conversion measured by GC. From this, the number of alloocimene units per chain could be estimated giving a number of about 17. However, the actual conjugated diene content of the copolymer could not be quantified by HNMR spectroscopy due to their low concentration, overlapping, and broad resonances. However, the presence of conjugated diene structure in the BD/Allo copolymer could be confirmed by $^1$HNMR. FIG. 6 shows the HNMR spectra of a drum dried sample. The broad multiple resonances in the 6-6.2 ppm range are characteristic to conjugated dienes.

TABLE II

Physical Properties of the Polymers

| | | Control | BD-Allo Copolymer |
|---|---|---|---|
| Allo Content | [mol %] | 0 | 0.2 |
| Allo/Chain | | 0 | 17 |
| Mooney | | 74.5 | 73.5 |
| Mn | [kg/mol] | 499 | 488 |
| Mw/Mn | | 1.01 | 1.14 |
| Tg onset | [° C.] | −25 | −25 |
| Tg Inflection | [° C.] | −21 | −22 |
| 1,4-BD | [wt %] | 19 | 18 |
| 1,2-BD | [wt %] | 79 | 80 |
| Cyclic DVCH | [wt %] | 2 | 2 |

Figure 7:
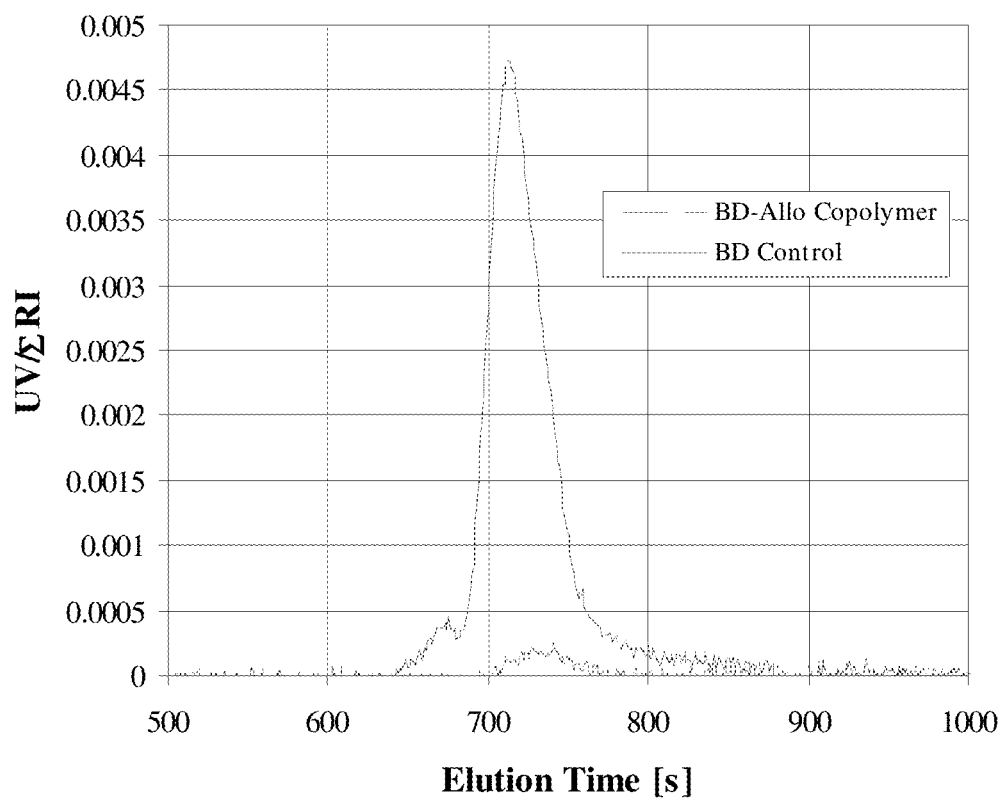
FIG. 7 shows proof of the presence of conjugated diene units in the copolymer

Presence of the conjugated diene units was confirmed by GPC using the UV and RI detectors. UV measurements were done at 220 nm. At this wavelength the poly-butadiene control is practically transparent. This is shown by FIG. 7. In contrast the copolymer shows a very strong absorption at the wavelength characteristic to conjugated dienes. The UV signal of both polymers was normalized by the cumulative RI signal in order to eliminate concentration effect.

Cure of BD-Allo Copolymers and Isoprene-Allo Copolymers with Dienophiles

Additional evidence of the presence of conjugated diene units in the copolymer was obtained by the reaction of the polymer with bifunctional dienophiles. Scheme 1 shows the chemicals structure of the bifunctional dienophiles used. Compounds were prepared by pressing 5 g of polymer to a sheet, folding the dienophile in this sheet and repeating the sheeting folding twelve times in a press heated to 110° C. Cure activity of compounds was measured at 160° C. using 7% strain.

Scheme 1 Chemical Structure of the Bifunctional Dienophiles Used.

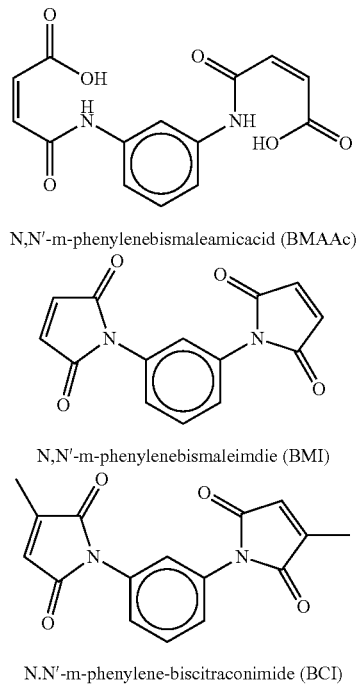

N,N′-m-phenylenebismaleamicacid (BMAAc)

N,N′-m-phenylenebismaleimdie (BMI)

N,N′-m-phenylene-biscitraconimide (BCI)

Figure 8:
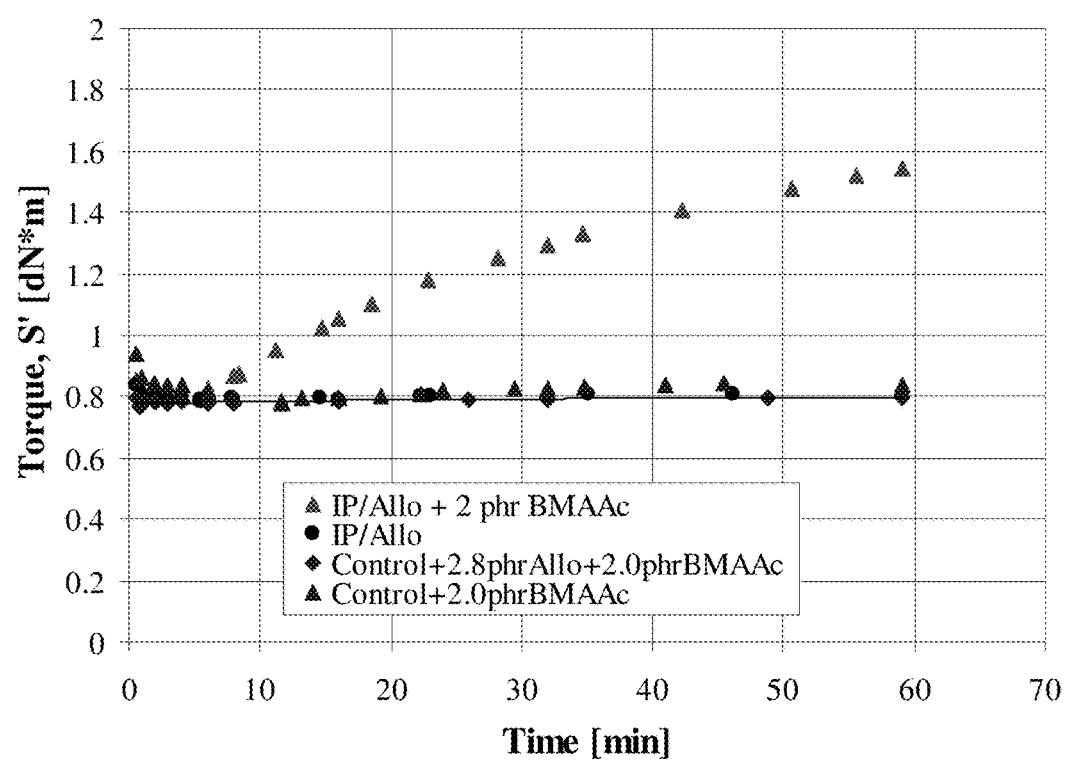
FIG. 8 shows the recorded cure curves of the IP/Allo copolymer, IP/Allo copolymer mixed with 2 phr BMAAc, the control polymer mixed with 2 phr BMAAc, and the control polymer mixed with 2.8 phr Allo monomer and 2.0 phr BMAAc.

Out of the three dienophiles the most unambiguous results were obtained with BMAAc. FIG. 8 shows the recorded cure curves of the IP/Allo copolymer, IP/Allo copolymer mixed with 2 phr BMAAc, the control polymer mixed with 2 phr BMAAc, and the control polymer mixed with 2.8 phr Allo monomer and 2.0 phr BMAAc. Out of the four samples only the IP/Allo copolymer mixed with 2.0 phr BMAAc shows a rise in torque indicating that the maleamic groups of BMAAc undergo a Diels Alder addition with the conjugated diene groups arising form the favorable incorporation of Allo into the copolymer. The copolymer on its own shows no significant torque increase. Similarly, the control copolymer mixed with BMAAc or a mixture of BMAAc and Allo monomer has no cure activity. In the latter case, Allo monomer was added to ensure that the cure activity of the copolymer mixed with BMAAc is not due to the presence of small amount of unreacted Allo.

It has to be pointed out that the cure activity of the copolymer with BMAAc is not necessarily a result of the reaction of BMAAc on both sides as BMAAc was in a relative large excess over the conjugated diene content of the copolymer. It is possible that crosslinks are formed by H bonding of the once reacted BMAAc or via intermolecular reaction of the unreacted pendant maleamic acid groups.

It should be noted that the control polymer torque values were higher than that of the copolymer due to its higher molecular weight (Mooney). Therefore S' values of the control was reduced by 0.75 dN*m in case of the Control+BMAAc sample and 0.3 dN*m in case of the Control+Allo+BMAAc sample in order to aid comparison.

Functionalization of Allo Copolymers for Silica Polymer Interaction

This section summarizes the work done in order to prove that silica interactive groups can be attached to the IP/Allo and BD/Allo copolymers made by anionic polymerization. For the study BMAAc and maleamicacid (MAAc) were used as dienophiles to be attached to the conjugated diene groups of the copolymers. These were chosen as stronger dienophiles (MI, MAnh) have the ability to undergo "copolymerization" as indicated by scheme 2 (see R. N. Datta, A. G. Talma, A. H. M. Schotman: "Comparative Study of the Crosslinking of bis-Maleimides and bis-Citraconimides in Squaline and Natural Rubber", Rubber Chem. & Techn., 1073-1086, 71 (1998)). In addition, the —NH and COOH groups of BMAAc and MAAc can interact with silica via H bonding in addition to polar-polar interaction.

Scheme 2 Reaction Pathway of BMI and MI Crosslinking

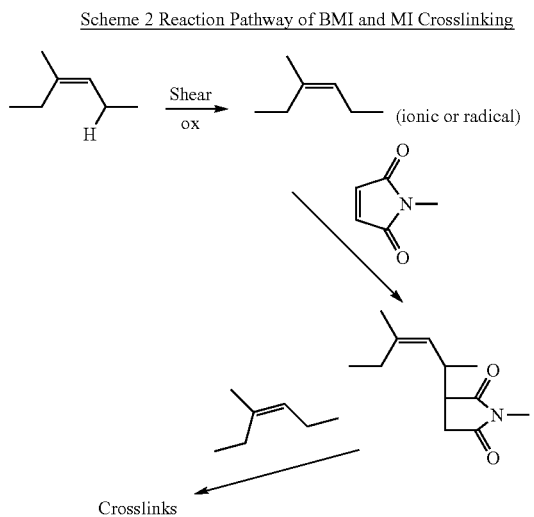

Crosslinks

Copolymers were functionalized and mixed with silica and oil in a 3-piece 75 mL CW Brabender mixer equipped with Banbury rotors and using 70% fill factor. Modifiaction was carried out using 170° C. start temperature. The polymers were mixed with the dienophile and 1 phr Wingstay® K phenolic antioxidant for 3 minutes at 60 rpm rotor speed. The antioxidant was added in addition of the 0.25 phr BHT added to the isoprene polymers and 0.5 BHT added to the PBD polymers after the termination of the polymerization top prevent polymer degradation during the functionalization.

The modified polymers were mixed with 50 phr silica and 20 phr oil in case of IP-Allo copolymer and 30 phr oil in case of BD/Allo copolymer. The compounds were tested for silica interaction using an RPA 2000 made by Alpha Technology. The compound was first heated to 100° C. or 160° C. and torque increase was monitored as a function of time using 1 Hz and 0.48% strain in order to determine the rate of the filler flocculation. Subsequently the compound was cooled down to 40° C. and a strain sweep was carried out using 1 Hz in order to determine the Payne effect, the strain dependence of G', G" and tan δ.

Figure 9:
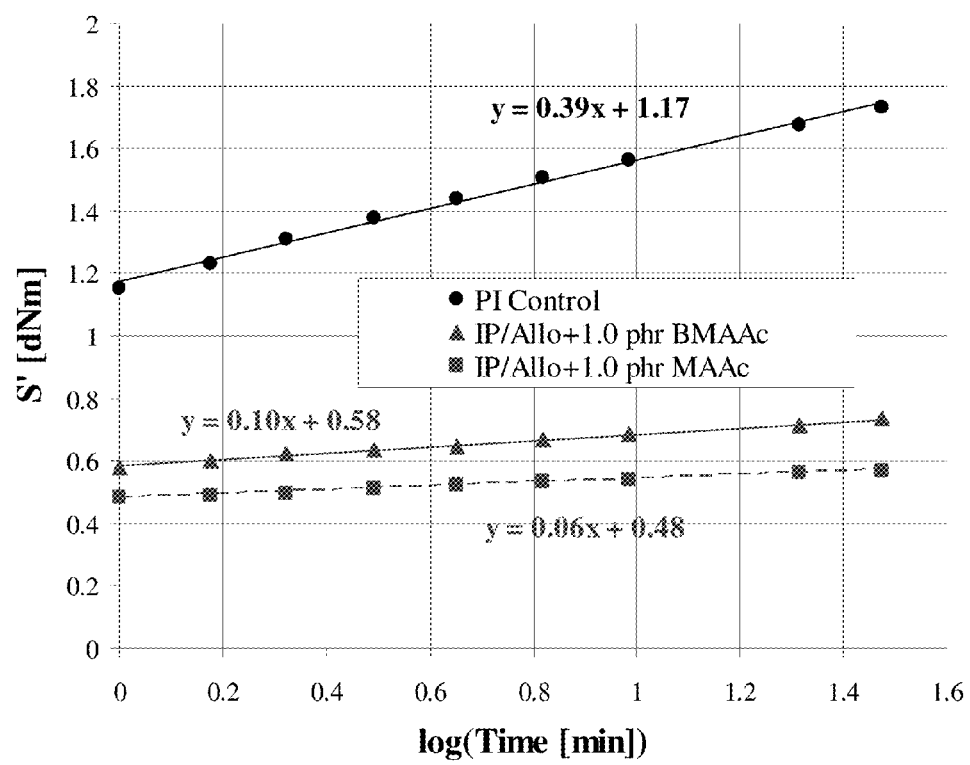
FIG. 9 shows the increase of stiffness (S') of the silica filled control compound and the IP-Alloocimene copolymer measured at a low strain as the function of log time.

FIG. 9 shows the increase of stiffness (S') of the silica filled control compound and the IP-Alloocimene copolymer measured at a low strain as the function of log time. Increase of torque is related to the formation of filler-filler network and/or polymer bridges between filler particles. Time is plotted on log scale as it has been found that the modulus recovery is linear on the log time plot, it does not follow the anticipated exponential recovery. The control as well as the IP-Allo compound shows a good linear relationship with log time. However, the slopes of the IP-Allo compounds functionalized with BMAAc and MAAc is about 75%-85% lower indicating a stronger interaction between polymer and filler and thereby preventing the filler flocculation.

Figure 10:
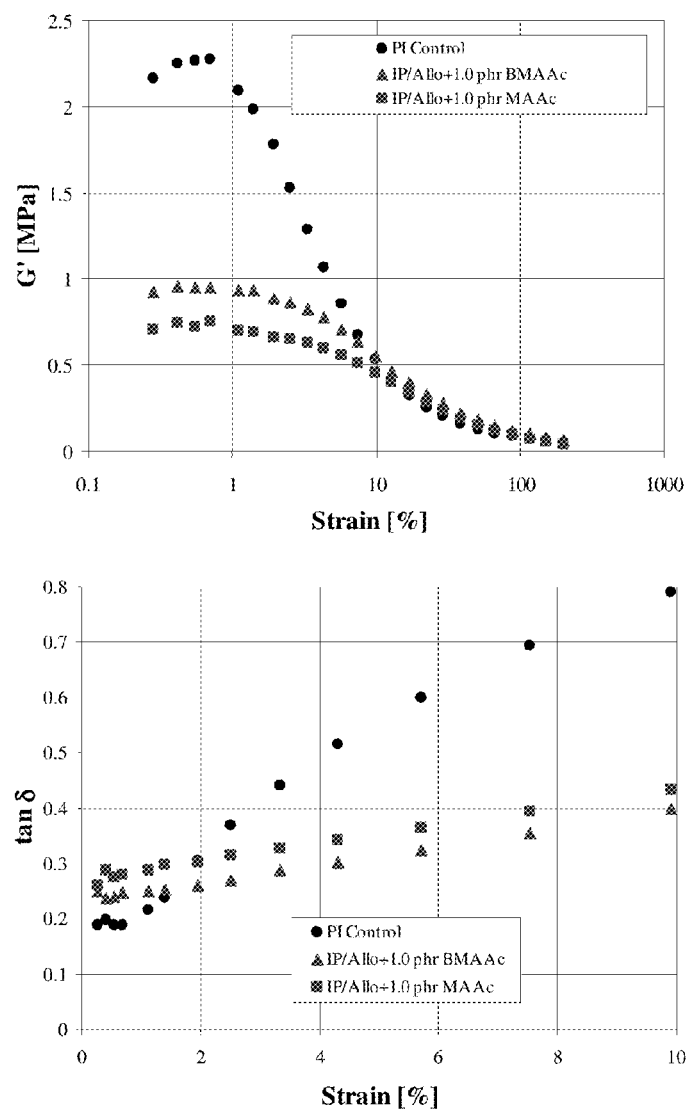
FIG. 10 shows the effect of BMMAc and MAAc functionalization of IP/Allo copolymer on the strain sependence of G' and tan δ.

The strain dependence of G' and G" was also significantly reduced in case of the functionalized samples. In addition tan δ of these polymers was measured to be lower compared to the control polymer at strains exceeding 2% and difference increased with increasing strain. FIG. 10 shows the results.

Figure 11:
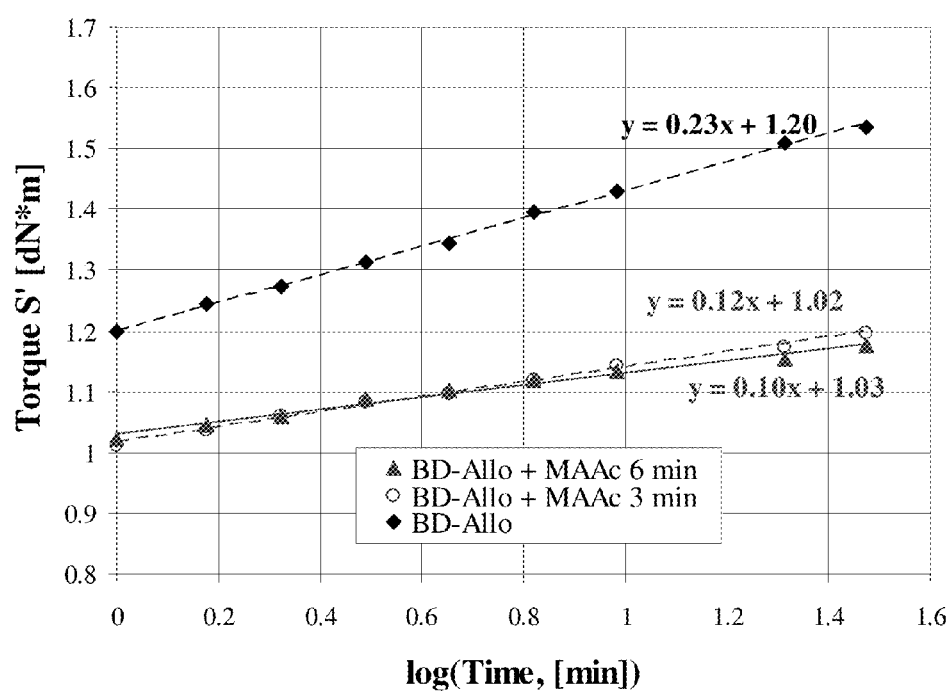
FIG. 11 shows the effect of BMMAc and MAAc functionalization of BD/Allo copolymer on the rate of filler agglomeration.
Figure 12:
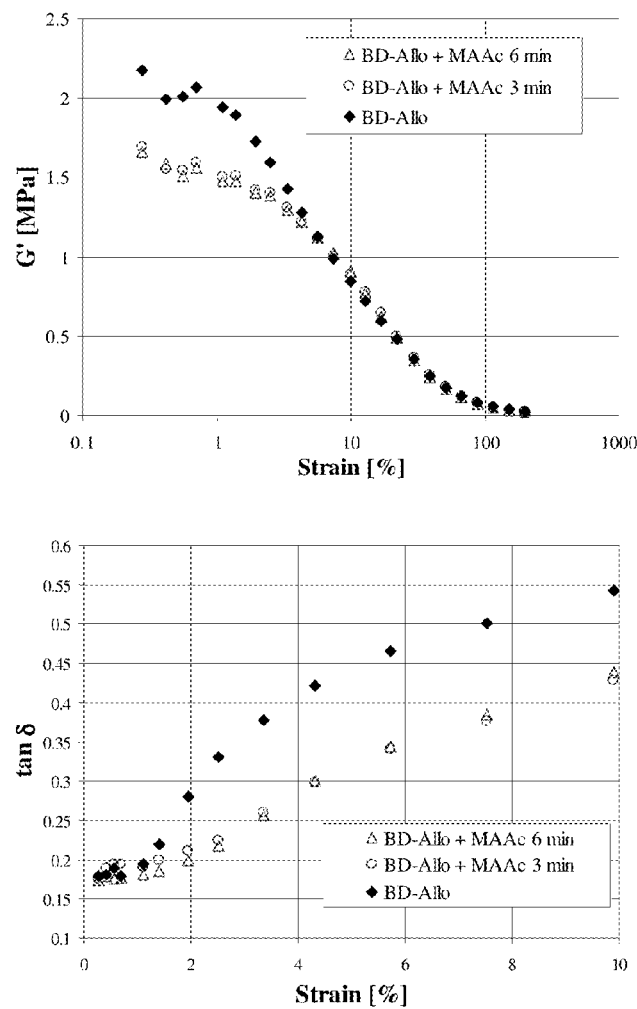
FIG. 12 shows the reduction of G' at low strain as well as tan δ at higher strains.

Similar results were obtained by the MAAc functionalization of the BD/Allo copolymer as shown by FIGS. 11 and 12. The filler flocculation in this case was carried out at lower temperature (100° C.) to avoid crosslinking at higher temperature characteristic to high vinyl PBD. As a result difference in filler flocculation and strain dependence of G' and G" was less pronounced compared to the IP samples. Nevertheless, the S'-log time slope of the MAAc functionalized BD-Allo copolymers was measured to be 50% lower than that of the unmodified copolymer (see FIG. 11). Reduction of G' at low strain as well as tan δ at higher strains is clearly present as shown by FIG. 12.

Figure 13:
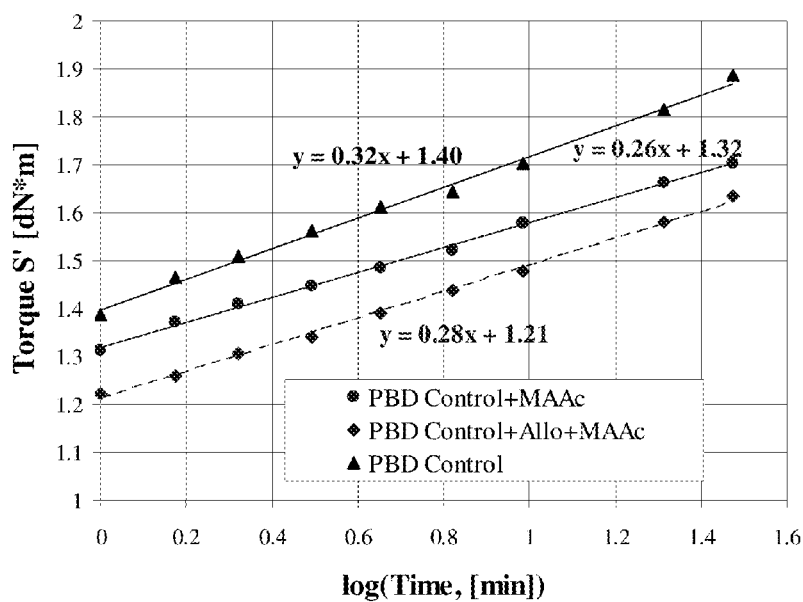
FIG. 13 shows the strain dependence of G' and tan d of silica compounds made with the PBD control polymer mixed with MAAc and a mixture of MAAc and Allo monomer.
Figure 14:
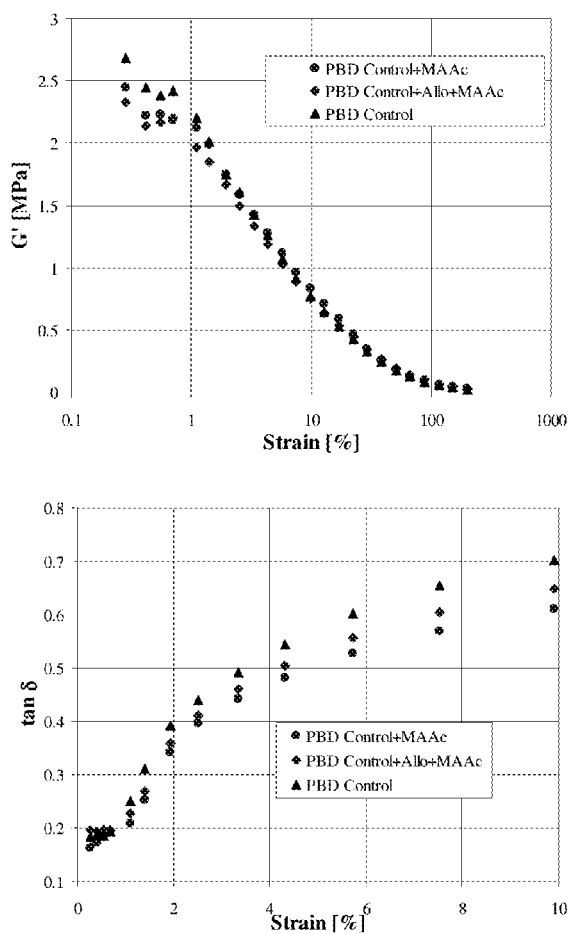
FIG. 14 shows the rate of filler agglomeration obtained with the PBD control polymer after mixing it with MAAc and a mixture of MAAc and Allo monomer.

As a comparative example the BD control polymer made in the absence of Allo was also mixed with MAAc as well as a mixture of Allo and MAAc in order to demonstrate that the addition of these to high vinyl PBD does not result in reduced rate of filler agglomeration or reduction of Payne effect. FIGS. 13 and 14 clearly show that indeed there is no significant difference between the silica mixes made with the control polymer and the control polymer mixed with the dienophile or the dienophile Allo mixture.

Example 3

This example illustrates that silica reactive functional group such as triethoxysilane can be attached to the IP/Allo copolymer via Diels Alder reaction. The chemical strategy envisioned is illustrated by Scheme 3. The reactions were carried out in a single mix cycle using stepwise addition of chemicals. For the reaction equimolar maleic anhydride (MAnh) and 3-aminopropyltriethoxysilane (APT) were used. Amounts were set at 1 mol % to the isoprene content of the copolymer containing 0.27 mol % incorporated Allo units.

Scheme 3 Functionalization of IP/Allo Copolymer

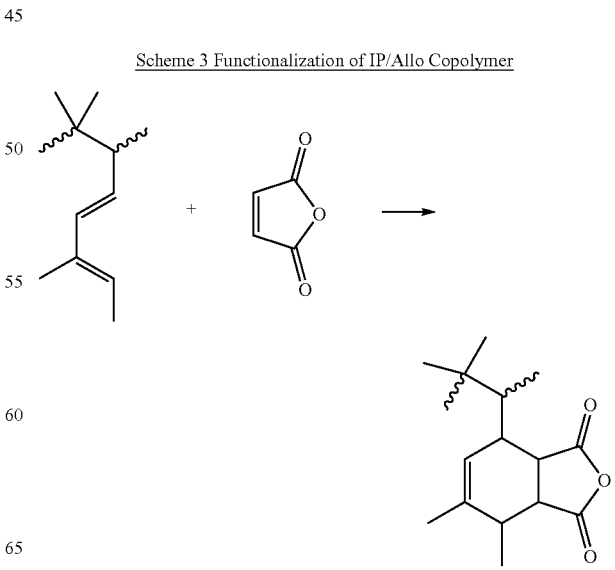

-continued

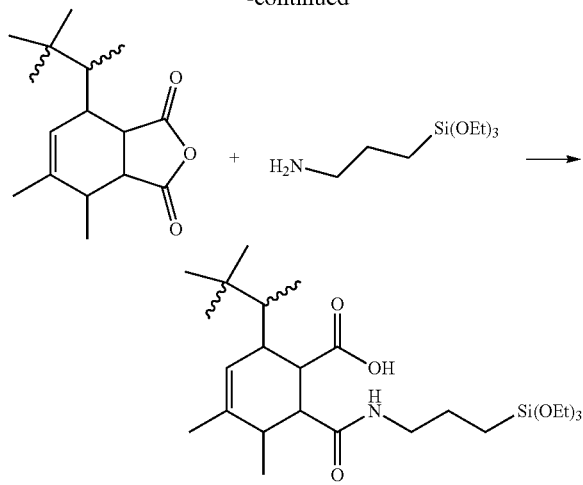

First the copolymer and maleic anhydride (MAnh, 1.44 phr) were added to the mixer which was preheated to 130° C. These were mixed for 2 minutes using 60 rpm rotor speed. Subsequently a mixture of silica (65 phr) oil (20 phr) and 3.26 phr APT was added and mixing was continued for 6 more minutes. Subsequently, the compound was pressed to a sheet and remixed using the same conditions and 3 minutes mixing time. A compound was also made using the IP/Allo copolymer to which no MAnh or APT was added.

In addition two control compounds were made using the polyisoprene (PI) control polymer. They were prepared under identical conditions to that of the IP/Allo copolymers. To one compound only silica and oil was added and to the other MAnh and APT were added in addition to the silica and oil in an exact same way as the IP/Allo copolymer was functionalized.

Subsequently the compounds were tested to determine the rate of filler "agglomeration" and the strain dependence of storage (G') and loss modulus (G"). Both measurements were carried out at 100° C.

TABLE III

Slope and intercept values obtained
by linear fit of the measurement points.

|  | Slope | Incpt |
|---|---|---|
| IP/Allo | 0.95 | 3.24 |
| IP/Allo + MAnh + APT | 0.43 | 1.51 |
| PI | 0.83 | 3.41 |
| PI + MAnh + APT | 0.76 | 2.99 |

Figure 15:
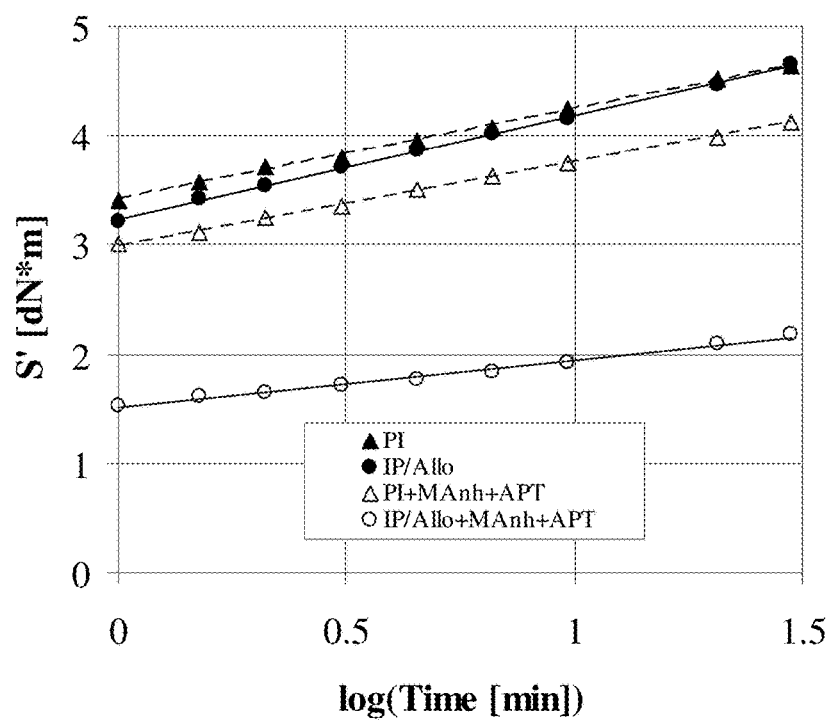
FIG. 15 shows the effect of IP/Allo copolymer functionalization on the rate of filler agglomeration.

The PI control polymer and IP/Allo copolymer gave very similar torque values as well as rate of torque increase. The MAnh/APT treated PI control polymer gave similar results albeit somewhat lower starting torque value and slope. In contrast the MAnh/APT modified copolymer gave significantly lower initial torque and reduced rate of filler agglomeration (see FIG. 15). Table III contains the slope and intercept values derived form the linear fit of the measured points. While both values are similar for the unmodified polymers (PI/Allo and PI) as well as the MAnh/APT treated PI control polymer, the IP/Allo polymer gave significantly lower values. The initial torque (measured at 1 min) is about half of the rest of the compounds and so is the slope, i.e., the rate of filler agglomeration. This difference strongly supports that the proposed polymer filler bonding could be achieved in case of the IP/Allo copolymer. MAnh reacted with the conjugated double bonds of the IP/Allo copolymer, formed and adduct with APT and the triethoxysilane silane group of APT reacted with the OH groups of the silica.

Figure 16:
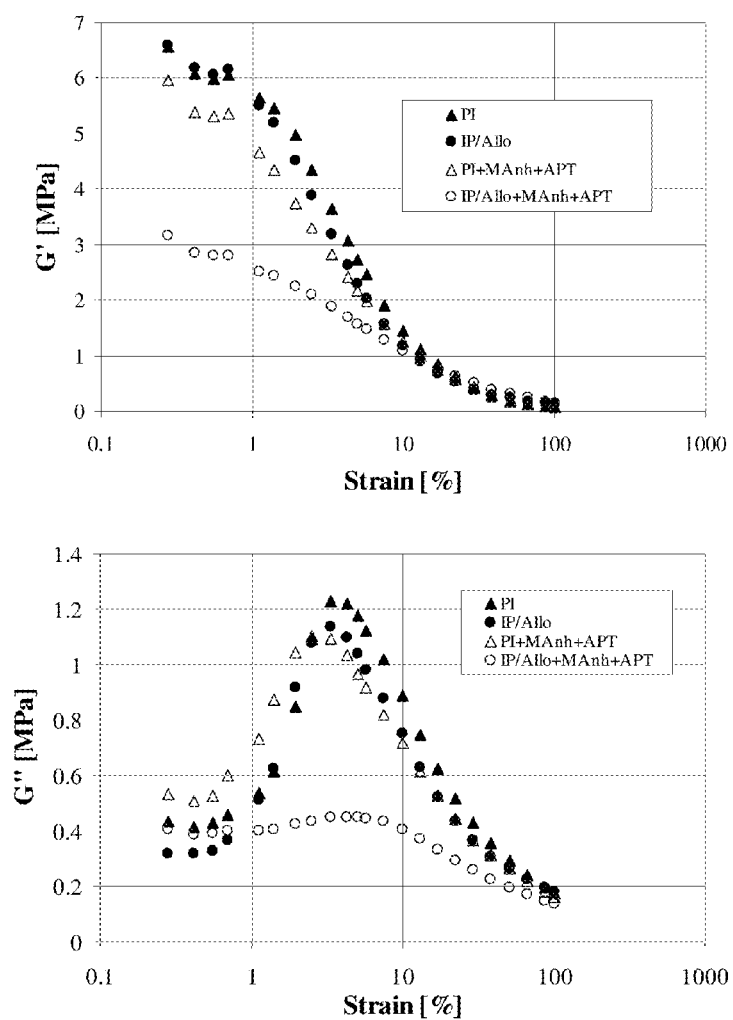
FIG. 16 shows that in addition to the retarded filler agglomeration of the MAnh/APT treated IP/Allo copolymer the treatment also resulted in a significantly reduced Payne effect.

FIG. 16 shows that in addition to the retarded filler agglomeration of the MAnh/APT treated IP/Allo copolymer the treatment also resulted in a significantly reduced Payne effect. In other words, the MAnh/APT treated IP/Allo copolymer significantly reduced the strain dependence of G' and G" compared to the compounds containing only silica and oil. Furthermore, the addition of MAnh and APT to the control PI polymer did not result in such a strong reduction of the Payne effect.

The magnitude of Payne effect is customarily expressed by calculating the ratio of the modulus measured at low amplitude (LAM) and at high amplitude (HAM). For this the modulus measured at 0.48% strain and 100% strain was selected. Table IV lists the numerical values obtained.

TABLE IV

Effect of IP/Allo Copolymer Functionalization
on the Ratio of Low and High Amplitude Modulus.

|  | LAM(0.48%)/HAM(100%) | % |
|---|---|---|
| IP/Allo | 51 | 100 |
| IP/Allo + MAnh + APT | 18 | 36 |
| PI | 74 | 100 |
| PI + MAnh + APT | 74 | 100 |

The reduced Payne effect is an additional evidence for the improved interaction achieved by the MAnh/APT modification of the IP/Allo copolymer. Compared to the IP/Allo sample made with silica and oil only, the LAM/HAM ratio was reduced by 64%. In contrast the LAM/HAM ratio remained the same when the PI control polymer was treated in a similar way.

Filler polymer bonding is also expected to reduce energy loss under cyclic strain which is directly related to properties such as rolling resistance. Energy loss at constant strain is directly proportional to G". Based on FIG. 16 (left side plot) energy loss is significantly reduced by the described functionalization method of the IP/Allo copolymer. Difference between the modified IP/Allo copolymer and the rest of the samples is most significant in the mid strain range (1-10%) which is the most significant from a tire application perspective.

Figure 17:
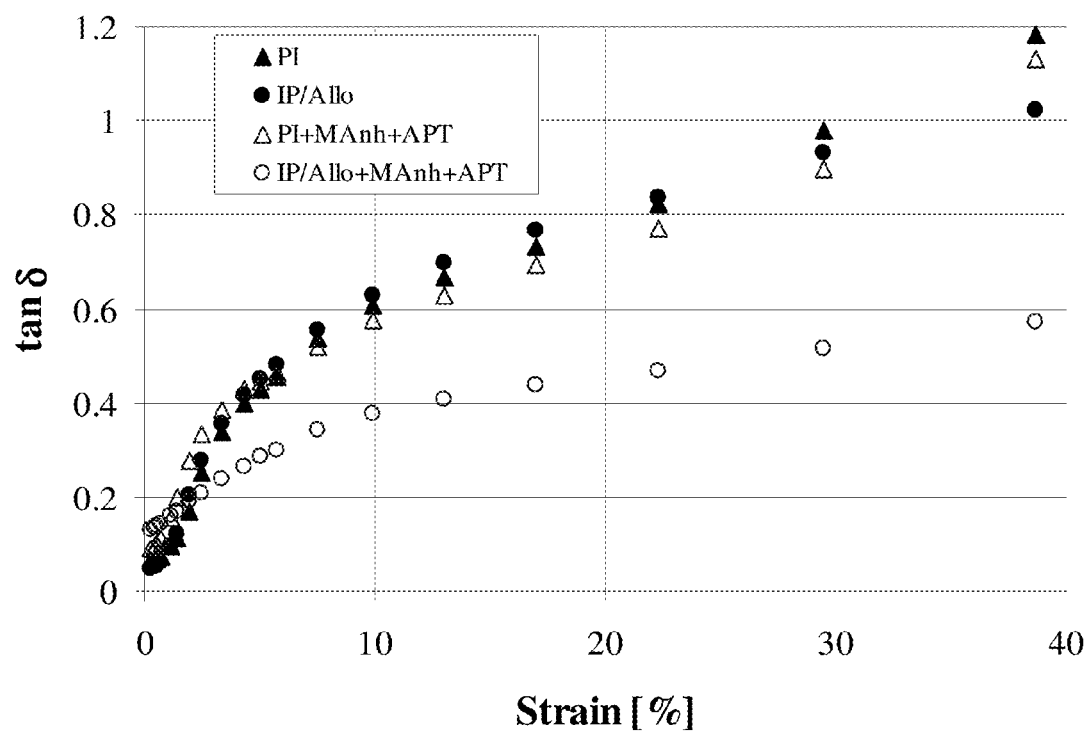
FIG. 17 shows that the energy loss can be significantly reduced by the MAnh/APT treatment of the IP/Allo copolymer.

Energy loss (at constant energy input) on the other hand is directly proportional to the tangent value of the phase angle (tan δ), i.e., the ratio of G"/G'. FIG. 17 shows that the energy loss can be significantly reduced by the MAnh/APT treatment of the IP/Allo copolymer. Numerical values showing energy loss at different strains are shown in Table V.

TABLE V

Effect of IP/Allo Copolymer Functionalization on
the Energy Loss in the Moderate Strain Range.

|  | tan δ @ 5% strain | | tan δ @ 10% Strain | |
|---|---|---|---|---|
|  | Value | % Change | Value | % Change |
| IP/Allo | 0.45 | 100 | 0.63 | 100 |
| IP/Allo + MAnh + APT | 0.29 | 63 | 0.38 | 60 |
| PI | 0.43 | 100 | 0.61 | 100 |
| PI + MAnh + APT | 0.45 | 104 | 0.58 | 95 |

Example 4

In this experiment butadiene-allo copolymers were compounded with dienophiles, fullerenes, carbon black, and green compound properties as well as cured physical properties were examined. The ability of the conjugated diene units of BD/Allo copolymer to react with dienophile was first tested using N,N'-m-phenylene-biscitraconimide (BCI):

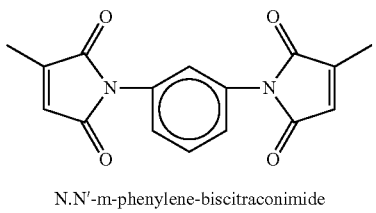

N,N'-m-phenylene-biscitraconimide

BCI was chosen instead of N,N'-m-phenylene-bismaleimide (BMI) as BMI is known to undergo 1,2 crosslinking, homopolymerization, co-polymerization as well as Michael addition during cure. BCI is less prone to these side reactions and it mainly reacts via Diels-Alder reaction with the conjugated dienes and trienes forming during the reversion stage of the sulfur vulcanization (see R. N. Datta, A. G. Talma, A. H. M. Schotman: Comparative Study of the Crosslinking of bis-Maleimides and bis-Citraconimides in Squaline and Natural Rubber, Rubber Chem. & Techn., 1073-1086, 71 (1998)).

Figure 18:
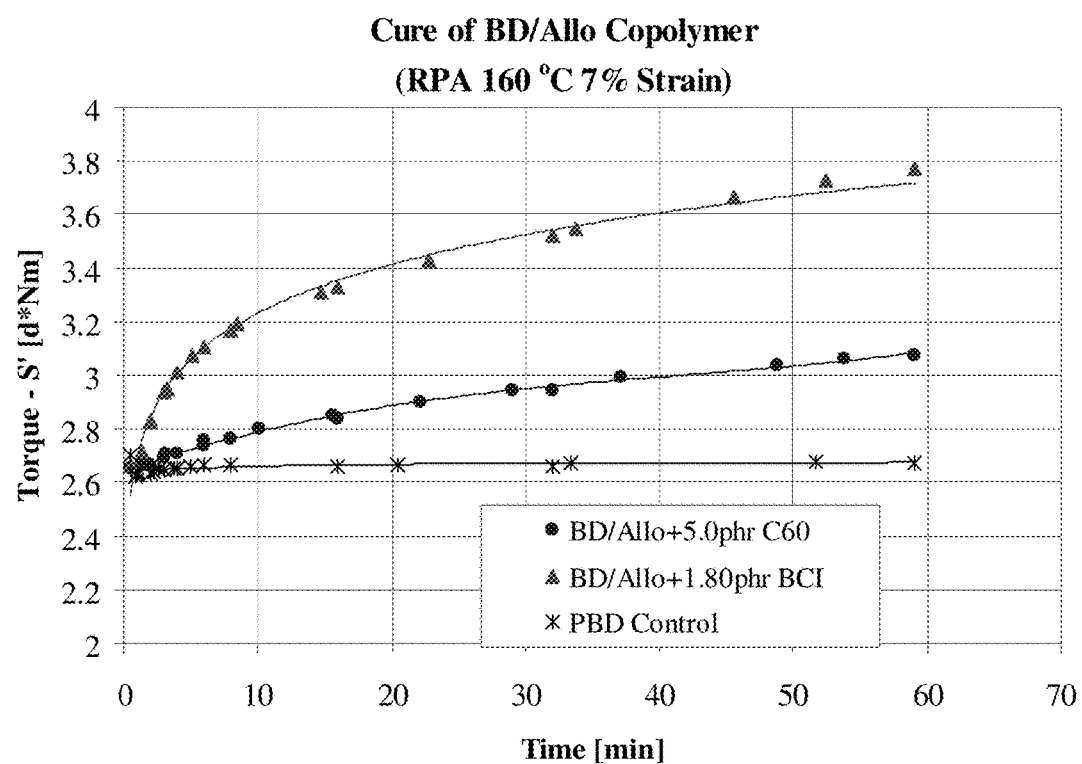
FIG. 18 shows the obtained torque curve along with that of the BD/Allo copolymer and BD control.

In the procedure used 5 grams of polymer was compounded with 1.8 phr BCI in a press at 235° C. by repeated folding. Cure activity was measured at 160° C. using 7% strain. FIG. 18 shows the obtained torque curve along with that of the BD/Allo copolymer and BD control. According to FIG. 18, BCI resulted in an immediate rise in the torque due to the crosslinking reaction between the citraconimide groups and the conjugated diene units of the BD/Allo polymer. Compared to this, the control showed no change in torque and the BD/Allo copolymer a slight torque increase only. This might be related to some crosslinking reaction occurring between two conjugated diene units.

In addition to BCI, the copolymer was also compounded with 5 phr $C_{60}$ Buckey balls. Very interestingly this also resulted in some torque increase and in fact the sample became insoluble. This seems to prove that the conjugated diene units can react with fullerene like structures.

For the proof of concept a small particle size, high surface area and oil adsorption ASTM carbon black N121 was chosen assuming that the concentration of fullerene like structures is relatively high in this carbon black. Mixes were carried out using the 75 mL 3-Piece CB Brabender mixer head equipped with Banbury blades. The non-productive mixes were carried out using 140° C. starting temperature, 60 rpm and 73% fill factor. The productive mixes were carried out using 60° C. starting temperature, 60 rpm and 73% fill factor. 20 phr oil had to be added to the non-productive mixes as in the absence of oil at 50 phr carbon black loading the compounds turned powdery due to the high molecular weight and narrow molecular weight distribution of the polymers. For the productive mixes the following recipe was used:

TABLE VI

| Cure Package | |
| --- | --- |
| Ingredient | Amount [phr] |
| Accelerator | 1.50 |
| Sulfur | 1.00 |
| Antioxidant | 0.50 |
| ZnO | 3.00 |
| Stearic Acid | 1.00 |

The ability of incorporated conjugated diene containing alloocimene units to react with N121 was first tested on the green compounds. Difference in interaction between the copolymer and the control was determined using filler flocculation measurement and by measuring the strain dependence of storage and loss modulus (Payne effect).

Increase of compound stiffness as well as electric conductivity of uncured black compounds upon storage or elevated temperatures is well known effect (see Bulgin, D., Trans. Inst. Rubber Ind., 21, 188 (1945) and Fletcher, W. P., and Gent, A. N., Trans. Inst. Rubber Ind., 29, 266 (1953)). It is generally attributed to the flocculation of the filler. The magnitude of this effect appears to increase with poorer dispersion, increasing temperature or decreasing molecular weight (see Bohm, G. G. A., and Nguyen, M. N., J. Applied Poly. Sci., 55, 1041 (1995)). Filler flocculation is strongly effected by the type of the filler, filler surface treatment and in general polymer-filler interaction (see Lin, J., Hergenrother, W. L., Alexanian, and E., Bohm, G. G. A., Rubber Ckem. & Techn., 75, 865 (2002) and Lin, J., Hogan, T. E., and Hergenrother, W. L., Paper No. 58, Presented at a meeting of the Rubber Division, American Chemical Society, San Francisco, Calif., Apr. 28-30 (2003)). Increasing polymer-filler interaction reduces the rate of flocculation by restricting aggregate movement and/or formation of additional polymer bridges between aggregates (see G. A. Schwartz, S. Cerveny, A. J. Marzocca, M. Gerspacher, and L. Nikiel, Polymer 44, 7229-7240 (2003)). Therefore, measurement of compound stiffness provides an assessment of the filler-polymer interaction. Reduced increase of S' with time indicates stronger polymer-filler interaction.

The decrease of storage and loss modulus (G' and G") with increasing strain was first studied by Payne (see A. R. Payne, J. Appl. Polym. Sci., 6, 57 (1962)). It is generally associated with the breakdown and agglomeration of filler particles. Filler-matrix interactions are also thought to be contributing factors to the Payne effect. Such processes are the slippage of entanglements between bound rubber and the mobile rubber phase, molecular surface slippage or rearrangement and release of trapped rubber within the filler network (see G. Heinrich, and M. Kluppel, Advances in Polymer Science, 160, 1436-5030 (2002) and S. S. Sternstein, and Ai-Jun Zhu, Macromolecules, 35, 7262-7273 (2002) and Ai-Jun Zhu, and S. S. Sternstein, Composite Science and Technology, 63, 1113-1126 (2003)). The magnitude of strain dependence of dynamic moduli increases with decreasing molecular weight and strongly reduced by increasing polymer-filler interaction, e.g., by the use of coupling agents (see J. D. Ulmer, W. L. Hergenrother, and D. F. Lawson, Rubber Chem. & Techn., 71(4), 637-667 (1998) and C. Gauthier, E. Reynaud, R. Vassoille, and L. Ladouce-Stelandre, Polymer, 45, 2761-2771 (2003)). Therefore, measurement of Payne effect is highly suitable to quantify polymer-filler interactions.

Figure 19:
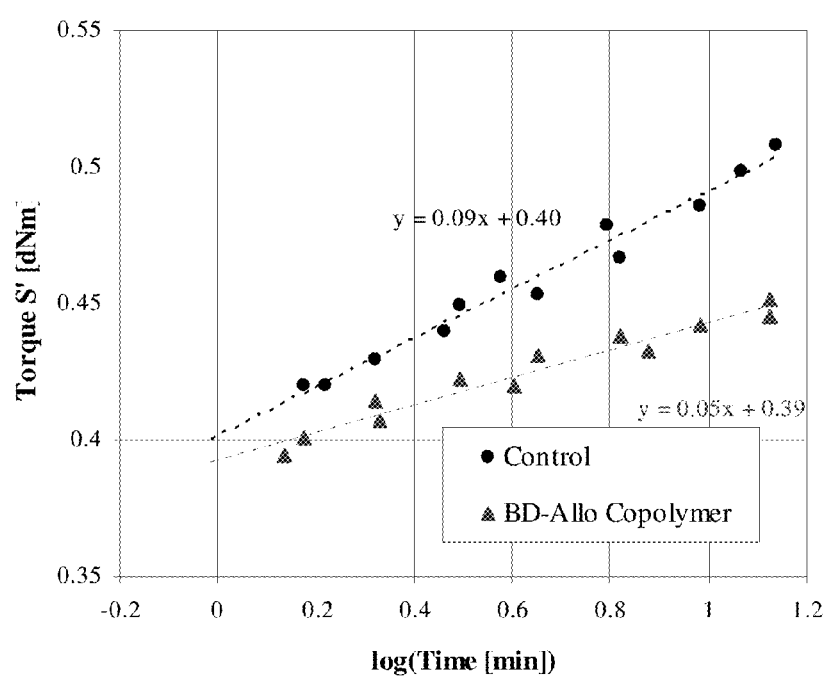
FIG. 19 shows the increase of stiffness (S') of the control compound and the BD-Alloocimene copolymer measured at a low strain as the function of log time.

FIG. 19 shows the increase of stiffness (S') of the control compound and the BD-Alloocimene copolymer measured at a low strain as the function of log time. Time is plotted on log scale as it has been found that the modulus recovery is linear on the log time plot, it does not follow the anticipated exponential recovery. The control as well as the BD-Alloocimene compound shows a good linear relationship with log time. However, the slope of the BD-Alloocimene compound is about 40% lower indicating a stronger interaction between polymer and filler.

Following the 16 min and 160° C. heat treatment of the compounds at low strain, a strain sweep was conducted at 100° C. in order to determine difference in the strain dependence of elastic and storage modulus (Payne effect). Results are shown by FIGS. 20 and 21.

Figure 20:
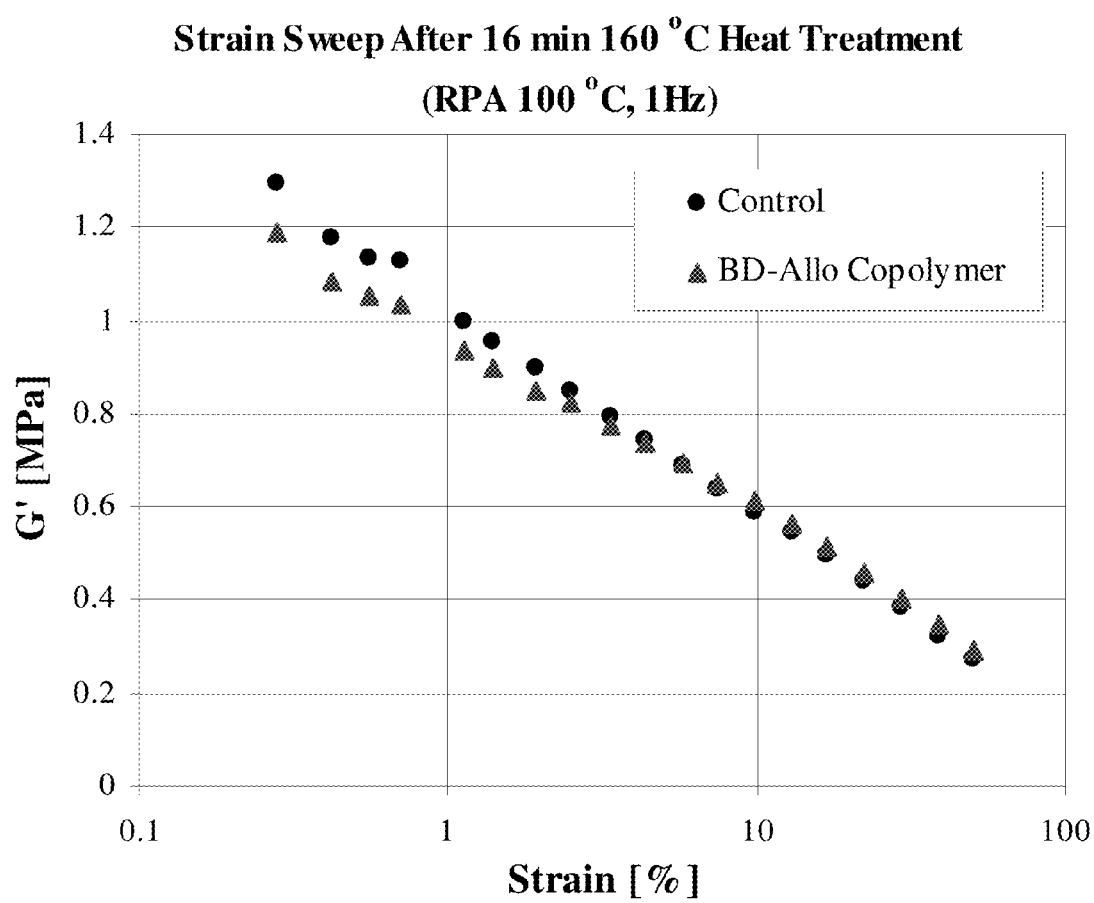
FIG. 20 shows the effect of incorporated Alloocimene units on the strain dependence of G'.
Figure 21:
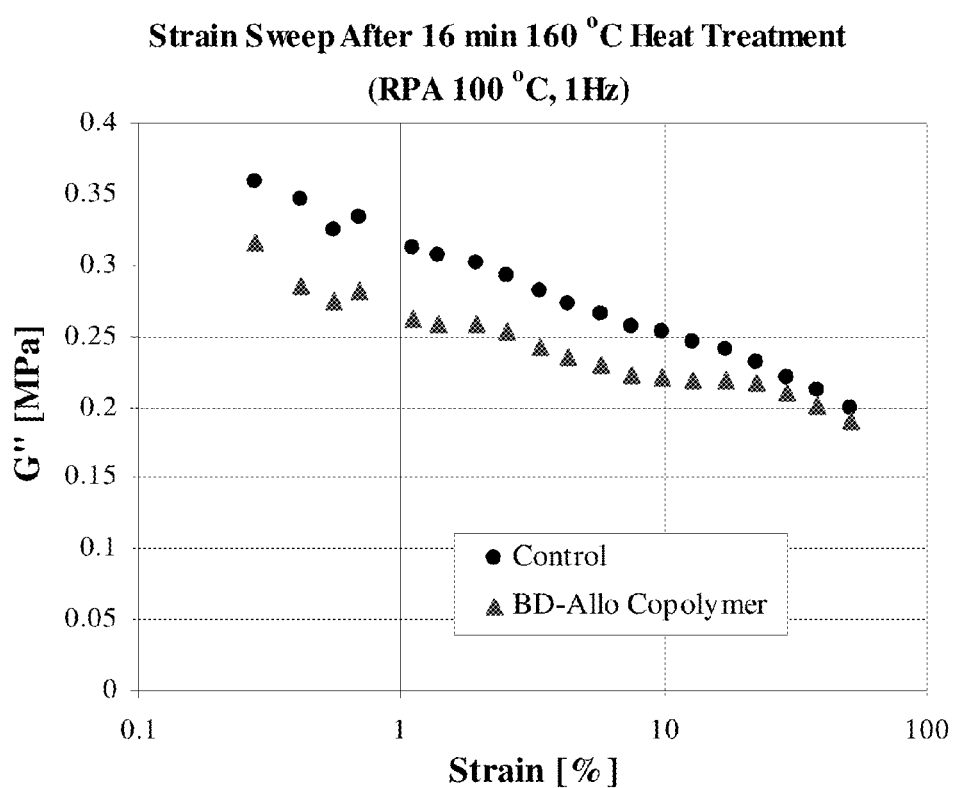
FIG. 21 shows the effect of incorporated Alloocimene units on the strain dependence of G".
Figure 22:
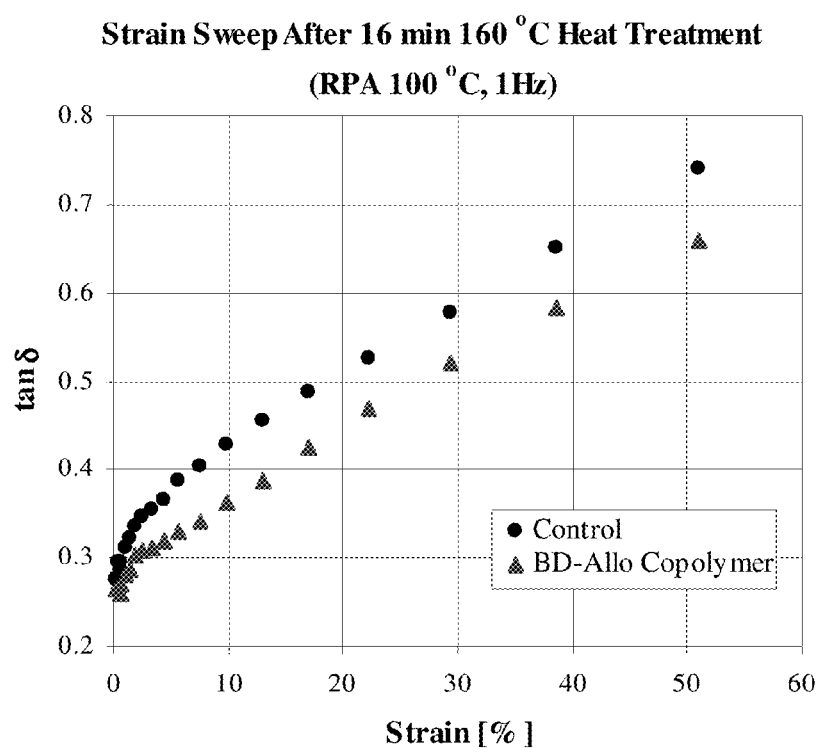
FIG. 22 shows the effect of incorporated Alloocimene units on the strain dependence of tan δ.

According to FIG. 20 the G' strain dependence is similar for the two compounds albeit it is somewhat lower at low strains in case of the BD-Alloocimene copolymer. G" however, shows a bigger difference as a function of the strain. Here again the copolymer displays a reduced strain dependence (see FIG. 21). As a result the tan δ value of the copolymer is lower in the entire frequency range than that of the control as shown by FIG. 22.

These measurements confirm that polymer-carbon black interaction can be improved by the by the incorporation of conjugated diene units into the chain and assumably via the Diels-Alder reaction between this chain elements and the carbon black.

Cure and Dynamic Properties of Cured Samples

Figure 23:
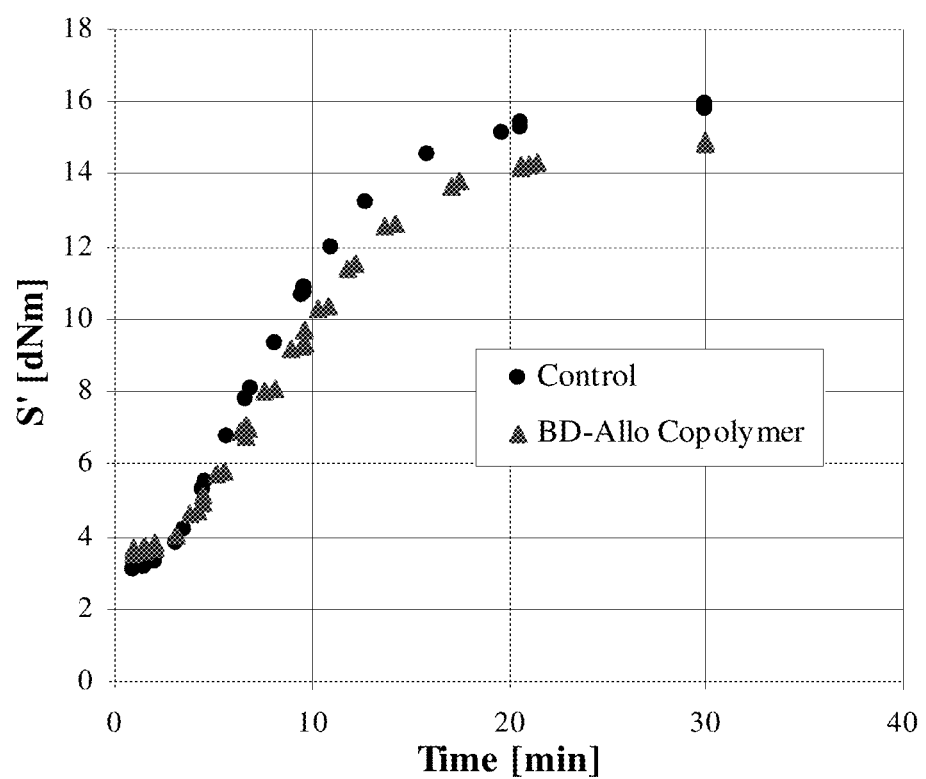
FIG. 23 shows the cure curve of BD control and BD-Alloocimene copolymer.
Figure 24:
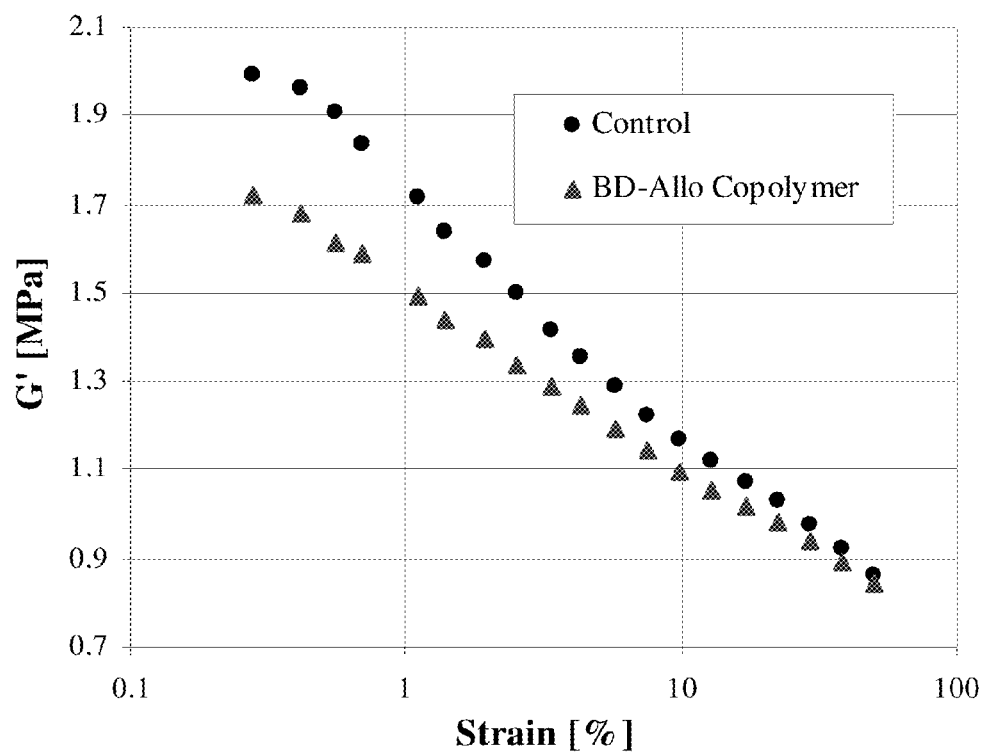
FIG. 24 shows the effect of incorporated Alloocimene units on the strain dependence of G'.
Figure 25:
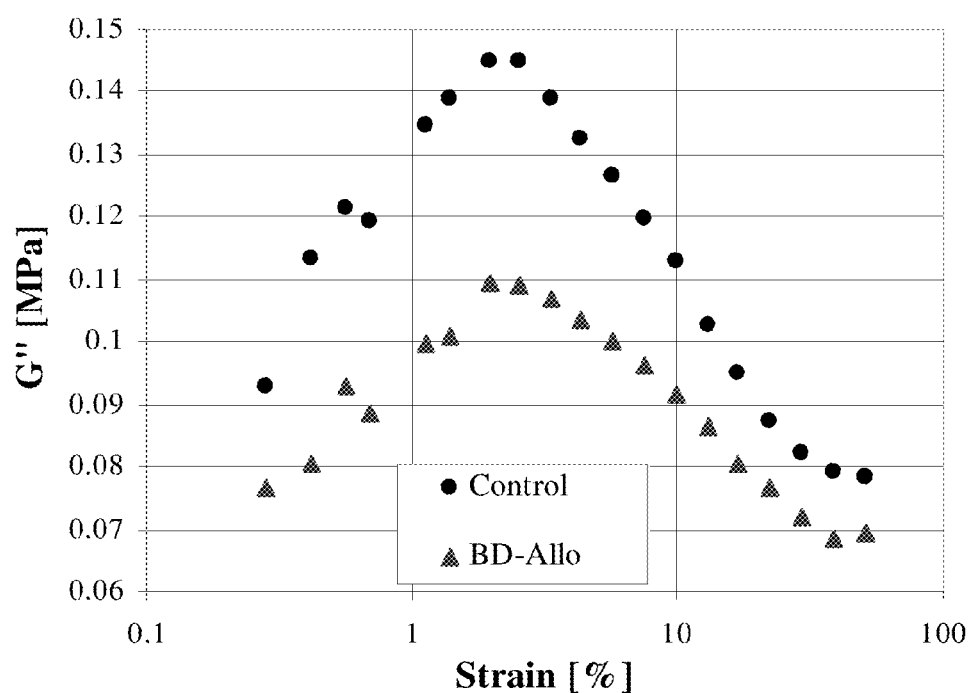
FIG. 25 shows the effect of incorporated Alloocimene units on the strain dependence of G".
Figure 26:
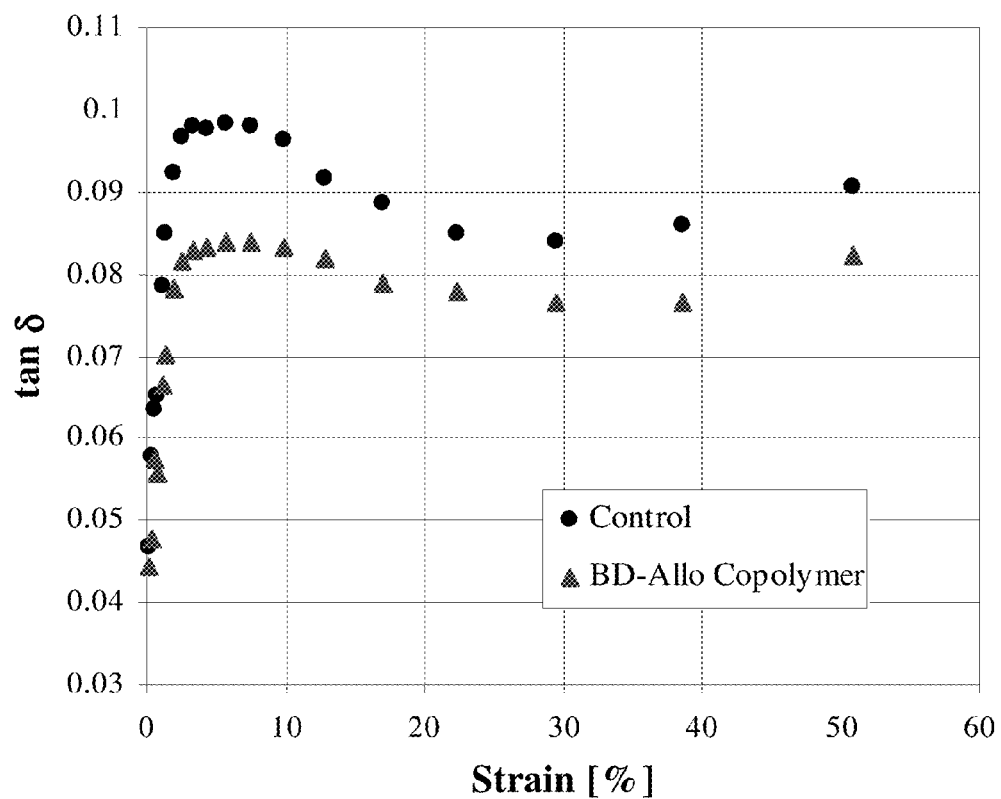
FIG. 26 shows the effect of incorporated Alloocimene units on the strain dependence of tan δ.

The cure curves of the two productive compounds are shown by FIG. 23. The rate and state of cure is somewhat lower in case of the copolymer. Subsequently the copolymer was also tested for Payne effect using a "static" cure cycle (0.28% strain) instead of the typical 7% strain in order not to alter the filler-polymer or filler-filler interaction during the cure. The comparison of the stain dependence of G', G" and tan δ of the cured control and BD-Alloocimene copolymer is given by FIGS. 24-26. Clearly the copolymer displays a lower G', G" and tan δ and the strain dependence of these values are reduced. This is in line with the differences detected in case of the green compounds. The reduced Payne effect and lower rheological parameters (G', G" and tan δ) seem to indicate that indeed the copolymer has a stronger interaction with the filler likely due to the hypothesized Diels-Alder reaction between the conjugated diene units of the chain and the fullerene like structure present in the carbon black investigated.

Examples 5-7

The following examples show that conjugated diene units can also be incorporated in butyl elastomers by carbocationic copolymerization with isobutylene. Technical grade (80%) alloocimene, (2,6-dimethyl-2,4,6-octatriene) of 95.6% actual purity level which was purchased from Aldrich and dried by column chromatography using aluminum oxide (neutral, Brockmann I activity (Aldrich) and degassed by freeze-pump-thaw technique. Isobutylene (TB), 99% purity and methyl chloride (MeCl), 99.5% purity (Matheson TRI-GAS) were condensed from gas phase after drying it by passing through a column filled with BaO/CaCl$_2$. Hexane(s) (Mallinckrodt Chemicals with 98.5% minimum purity) was freshly distilled off CaH$_2$ (Aldrich). Di-tert-butylpyridine (DtBP, 97%, TIC), N,N-Dimethyl acetamide (DMA, 99.8%, anhydrous, Aldrich) and titanium tetrachloride (TiCl$_4$, 99.9%, Aldrich) were used as received. p-Vinylcumyl methyl ether (inimer) was synthesized based on the procedure described in (C. Paulo, J. E. Puskas, Macromolecules 2001, 34, 734-739). It was purified by column chromatography using neutral Brockmann activity I alumina (Aldrich) and n-pentane. 2-Chloro-2,4,4-trimethylpentane (TMPCl) was made by hydrochlorination of 2,4,4-trimethylpent-1-ene (TMP-1, Acros). After completion of the reaction, solution was neutralized by the slow addition of sodium bicarbonate, dried over CaH$_2$ and filtered. It was degassed with freeze-pump-thaw cycles.

Polymerizations were carried out under a dry nitrogen atmosphere (less than 1 ppm of water and less than 5 ppm of oxygen) in an MBraun LabMaster 130 glovebox at −80° C. and −95° C. in a 500 mL three neck flask equipped with an overhead mixer. Polymerizations were carried out in a hexane/MeCl (60/40 v/v) solvent mixture.

Example 5

In this experiment carbocationic polymerization of isobutylene with alloocimene was carried out at −80° C. The initial volume of the reaction mixture was 200 mL. Table VII provides a list of the concentrations of the various chemicals used. During polymerization 5 mL samples were taken for gravimetric, HNMR and GPC analysis.

TABLE VII

Initial Concentrations

|  | Concentration [mol/L] |
|---|---|
| DtBP | 0.0061 |
| DMA | 0.0097 |
| TMPCl | 0.0020 |
| TiCl$_4$ | 0.066 |
| IB | 1.65 |
| Alloocimene | 0.19 |

Table VIII. lists the conversion and measured molecular weights along with the UV/RI ratios determined by GPC. ΣUV$_i$/ΣRI$_i$ is the ratio of the areas under the respective GPC peak and UV$_{max}$/RI$_{max}$ is the ratio of the peak heights. UV absorption was measured at 240 nm. At this wavelength only the conjugated diene units absorb UV light, therefore the ratio of the two signals is proportional to the conjugated diene content of the polymer.

TABLE VIII

Key Properties of Samples Taken

| Reaction Time [min] | Overall Conversion [wt %] | Mn [g/mol] | Mw [g/mol] | Mw/Mn | Ieff [%] | UV$_i$/RI$_i$ | UV$_{max}$/RI$_{max}$ |
|---|---|---|---|---|---|---|---|
| 5 | 30.1 | 13700 | 25800 | 1.88 | 112 | 7.1 | 6.6 |
| 10 | 54.8 | 21000 | 32700 | 1.56 | 133 | 4.4 | 3.3 |
| 20 | 76.8 | 31500 | 42300 | 1.34 | 124 | 3.3 | 1.9 |
| 40 | 95.2 | 38000 | 48700 | 1.28 | 128 | 2.7 | 2.7 |
| 80 | 101.4 | 39700 | 50500 | 1.27 | 130 | 2.7 | 1.3 |
| 110 | 97.0 | 40600 | 55600 | 1.37 | 122 | 2.4 | 1.5 |

Figure 27:
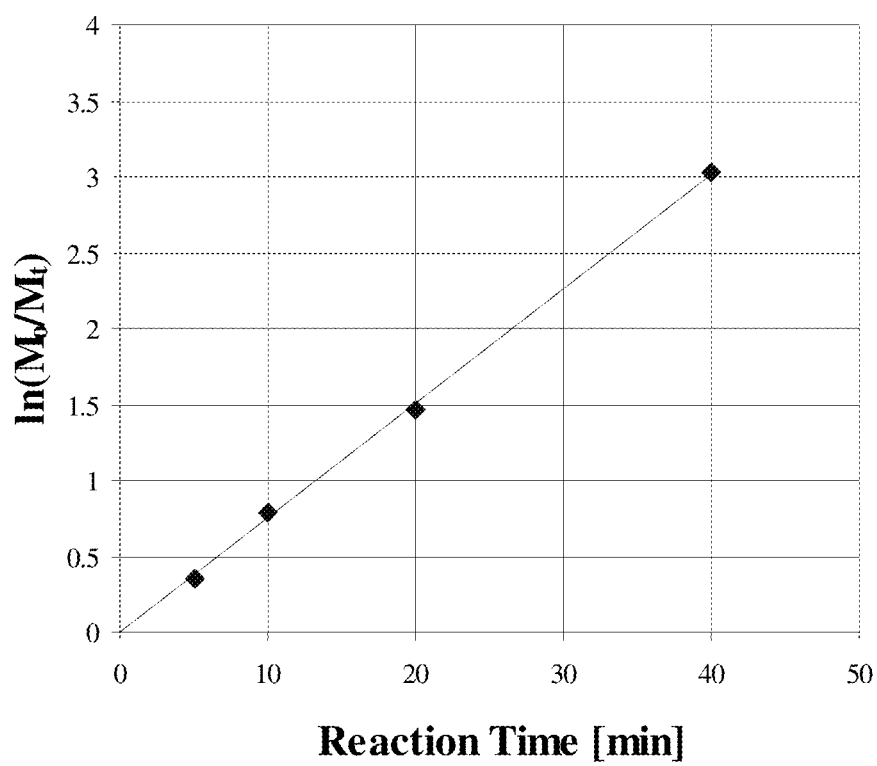
FIG. 27 shows the kinetic treatment of the conversion data.
Figure 28:
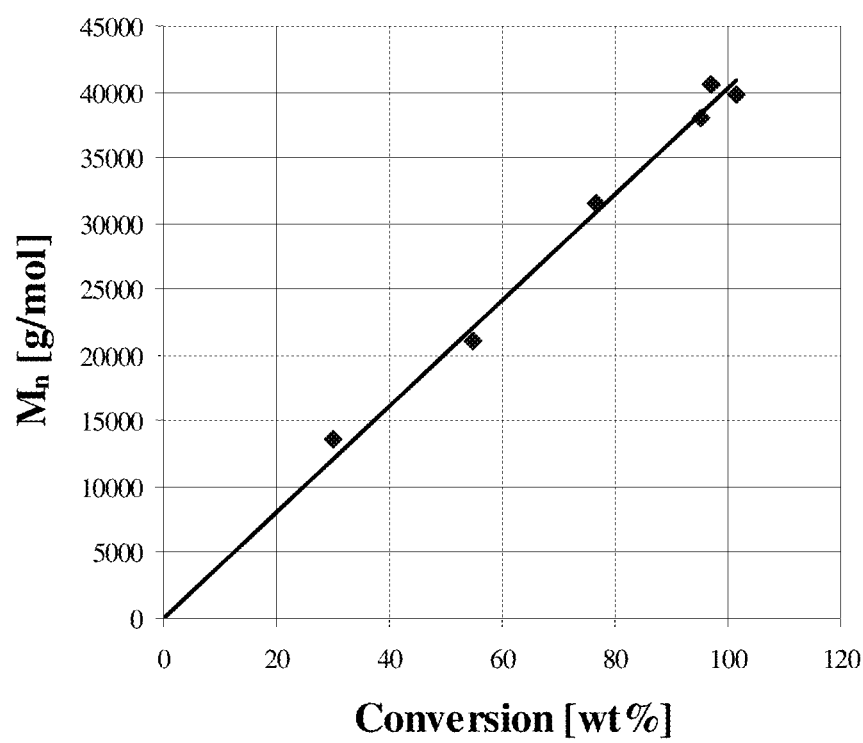
FIG. 28 shows the linear increase of $M_n$ with conversion indicating absence of termination.
Figure 29:
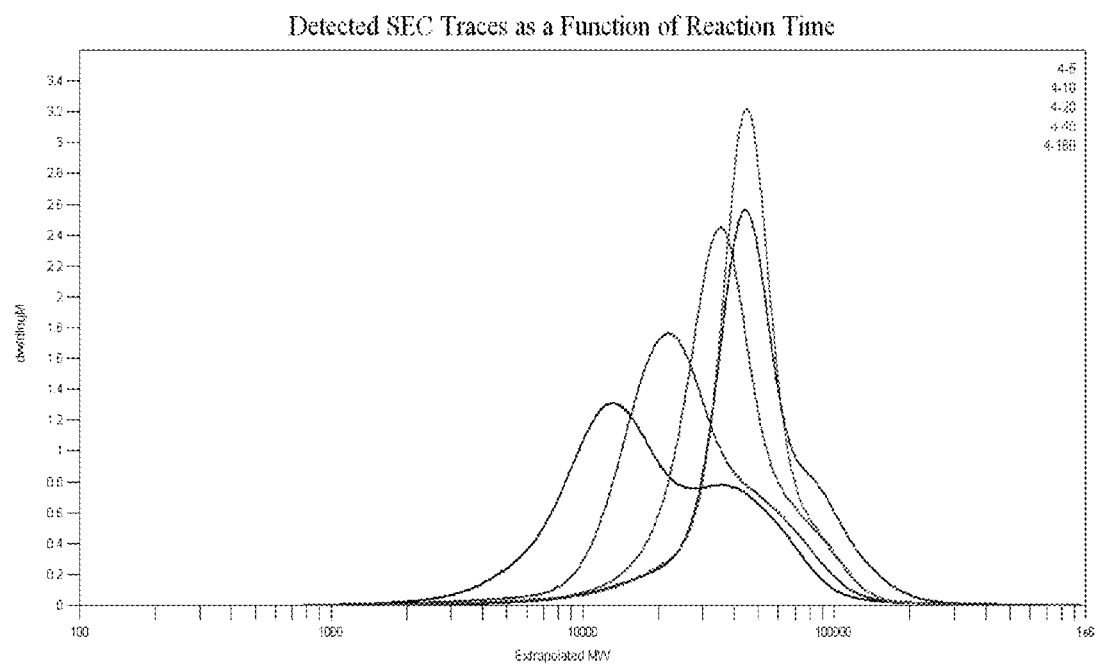
FIG. 29 shows the GPC curves of samples showing molecular weight increase with time.
Figure 30:
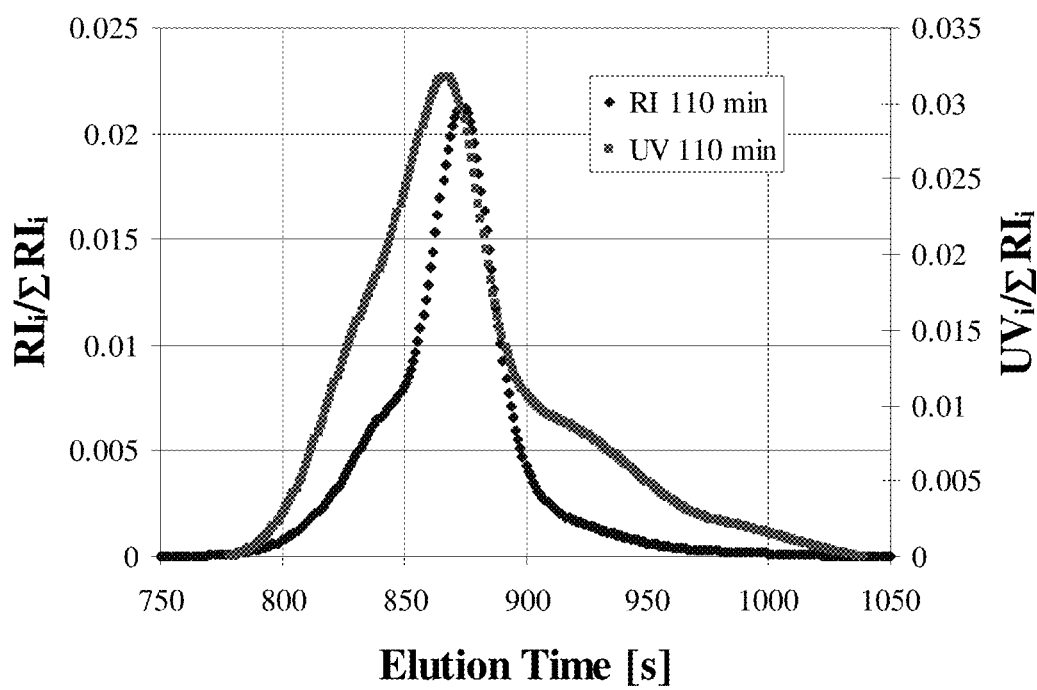
FIG. 30 shows the UV and RI traces of the last sample.

According to the results 95% conversion has been reached in 40 minutes. The 1 n(M$_o$/M$_t$)—time plot (where M$_o$ and M$_t$ are monomer concentrations at start and at t time) is linear (see FIG. 27) indicating no termination in this time range. The M$_n$ conversion plot (FIG. 28) is also linear implying that the copolymerization is living in nature. The calculated initiator efficiencies are similar but over 100% revealing that some uncontrolled initiation took place at the beginning of the reaction. This is confirmed by the bimodality of the GPC traces of the first sample as shown by FIG. 29. The similar shape of the UV and RI traces of the last sample indicates that all chains have incorporated alloocimene, i.e., the sample is not a mixture of isobutylene and alloocimene hompolymers. In other words, true copolymerization took place. The decrease of the UV/RI ratios with conversion shows that the reaction of alloocimene is significantly faster than that of IB. The result of this is that most of the alloocimene units are located at the head of the polymer chains. Those who are familiar with polymerization know that this can easily be corrected by continuous polymerization or in case of batch polymerization by continuous feeding of the more reactive polymer. The next example shows the result of an experiment carried out by adding IB first followed by the continuous addition of alloocimene.

Example 6

This polymerization was carried out utilizing the same procedure and technique as delineated in Example 5. However, after 3 minutes of polymerization, a continuous stream of hexane/alloocimene (50/50 v/v) was introduced to the reaction mixture at a flow rate of 1 ml/min. Total amount of mixture added was 50 mL. After stopping this continuous addition of the hexane/alloocimene stream, the polymerization was allowed to continue for 60 more minutes at which point it was terminated. Table IX provides the number average molecular weight (Mn), weight average molecular weight (Mw), polydispersity (ratio of Mw:Mn), $\Sigma UV_i/\Sigma RI_i$, and $UV_{max}/RI_{max}$ of polymers samples attained after various polymerization times ranging from 11 minutes to 111 minutes.

TABLE IX

Conversion and GPC results of the Semi-continuous Experiment

| Reaction Time [min] | Conversion [wt %] | Mn [g/mol] | Mw [g/mol] | Mw/Mn | $\Sigma UV_i/\Sigma RI_i$ | $UV_{max}/RI_{max}$ |
|---|---|---|---|---|---|---|
| 11 | 40.2 | 17700 | 34900 | 1.97 | 8.9 | 5.6 |
| 21 | 63.3 | 23700 | 50900 | 2.15 | 11.1 | 10.0 |
| 31 | 84.0 | 29700 | 61300 | 2.06 | 12.1 | 11.4 |
| 41 | 89.3 | 32400 | 70600 | 2.18 | 13.0 | 12.3 |
| 51 | 91.0 | 34300 | 80200 | 2.34 | 13.2 | 13.0 |
| 61 | 88.7 | 35900 | 85400 | 2.38 | 13.3 | 13.0 |
| 111 | 100 | 36300 | 101300 | 2.79 | 12.9 | 12.8 |

Results clearly show that by the continuous feeding of alloocimene the UV/RI ratios could be maintained and in fact was increased over time. The molecular weights increased with time indicating that the polymerization maintained some living character.

Figure 31:
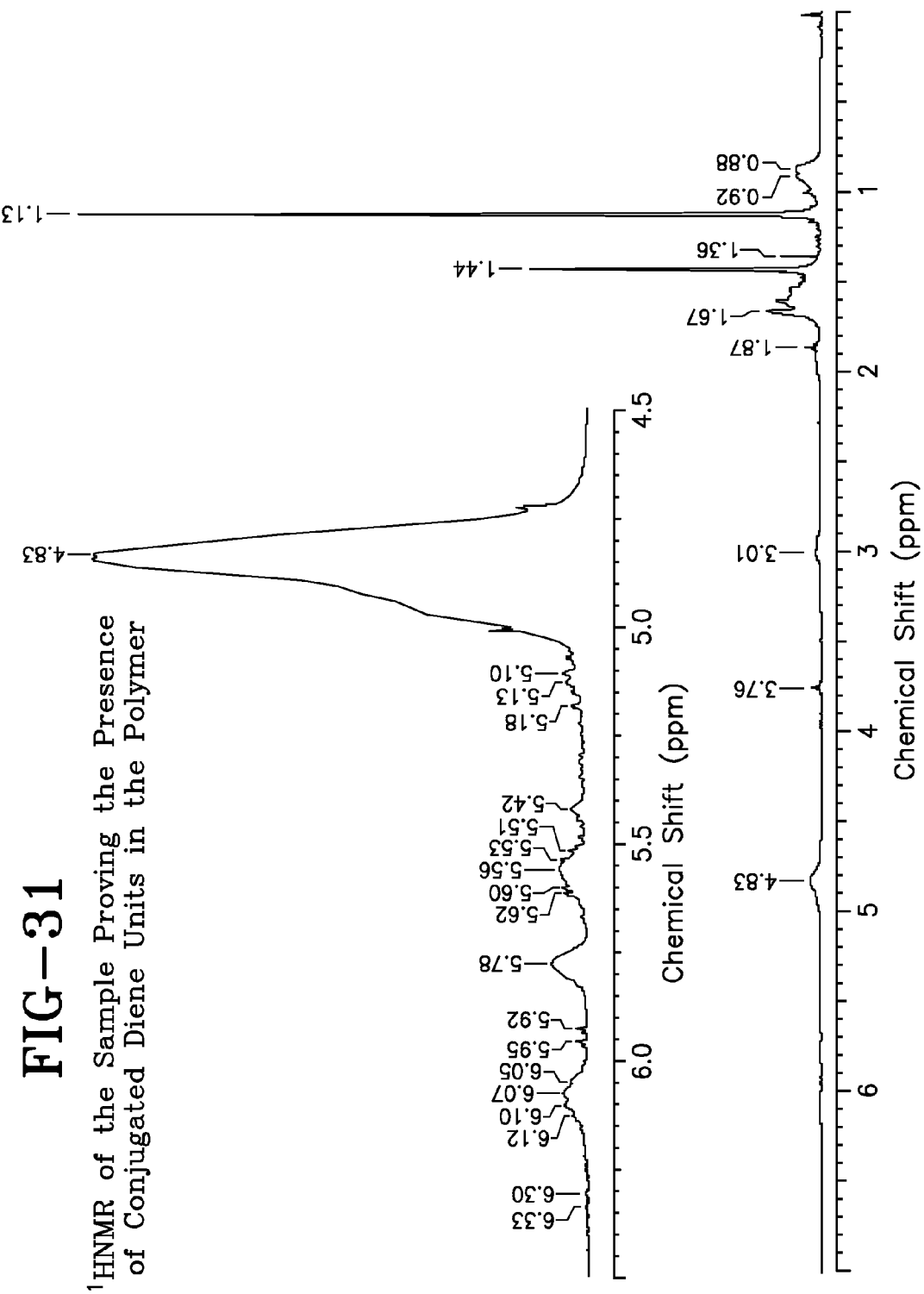
FIG. 31 shows the ¹HNMR of the sample proving the presence of conjugated Diene units in the polymer.

H$^1$NMR analysis of samples confirmed the presence of conjugated diene units in the polymer chain. FIG. 31 shows the H$^1$NMR of the sample taken at 60 minutes. The presence of conjugated diene in the polymer is proven by the resonances at around 5.6 ppm, 5.8 ppm, and 6.1 ppm. It is quite surprising that there are no resonances in the 5.0-5.5 region where protons of isolated unsaturation (vinyl protons) are expected. In contrast there is large and broad resonance in the 4.7-5.0 ppm region. This is the area of vinylidene protons. Formation of such structure is only possible via proton loss from a t-butyl or allylic t-butyl carbocation. This should lead to chain transfer in the absence of proton trap, or to termination in the presence of proton trap (DtBP). Considering the high molecular weight of the sample, this reaction is likely negligible. However, if the proton is transferred to another part of the same or neighboring alloocimene unit unsaturation this can lead to the formation of vinylidene proton without termination or transfer to another monomer. The lack of resonances in the 5.0-5.5 ppm region and the presence of strong resonances in the 4.6-5.0 ppm could also be a result of the downshift of the vinyl protons due to short chain branching or perhaps cyclization. An example of this is the downshift of the vinyl proton of isoprene in IB/IP copolymer from 5.1 ppm to about 4.9 ppm due to a short chain branch point next to the unsaturation (White, J. L.; Shaffer, T. D.; Ruff, C. J.; Cross, J. P. *Macromolecules* 1995, 28, 3290.)

From the HNMR spectrum of this and other samples it could be determined that approximately 8% of the alloocimene units has conjugated diene structure. It is quite surprising as based on literature information only traces of conjugated diene units were present in IB/Alloocimene copolymers prepared by carbocationic polymerization. (A. Priola, C. Como, M. Bruzzone and S. Cesca, Polymer Bulletin 4, 743-750 (1981)).

Figure 32:
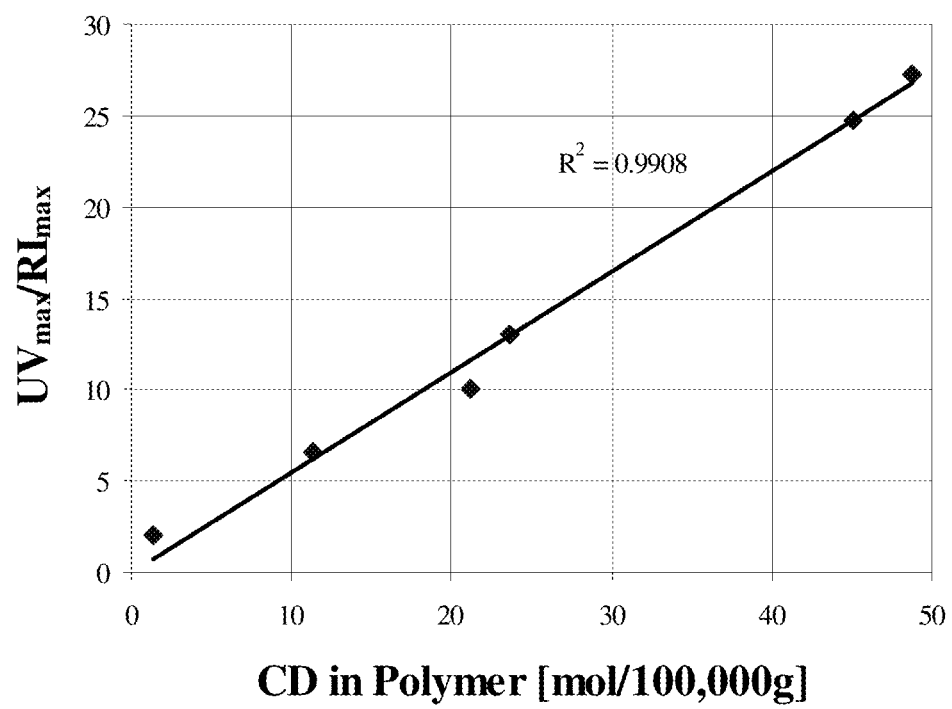
FIG. 32 can be used for the quick determination of the conjugated diene content of the sample obtained.

The conjugated diene content of various samples gave a very strong linear correlation with the UV/RI ratio of the samples as shown by FIG. 32. This confirms that the UV/RI ratio is indeed a very good measure of the conjugated diene content of the polymer. The conjugated diene content is expressed in mol/100,000 g form. This value is equivalent to the number of conjugated diene units present in a 100,000 g/mol molecular eight sample. This figure can be used for the quick determination of the conjugated diene content of the sample obtained. For example a UV/RI ratio of 5 means that every 100,000 g/mol segment of the polymer has 10 CD units.

Cationic Example 7

In this example it is demonstrated that very high molecular weight IB/alloocimene copolymers can also be made. This was achieved by the use of an initiator, which has a dual functionality. It is an initiator and also a monomer hence the name inimer. Using this inimer it has been demonstrated that very high molecular so called arborescent polymers can be made (C. Paulo, J. E. Puskas, Macromolecules 2001, 34, 734-739).

In this experiment first a high molecular weight arborescent PIB core (ArbPIB) was synthesized using 2 mol/L isobutylene. After this a monomer mixture of 2 mol/L IB and 0.04 mol/L Allo (concentrations are based on the initial volume of the reaction mixture) was added in order to synthesize and ArbPIB blocked with a copolymer of IB and Alloocimene (ArbPIB-b-IB-co-Allo).

The reaction was carried out at −95° C. as follows. 0.14 g inimer, 0.23 mL dtBP, 103 mL hexanes, 69 mL MeCl, and 31.8 mL IB was added to a three neck round bottom flask equipped with stirrer and cooled to −95° C. To this charge a prechilled mixture of 0.98 mL TiCl$_4$ and 5 mL hexane was added to initiate the polymerization. At 38 minutes a sample was taken for analysis and at 40 minutes reaction time first 0.1 mL DMA was added followed by the addition of a mixture of 31.8 mL IB, 1.4 mL alloocimene and 0.1 mL DtBP cooled to −95° C. Additional samples were taken at 81 and 119 minutes. The reaction was terminated at 120 minutes by the addition of NaOH dissolved in methanol.

Figure 33:
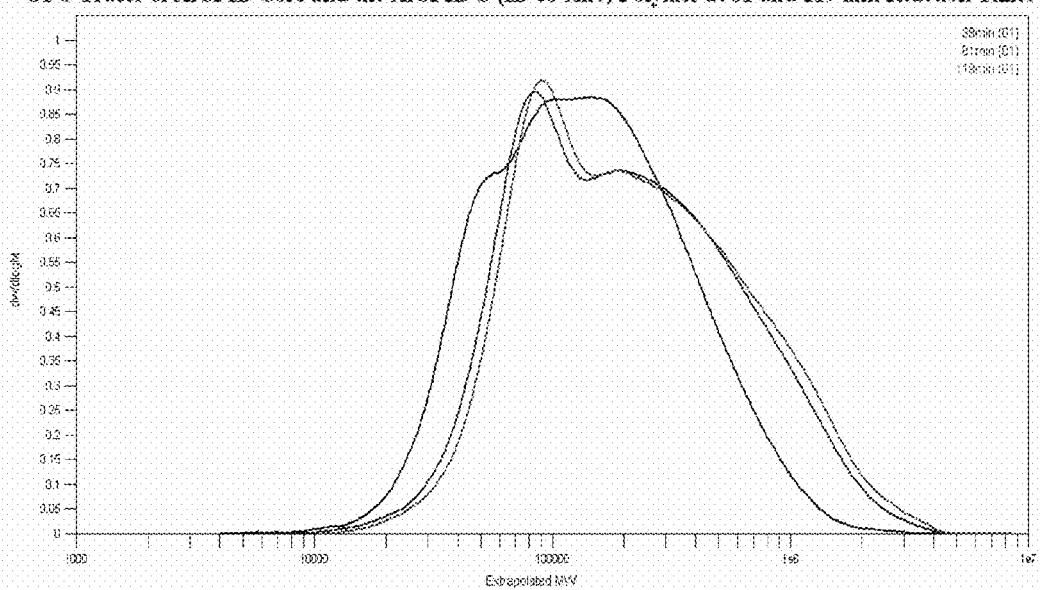
FIG. 33 shows GPC traces of ArbPIB core and the ArbPIB-b-(IB-co-Allo)polymer at 81 and 119 minute reaction times.
Figure 34:
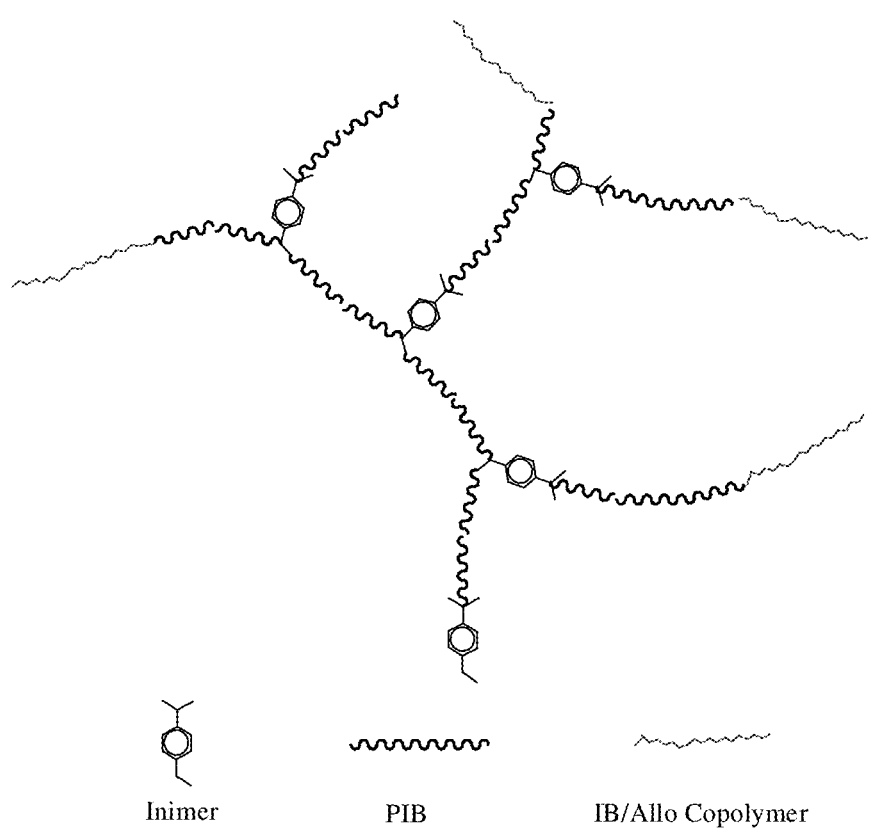
FIG. 34 shows a copolymer having polyisobutylene alloocimene arms which are attached to an arborescent polyisobutylene core.

FIG. 33 shows the GPC traces of samples taken. The sample taken at 38 minutes is the arborescent PIB core (ArbPIB). It has a branched arborescent (tree like) structure. To this multi-arm homopolymer of isobutylene, copolymer of IB and alloocimene was attached via the addition of the IB/Allo monomer mixture at 40 minutes. This resulted in an arborescent core in which the chain ends are blocked with a copolymer of IB and Allo (ArbPIB-b-IB-co-Allo). Structure of the resulting polymer is illustrated by FIG. 34 which depicts a copolymer having polyisobutylene alloocimene arms which are attached to an arborescent polyisobutylene core.

The GPC traces of samples taken at 81 and 119 minutes prove the incorporation of IB/Allo monomer mixture into the ArbPIB core. GPC traces of these samples are shifted toward higher molecular weights compared to that of the core. Table IV lists the absolute molecular weights calculated using the dn/dc value of PIB (0.108).

Figure 35:
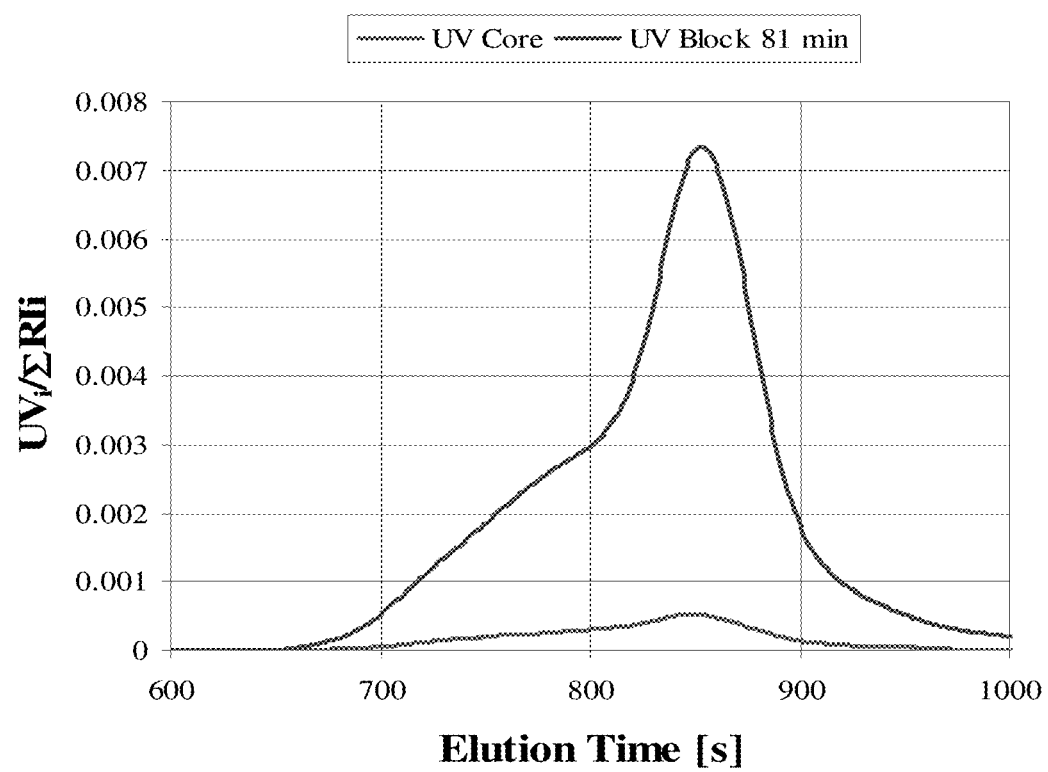
FIG. 35 shows the UV traces of samples taken before and after the addition of the IB/Allo monomer mixture as carried out by cationic polymerization as described in Example 7.
Figure 36:
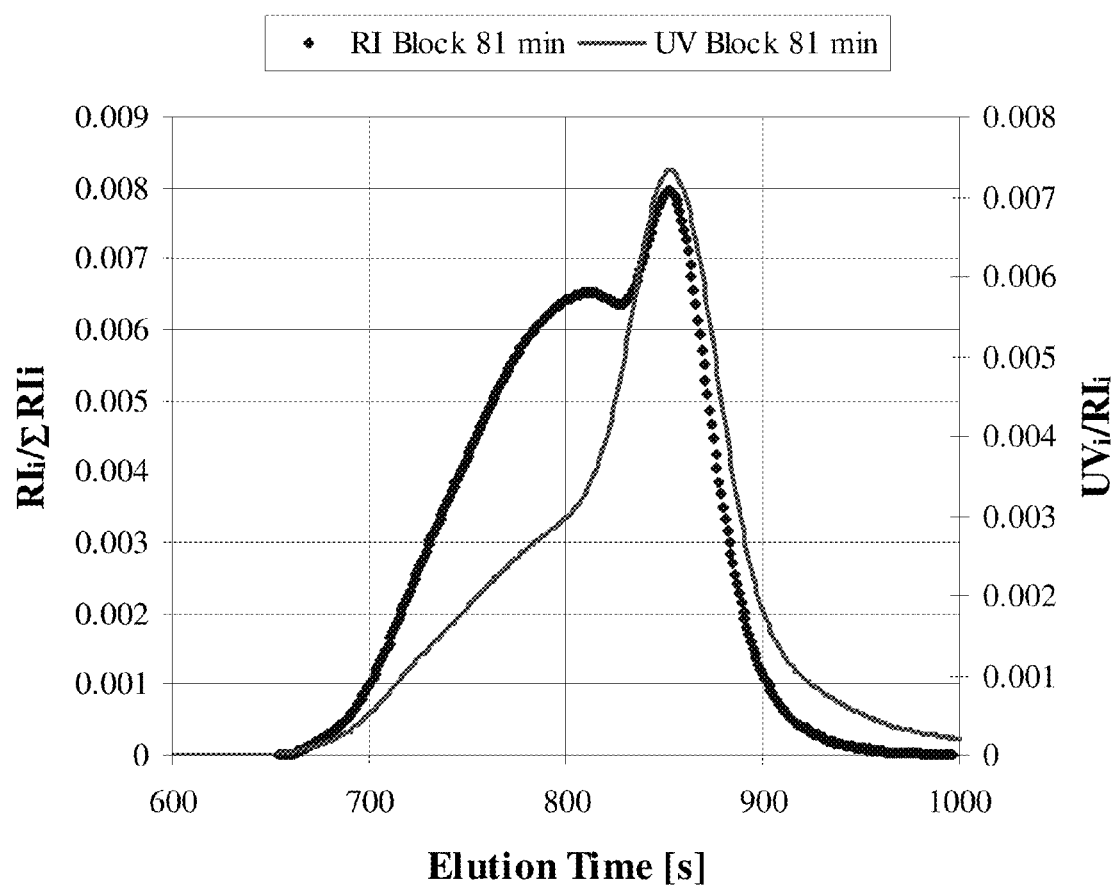
FIG. 36 shows UV traces of the IB/Allo copolymer capped ArbPIB as described in Example 7.

FIG. 35 shows the UV traces of samples taken before and after the addition of the IB/Allo monomer mixture. The residual UV trace of the core is due to the incorporated aromatic fragment of the initiator (inimer). Compared to this, the sample taken after introduction of the IB/Allo monomer mixture has strong UV absorbance indicating the presence of conjugated diene (CD) moieties in the blocked product FIG. 36 shows the UV and RI traces of the sample taken at 81 minutes. The similar shape of these traces proves that CD units are present in the polymer irrespective of its molecular weight. It also proves that alloocimene incorporated into the ArbPIB core and it did not form a separate homopolymer. The molecular weights of samples measured by GPC are listed in Table X.

TABLE X

Molecular Weights of the Core (ARBPIB) and IB/Allo Copolymer Capped ArbPIB

| Reactiohn Time [min] | Mn [kg/mol] | Mw [kg/mol] | Mz [kg/mol] |
|---|---|---|---|
| 38 | 59.7 | 195.4 | 578.4 |
| 81 | 93.8 | 305.4 | 849.5 |
| 119 | 98.0 | 342.0 | 1018.0 |

While certain representative embodiments and details have been shown for the purpose of illustrating the subject invention, it will be apparent to those skilled in this art that various changes and modifications can be made therein without departing from the scope of the subject invention.

What is claimed is:

1. A rubbery polymer having repeat units which are comprised of (1) at least one conjugated diolefin monomer and (2) reactive repeat units having a structural formula selected from the group consisting of:

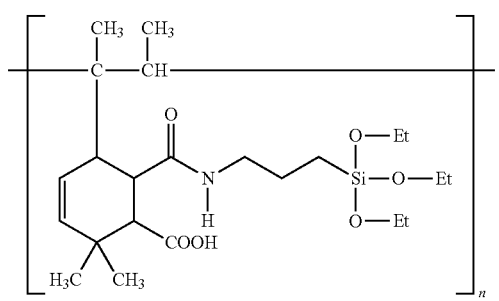

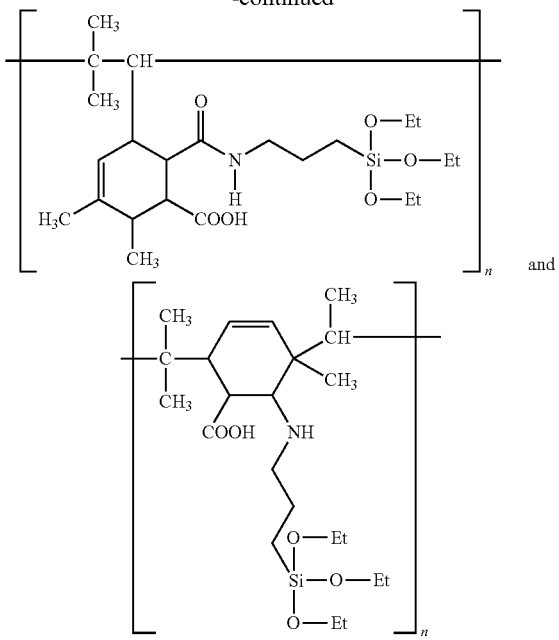

wherein n is an integer representing the number of repeat units in the polymer.

2. The rubbery polymer as specified in claim 1 wherein the conjugated diolefin monomer is selected from the group consisting of 1,3-butadiene and isoprene.

3. The rubbery polymer as specified in claim 1 wherein said rubbery polymer has a number average molecular weight of at least 50,000.

4. The rubbery polymer as specified in claim 2 wherein the reactive repeat units me of the structural formula:

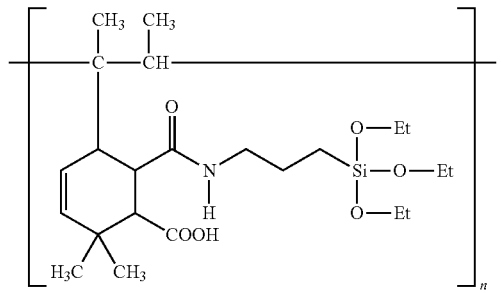

wherein n is an integer representing the number of repeat units in the polymer.

5. The rubbery polymer as specified in claim 2 wherein the reactive repeat units are of the structural formula:

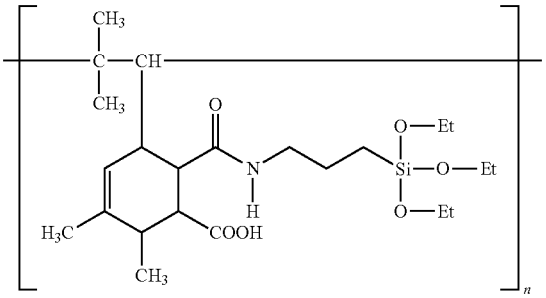

wherein n is a integer representing the number of repeat units in the polymer.

6. The rubbery polymer as specified in claim 2 wherein the reactive repeat units are of the structural formula:

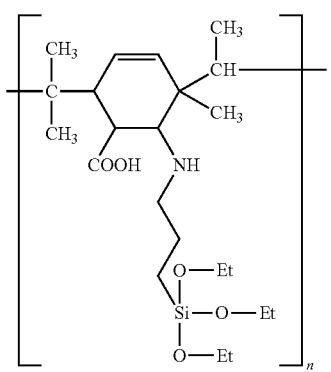

wherein n is an integer representing the number of repeat units in the polymer.

7. The rubbery polymer as specified in claim 4 wherein said rubbery polymer has a number avenge molecular weight of at least 50,000.

8. The rubbery polymer as specified in claim 5 wherein said rubbery polymer has a number average molecular weight of at least 50,000.

9. The rubbery polymer as specified in claim 6 wherein said rubbery polymer has a number average molecular weight of at least 50,000.

10. A polymeric composition which is comprised of a rubbery polymer and silica, wherein the silica is bonded to the rubbery polymer through repeat units having a formula selected from the group consisting of

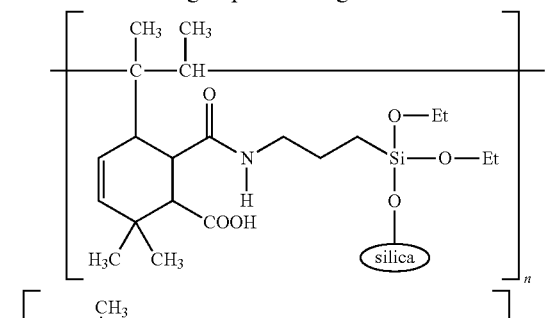

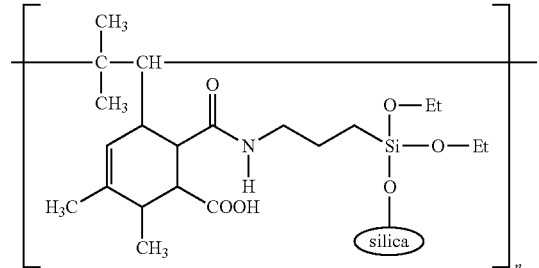

and

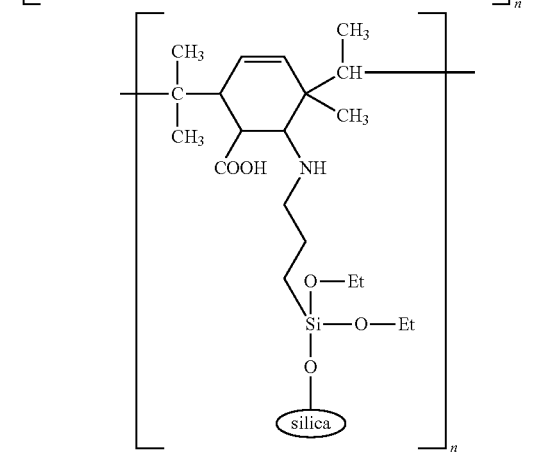

wherein n is an integer representing the number of repeat units in the polymer which are bonded to the silica, and wherein

represents silica particles.

11. The polymeric composition as specified in claim 10 wherein the rubbery polymer is comprised of repeat units which are derived from 1,3-butadiene.

12. The polymeric composition as specified in claim 10 wherein the rubbery polymer is comprised of repeat units which are derived from isoprene.

13. The polymeric composition as specified in claim 11 wherein said rubbery polymer has a number average molecular weight of at least 50,000.

14. The polymeric composition as specified in claim 12 wherein said rubbery polymer has a number average molecular weight of at least 50,000.

15. The polymeric composition as specified in claim 10 wherein the silica is bonded to the rubbery polymer through repeat units of the formula:

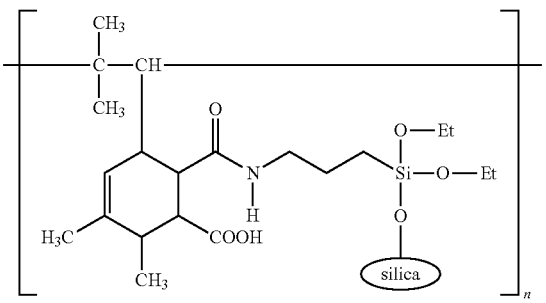

wherein n is an integer representing the number of repeat units in the polymer which me bonded to the silica, and wherein

represents silica particles.

16. The polymeric composition as specified in claim 10 wherein the silica is bonded to the rubbery polymer through repeat units of the formula:

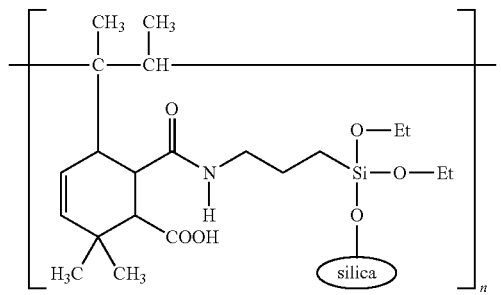

wherein n is an integer representing the number of repeat units in the polymer which are bonded to the silica, and wherein

represents silica particles.

17. The polymeric composition as specified in claim 10 wherein the silica is bonded to the rubbery polymer through repeat units of the formula:

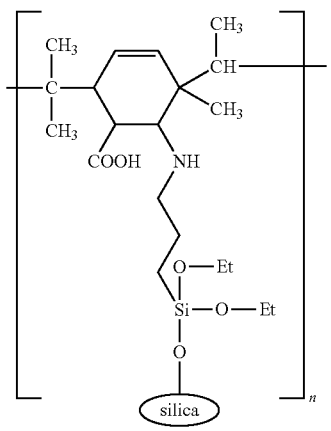

wherein n is an integer representing the number of repeat units in the polymer which are bonded to the silica, and wherein

represents silica particles.

18. A radial tire which is comprised of a generally toroidal-shaped carcass with an outer circumferential tread, at least two spaced beads, at least one ply extending from bead to bead and sidewalls extending from and connecting said tread to said beads, wherein said tread is adapted to be ground-contacting, and wherein said tread is comprised of the polymeric composition specified in claim 10.

* * * * *

UNITED STATES PATENT AND TRADEMARK OFFICE
CERTIFICATE OF CORRECTION

PATENT NO. : 9,550,839 B2
APPLICATION NO. : 14/797611
DATED : January 24, 2017
INVENTOR(S) : Gabor Kaszas et al.

Page 1 of 1

It is certified that error appears in the above-identified patent and that said Letters Patent is hereby corrected as shown below:

In the Specification

At Column 12, Lines 51-52: delete the language "are those known as "redox" initiators, such as combinations of" and replace it with the word "include".

In the Claims

In Claim 4, at Column 44, Line 35: delete the word "me" and replace it with the word "are".

Signed and Sealed this
Fifth Day of December, 2017

Joseph Matal
*Performing the Functions and Duties of the*
*Under Secretary of Commerce for Intellectual Property and*
*Director of the United States Patent and Trademark Office*